US007787623B2

(12) United States Patent
Akiyama et al.

(10) Patent No.: US 7,787,623 B2
(45) Date of Patent: Aug. 31, 2010

(54) KEY GENERATING APPARATUS, PROGRAM, AND METHOD

(75) Inventors: Koichiro Akiyama, Tokyo (JP); Yasuhiro Goto, Hakodate (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 932 days.

(21) Appl. No.: 11/565,204

(22) Filed: Nov. 30, 2006

(65) Prior Publication Data
US 2007/0230692 A1 Oct. 4, 2007

(30) Foreign Application Priority Data
Mar. 30, 2006 (JP) ............................. 2006-094360

(51) Int. Cl.
*H04L 9/22* (2006.01)
(52) U.S. Cl. ............................. 380/44; 380/45; 380/46; 380/47
(58) Field of Classification Search .................. 380/44, 380/45, 46, 47
See application file for complete search history.

(56) References Cited

U.S. PATENT DOCUMENTS

| 5,412,729 | A | * | 5/1995 | Liu ............................. 380/37 |
| 5,740,250 | A | * | 4/1998 | Moh ........................... 380/28 |
| 7,162,032 | B2 | * | 1/2007 | Brekne ......................... 380/30 |
| 7,239,701 | B1 | * | 7/2007 | Ogishi et al. .................. 380/44 |
| 7,397,917 | B2 | * | 7/2008 | Chen et al. .................... 380/44 |
| 2002/0041684 | A1 | * | 4/2002 | Nishioka ...................... 380/30 |
| 2005/0271203 | A1 | | 12/2005 | Akiyama et al. |
| 2006/0002562 | A1 | * | 1/2006 | Berenstein et al. ........... 380/278 |
| 2006/0171531 | A1 | * | 8/2006 | Teranisi ....................... 380/28 |
| 2006/0251247 | A1 | | 11/2006 | Akiyama et al. |
| 2008/0144833 | A1 | * | 6/2008 | Matsumoto ................. 380/278 |

OTHER PUBLICATIONS

Xian-Mo Zhang, Yuliang Zheng; Cryptographically resilient functions; Sep. 1997; Information Theory, IEEE Transactions on; vol. 43, Issue 5, pp. 1740-1747.*
Mihaljevic, M.J.; Kohno, R.; Cryptanalysis of fast encryption algorithm for multimedia FEA-M; Sep. 2002; Communications Letters, IEEE; vol. 6, Issue 9, pp. 382-384.*
U.S. Appl. No. 12/266,027, filed Nov. 6, 2008, Akiyama, et al.
U.S. Appl. No. 11/491,301, filed Jul. 24, 2006, Akiyama, et al.
U.S. Appl. No. 12/352,083, filed Jan. 12, 2009, Akiyama, et al.

(Continued)

*Primary Examiner*—Edan Orgad
*Assistant Examiner*—Bradley Holder
(74) *Attorney, Agent, or Firm*—Oblon, Spivak, McClelland, Maier & Neustadt, L.L.P.

(57) ABSTRACT

A key generating apparatus generates a fibration $X(x, y, t)=0$ of an algebraic surface X serving as a part of a public key and defined on a finite field $F_q$ (where $q=p^r$ [p is a prime number and r is an extended degree]) and a private key which is two sections $D_1$ and $D_2$ corresponding to the fibration $X(x, y, t)=0$. The fibration $X(x, y, t)$ is generated such that a term $(c_{ij}(t)x^i y^j)$ of $x^i y^j$ having a 1-variable polynomial $c_{ij}(t)$ of t as a coefficient is included in the fibration $X(x, y, t)$.

24 Claims, 20 Drawing Sheets

OTHER PUBLICATIONS

U.S. Appl. No. 11/685,302, filed Mar. 13, 2007, Akiyama, et al.

U.S. Appl. No. 11/426,450, filed Jun. 26, 2006, Koichiro Akiyama, et al.

Koichiro Akiyama, et al., "An Alegbraic Surface Public-key Cryptosystem", IEICE Technical Report, vol. 104, No. 421, pp. 13-20, (ISEC 2004-80).

Koichiro Akiyama, et al., "A Construction of an Algebraic Surface Public-key Cryptosystem", Proceedings of the 2005 Symposium on Cryptography and Information Security, pp. 925-930, Jan. 25-28, 2005.

Koichiro Akiyama, et al., "A Security Analysis for a Public-key Cryptosystem using Algebraic Surfaces", Proceedings of the 2006 Symposium on Cryptography and Information Security, 2A31, Jan. 17-20, 2006, 6 pages.

U.S. Appl. No. 12/560,895, filed Sep. 16, 2009, Akiyama et al.

* cited by examiner

| Total degree | Format of algebraic surface |
|---|---|
| 3 | $y^2 + c_{21}(t)x^2y + c_{10}(t)x + c_{00}(t)$ |
| 3 | $xy^2 + c_{21}(t)x^2y + c_{02}(t)y^2 + c_{10}(t)x + c_{00}(t)$ |
| 4 | $x^3y + c_{12}(t)xy^2 + c_{20}(t)x^2 + c_{10}(t)x + c_{00}(t)$ |
| 5 | $x^5 + y^5 + c_{21}(t)x^2y + c_{10}(t)x + c_{00}(t)$ |
| 5 | $x^4y + c_{14}(t)xy^4 + c_{11}(t)xy + c_{10}(t)x + c_{00}(t)$ |
| 6 | $x^3y^3 + c_{15}(t)xy^5 + c_{31}(t)x^3y + c_{10}(t)x + c_{00}(t)$ |
| 6 | $c_{24}(t)x^2y^4 + c_{51}(t)x^5y + xy^4 + c_{10}(t)x + c_{00}(t)$ |
| 7 | $x^7 + c_{50}(t)x^5 + c_{22}(t)x^2y^2 + c_{10}(t)x + c_{00}(t)$ |

FIG. 3

KEY GENERATING APPARATUS, PROGRAM, AND METHOD

CROSS-REFERENCE TO RELATED APPLICATIONS

This application is based upon and claims the benefit of priority from prior Japanese Patent Application No. 2006-094360, field Mar. 30, 2006, the entire contents of which are incorporated herein by reference.

BACKGROUND OF THE INVENTION

1. Field of the Invention

The present invention relates to a key generating apparatus, program, and method which can improve the security of a key of a public-key cryptosystem using, for example, an algebraic surface.

In the networked society, a large amount of information such as electronic mail is transmitted over the network to allow people to communicate. In this networked society, a public key cryptosystem is popularly used to guarantee the confidentiality and authenticity of information.

As typical public-key cryptosystems, the RSA and elliptic curve cryptosystems are known. The RSA cryptosystem bases security on the difficulty of factorization into prime factors and uses a power remainder operation as an encrypting operation. The elliptic curve cryptosystem bases security on the difficulty of the discrete logarithm problem on an elliptic curve and uses a point operation on an elliptic curve as an encrypting operation.

In these public-key cryptosystems, a decrypting method related to a specific key (public key) is proposed. On the other hand, a general decrypting method is not known. However, keys of the RSA cryptosystem and the elliptic curve cryptosystem will probably be decrypted when a quantum computer eventually comes into existence.

Unlike current computer, the quantum computer is a computer which can execute a superparallel operation by using a physical phenomenon called entanglement in quantum mechanics. Currently, the quantum computer is a virtual computer at an experimental level and is being researched and developed to realize an actual quantum computer. In 1994, Shor showed that a quantum computer can constitute an algorithm which can efficiently solve factorization into prime factors and the discrete logarithm problem.

In contrast to this, there has been proposed a public-key cryptosystem which is secure even if a quantum computer is realized. An example is a quantum public-key cryptosystem. In the quantum public-key cryptosystem, the quantum computer generates a key of a knapsack cryptosystem which is strong enough to make it impossible to generate the key by a current computer. However, since a key of the quantum public-key cryptosystem cannot be generated by a current computer, the quantum public-key cryptosystem cannot be used at present.

In general, when a secure public-key cryptosystem is to be proposed, a problem such as factorization into prime factors or the discrete logarithm problem which can be difficult to solve is found in advance. The public-key cryptosystem is then designed such that to decrypt an encrypted text without knowing a private key is equivalent to solving the problem which is difficult to solve.

However, even though a problem which is difficult to solve is found, the public-key cryptosystem which uses the problem as the basis of security cannot be easily constituted. This is because, when the computation is excessively difficult, the problem of generating of a key is difficult. For this reason, the key cannot be generated. On the other hand, when a problem which is easy enough to make it possible to generate a key is used, the key can be easily decrypted.

Therefore, in order to constitute a public-key cryptosystem, a problem which is difficult to solve must be found, and the found problem be reformed into a problem from which a key can be easily generated although the key cannot be easily analyzed. At present, since the reformation is difficult, only a few public-key cryptosystems have been proposed.

In the present situation, as a public-key cryptosystem scheme which can assure security even when a quantum computer finally appears, and which can be securely realized by a current computer, and may be realized in a low-power circumstance, a public-key cryptosystem using an algebraic surface has been proposed (for example, see JP-A 2005-331656 (KOKAI) or related U.S. patent application Ser. No. 11/128,283). The public-key cryptosystem using an algebraic surface is also called an algebraic surface cryptosystem.

In order to improve the security of a key of the public-key cryptosystem, is it desired that the class of the key to be generated is not limited. This is because an analyzing method based on the properties and specialty of a key depending on a limited class may be found in the future.

According to a study by the present inventor, there is a possibility that an analyzing method may be found even in an algebraic surface cryptosystem. For example, in the 58th to 59th paragraphs of JP-A 2005-331656 (KOKAI), as a fibration $X(x, y, t)$ of an algebraic surface X, an elliptic surface Et: $y^2+y=x^3+a(t)x+b(t)$ is given as an example. According to the present inventor, this elliptic surface Et is an example of the fibration $X(x, y, t)$ expressed by the following equation:

$$X(x, y, t) = \sum_{0 \le i, j \le r} a_i(t)x^i + b_j(t)y^j$$

However, since the equation does not include a term $c_{ij}x^i y^j$, the class of a public key (fibration $X(x, y, t)$ of the algebraic surface X) to be generated may be limited. This idea is also described in the 60th paragraph of JP-A 2005-331656 (KOKAI). In any case, since the class of the public key to be generated is limited, it can be expected that a decrypting method based on the limited class will be found in the future.

Therefore, in order to prevent an analyzing method based on the limited class, even though a private key includes two sections, it seems desirable that limitation of the class of a public key to be generated be removed.

BRIEF SUMMARY OF THE INVENTION

A first aspect of the present invention is a key generating apparatus comprising: a format data storing device configured to store a plurality of format data which express candidates of format data of a fibration $X(x, y, t)$ of an algebraic surface X on the basis of the following equation as a polynomial $x^i y^j$ having a 1-variable polynomial $c_{ij}(t)$ of t as a coefficient, the fibration $X(x, y, t)$ being a part of a public key, the algebraic surface X being defined on a finite field $F_q$ (where $q=p^r$ [p is a prime number and r is an extended degree]):

$$X(x, y, t) = \sum_{(i,j)} c_{ij}(t) x^i y^j$$

where $0 \leq i$, $0 \leq j$; at least (i,j) satisfies ($\geq 1$, $\geq 1$) and includes (1,0) and (0,0); the respective pieces of format data have different sets of combinations (i,j) of degrees; a parameter storing device configured to store parameters which are another part of the public key and which include a maximum degree d of two sections $D_1$ and $D_2$, the prime number p, and the extended degree r, the two sections $D_1$ and $D_2$ being a private key and corresponding to the fibration $X(x, y, t)=0$; a format data determining device configured to determine format data of the fibration $X(x, y, t)$ by selecting any one of the format data in the format data storing device at random; a first polynomial generating device configured to generate a random 1-variable polynomial $\lambda_x(t)$ having a degree less than the degree d and defined on $F_q$; a second polynomial generating device configured to generate 1-variable polynomial $\lambda_y(t)$ defined on $F_q$ and having a degree which can be divided by the 1-variable polynomial $\lambda_x(t)$ and is not more than the degree d; a third polynomial generating device configured to generate two 1-variable polynomials $u_x(t)$ and $v_x(t)$ expressing a variable x by a parameter t, having a degree not more than the degree d, and defined on $F_q$ on the basis of the 1-variable polynomial $\lambda_x(t)$ such that a difference between the polynomials $\{u_x(t)-v_x(t)\}$ is $\lambda_x(t)$ and a degree of at least one of the polynomials is d; a fourth polynomial generating device configured to generate two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t)-v_y(t)\}$ is $\lambda_y(t)$ and a degree of at least one of the polynomials is d; a section generating device configured to generate the two sections $D_1: (x, y, t)=(u_x(t), u_y(t), t)$ and $D_2: (x, y, t)=(v_x(t), v_y(t), t)$ on the basis of the 1-variable polynomials $u_x(t)$, $v_x(t)$, $u_y(t)$, and $v_y(t)$; a fifth polynomial generating device configured to generate a 1-variable polynomial $c_{ij}(t)$ (where $(i,j) \neq (0,0), (1,0)$) defined on $F_q$ and serving as a coefficient of a term except for a constant term $c_{00}(t)$ and a primary term $c_{10}(t)x$ in the determined format data at random; a sixth polynomial generating device configured to generate a 1-variable polynomial $c_{10}(t)$ defined on $F_q$ and serving as a coefficient of a primary term expressed by the following equation on the basis of the 1-variable polynomials $u_x(t)$, $v_x(t)$, $u_y(t)$, $v_y(t)$, and $c_{ij}(t)$:

$$c_{10}(t) = \frac{-\sum_{(i,j) \neq (0,0),(1,0)} c_{ij}(t)(u_x(t)^i u_y(t)^j - v_x(t)^i v_y(t)^j)}{u_x(t) - v_x(t)}$$

a seventh polynomial generating device configured to generate a 1-variable polynomial $c_{00}(t)$ serving as a constant term expressed by the following equation and defined on $F_q$ on the basis of the 1-variable polynomials $u_x(t)$, $v_x(t)$, $c_{ij}(t)$, and $c_{10}(t)$:

$$c_{00}(t) = -\sum_{(i,j) \neq (0,0)} c_{ij}(t) u_x(t)^i u_y(t)^j$$

and a fibration generating device configured to generate a fibration $X(x, y, t)$ of the algebraic surface X by setting the 1-variable polynomials $c_{ij}(t)$, $c_{10}(t)$, and $c_{00}(t)$ to the determined format data.

A second aspect of the present invention is a key generating apparatus which transforms the first aspect such that a primary term $c_{01}(t)y$ is used in place of a primary term $c_{10}(t)x$ in the first aspect.

The inventions according to the first and second aspects are realized as an apparatus. However, the inventions may be realized not only as the apparatus but also a program, a method, or a computer readable storage medium, as a matter of course.

In the first and second aspects, when a fibration $X(x, y, t)$ serving as a part of a public key is generated, limitation of a class of a public key to be generated can be removed by a configuration obtained by including $c_{ij} x^i y^j$ in a format of the fibration $X(x, y, t)$.

In this case, in order to realize the configuration including the term $c_{ij} x^i y^j$, the term $c_{ij} x^i y^j$ is set as a term except for a primary term or a constant term $c_{00}$. First, the term $c_{ij} x^i y^j$ is generated at random. Subsequently, on the basis of the term $c_{ij} x^i y^j$ and a 1-variable polynomial in two sections, a coefficient of the primary term is generated. Finally, the constant term coo is generated on the basis of the term $c_{ij} x^i y^j$ and the primary term.

According to this configuration, in the first and second aspects, when a private key includes two sections, limitation of the class of a public key to be generated can be removed. Therefore, an analyzing method based on the limited class can be prevented.

BRIEF DESCRIPTION OF THE SEVERAL VIEWS OF THE DRAWING

FIG. 3 is a pattern diagram of an algebraic surface type table according to the first embodiment;

DETAILED DESCRIPTION OF THE INVENTION

Embodiments of the present invention will be described below with reference to the accompanying drawings. Before the explanation, as an assumption of the embodiments, an algebraic surface and a section finding problem on the algebraic surface will be described below.

Assumption of Embodiments

An algebraic surface in each embodiment is defined as an algebraic surface having a two-dimensional degree of freedom in a set of solutions of simultaneous (algebraic) equations defined on a field K. For example, for five variables, simultaneous equations on the field K expressed by the following Equation (1) include three equations which bind the five variables and has a two-dimensional degree of freedom. For this reason, an algebraic surface is given.

$$f_1(x, y, z, v, w)$$

$$f_2(x, y, z, v, w)$$

$$f_3(x, y, z, v, w) \quad (1)$$

In particular, as shown in Equation (2), a space defined as a set of solutions of algebraic equations on the field K having three variables is an algebraic surface on the field K.

$$f(x, y, z)=0 \quad (2)$$

On the other hand, the algebraic curve is a curve of a one-dimensional degree of freedom in a set of solutions of the simultaneous (algebraic) equations defined on the field K. Therefore, the algebraic curve is defined as expressed in the following equation:

$$g(x, y)=0$$

In this embodiment, since only an algebraic surface which can be written by one equation as expressed by Equation (2) is considered, Equation (2) is handled like defined equations of the algebraic surface.

A field is a set in which addition, subtraction, multiplication, and division can be freely executed and corresponds to real, rational, and complex numbers. However, the field does not correspond to a set including an integer and a matrix which cannot be divided by a number except for 0.

Fields include a field called a finite field and constituted by finite-number elements. For example, for a prime number p, a modulo p residue class Z/pZ constitutes a field. Such a field is called a prime field and written as Fp or the like.

The finite field includes, in addition to the above field, a field $Fq(q=p^r)$ having elements the number of which is a power of a prime number. Reference symbol p is called a characteristic of a finite field Fq, and reference symbol r is called an extended degree. In this embodiment, among finite fields, only a prime field Fp is handled. In general, p of the prime field Fp is called a characteristic of the prime field Fp.

On the other hand, the present invention is similarly established by trivial modification of a general finite field. In a public-key cryptosystem, many messages are constituted on a finite field because the messages need to be embedded as digital data. For this reason, also in the embodiment, an algebraic surface defined on the finite field (prime field in the embodiment) Fp is handled.

Figure 1:
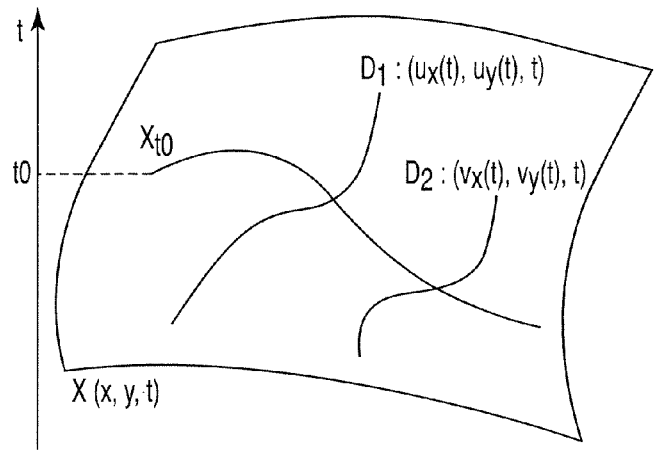
FIG. 1 is a pattern diagram for explaining an algebraic surface of each embodiment.

On an algebraic surface $f(x, y, z)=0$, as shown in FIG. 1, in general, a plurality of algebraic curves $D_1, D_2, X_{t0}, \ldots$ are present. The algebraic curves are called divisors on an algebraic surface. In general, a problem which calculates a (nontrivial) divisor when a definitional equation of the algebraic surface is given is a difficult problem which cannot be solved even in modern mathematics, and a general solution is not known except for a method of solving a solution problem of multidimensional multi-variable equation which is an NP problem and a primitive method such as a method using grobner base. In particular, in the present embodiment, an algebraic surface defined by a finite field is used. In this case, an algebraic surface defined by a finite field has divisor finding approaches the number of which is smaller than that of an algebraic surface defined by an infinite field (field consisting of infinite number of elements) such as a rational number field. For this reason, a problem which calculates factors on an algebraic surface defined by a finite field is a more difficult problem.

In the present embodiment, this problem is called a divisor finding problem on an algebraic surface or simply called a divisor finding problem, and a public-key cryptosystem which bases security on the divisor finding problem on an algebraic surface is constituted.

In an algebraic surface X: $f(x, y, z)=0$ on the field K, $$h(x, y, t)=0$$

is defined, and an algebraic surface of a format including a curve obtained by parameterizing x and y called sections by t $$(x, y, t)=(u_x(t), u_y(t), t)$$

is called a fibration of an algebraic surface X and expressed as Xt or the like. For descriptive convenience, in the following description, when it is apparent that an algebraic surface is a fibration, the algebraic surface is simply expressed by X.

An algebraic curve obtained by assigning an element t0 of the field K to the parameter t in the fibration of the algebraic surface X is called a fiber and expressed as $X_{t0}$. In this case, the fiber and the section are divisors of the algebraic surface $X_t$.

In general, when a fibration of an algebraic surface is given, a fiber corresponding to the fibration is immediately calculated (by assigning an element of the field to t). On the other hand, it is very difficult to calculate a section corresponding to a fibration. In this sense, the fiber is a trivial divisor, and the section is a nontrivial divisor.

A public-key cryptosystem to which the key generating scheme according to the present invention is applied especially bases security on, among divisor finding problems on an algebraic surface, a problem which calculates a section when the fibration $X_t$ of the algebraic surface X is given.

In order to find a section from a fibration, only methods obtained by procedures (i) to (iv) are known in modern mathematics.

(i) Sections $(u_x(t), u_y(t), t)$ is assumed by:

$$\deg u_x(t) \leq d, \deg u_y(t) \leq d$$

and, $u_x(t)$ and $u_y(t)$ are given by the following equations:

$$u_x(t) = \alpha_0 + \alpha_1 t + \ldots + \alpha_d t^d$$

$$u_y(t) = \beta_0 + \beta_1 t + \ldots + \beta_d t^d$$

(ii) $u_x(t)$ and $u_y(t)$ are assigned to $X(x, y, t)=0$ to obtain the following equation:

$$X(u_x(t), u_y(t), t) = \sum_i c_i t^i = 0$$

(iii) The left-hand side of the above equation is expanded to express a coefficient of $t^i$ by a function $c_i(\alpha_0, \ldots, \alpha_d, \beta_0, \ldots, \beta_d)$ of $\alpha_0, \ldots, \alpha_d, \beta_0, \ldots, \beta_d$ and the following simultaneous equations are set.

$$c_0(\alpha_0, \ldots, \alpha_d, \beta_0, \ldots, \beta_d) = 0$$
$$c_1(\alpha_0, \ldots, \alpha_d, \beta_0, \ldots, \beta_d) = 0$$
$$\vdots$$
$$c_{2d}(\alpha_0, \ldots, \alpha_d, \beta_0, \ldots, \beta_d) = 0$$

(iv) The simultaneous equations are solved.

First Embodiment (Outline)

Public keys of the present embodiment are four keys described below.

1. Characteristic p of prime field

2. Fibration of algebraic surface X on Fp: $X(x, y, t)=0$

3. Degree l of 1-variable irreducible polynomial $f(t)$ on Fp

4. Maximum degree d of polynomials $u_x(t)$, $u_y(t)$, $v_x(t)$, and $v_y(t)$ in section (serving as private key)

where l has a relationship expressed by the following equation (3) between the fibration $X(x, y, t)$ of the algebraic surface and the maximum degree d of the section:

$$(\deg_x X(x, y, t) + \deg_y X(x, y, t))d + \deg_t X(x, y, t) < l \qquad (3)$$

where $\deg_x X(x, y, t)$ is a degree (for example $\deg_x(x^3 y^2 t + xy^5 t^6) = 3$) when only x of $X(x, y, t)$ is considered as a variable. Reference symbols $\deg_y(X(x, y, t))$ and $\deg_t(X(x, y, t))$ are similar degrees.

Of the public keys, the characteristic p of the prime field and the maximum degree d of the section are also considered as parameters of security.

On the other hand, the private keys, as described below, are two sections $D_1$ and $D_2$ different from each other.

1. Section of the algebraic surface X on Fp: $D_1$: $(x, y, t) = (u_x(t), u_y(t), t)$ 2. Section of the algebraic surface X on Fp: $D_2$: $(x, y, t) = (v_x(t), v_y(t), t)$ A key generating method according to the present embodiment will be described below. In the key generating method, the sections $D_1$ and $D_2$ are selected at random, and the fibration X corresponding to the sections $D_1$ and $D_2$ is calculated. However, in order to simultaneously give two sections to a generated algebraic surface, the following device is required. The (fibration of) algebraic surface can be generally given as follows:

$$X(x, y, t) = \sum_{(i,j)} c_{ij}(t) x^i y^j$$

where $c_{ij}(t)$ is a 1-variable polynomial.

A characteristic p of a prime field is determined as a system parameter. Even if the characteristic p can be made small without compromising security. The sections $D_1$ and $D_2$ are given by the following equations:

$$D_1: (x, y, t) = (u_x(t), u_y(t), t),$$

$$D_2: (x, y, t) = (v_x(t), v_y(t), t)$$

Subsequently, these sections are assigned to the algebraic surface X to obtain the following two equations.

$$\sum_{(i,j)} c_{ij}(t) u_x(t)^i u_y(t)^j = 0$$

$$\sum_{(i,j)} c_{ij}(t) v_x(t)^i v_y(t)^j = 0$$

When the sides of one equation are subtracted from the sides of the other equation, common constant terms $c_{00}(t)$ are eliminated in both the equations, and Equation (4) is obtained:

$$c_{10}(t)(u_x(t) - v_x(t)) = -\sum_{(i,j) \neq (0,0),(1,0)} c_{ij}(t)(u_x(t)^i u_y(t)^j - v_x(t)^i v_y(t)^j) \qquad (4)$$

In this case, Relational Equation (5) is set:

$$u_x(t)^i u_y(t)^j - v_x(t)^i v_y(t)^j = (u_x(t)^i - v_x(t)^i) u_y(t)^j + v_x(t)^i (u_y(t)^j - v_y(t)^j) \qquad (5)$$

In order to generate $c_{10}(t)$ serving as a polynomial from Relational Equation (5), it is sufficient that the following equation be set. A notation "A|B" means that B is divided by A, i.e., that B is a multiple (multiple equation) of A.

$$u_x(t) - v_x(t) | u_y(t) - v_y(t)$$

This equation is apparent from Relational Equation (5) and the following two equations.

$$(u_x(t) - v_x(t)) | (u_x(t)^i - v_x(t)^i)$$

$$(u_y(t) - v_y(t)) | (u_y(t)^j - v_y(t)^j)$$

By using the above fact, key generation can be executed by an algorithm shown as follows.

First, two polynomials which satisfy $\lambda_x(t)|\lambda_y(t)$ are selected at random.

More specifically, in order to calculate such a combination of polynomials, for example, $\lambda_x(t)$ is given at random to calculate $\lambda_y(t)=c(t)\lambda_y(t)$ by a random polynomial c(t) equal to or smaller than the degree d-deg $\lambda_x(t)$, so that $\lambda_y(t)$ may be calculated.

$\lambda_x(t)=u_x(t)-v_x(t)$ and $\lambda_y(t)=u_y(t)-v_y(t)$ are set, a polynomial $v_x(t)$ is selected at random, and $u_x(t)=\lambda_x(t)+v_x(t)$ is calculated. Since the degrees of $\lambda_x(t)$ and $v_x(t)$ are equal to or smaller than d, the degree of $u_x(t)$ is also equal to or smaller than d.

Similarly, a polynomial $v_y(t)$ is selected at random to calculate $u_y(t)=\lambda_y(t)+v_y(t)$. As described above, since the degrees of $\lambda_y(t)$ and $v_y(t)$ are equal to or smaller than d, the degree of $u_y(t)$ is also equal to or smaller than d.

A constant term $c_{00}(t)$ and a coefficient $c_{ij}(t)((i,j)\neq(0,0),(1,0))$ except for a primary term $c_{10}(t)x$ are generated at random, and on the basis of the $u_x(t)$, $v_x(t)$, $u_y(t)$, $v_y(t)$, and Equation (4), the coefficient $c_{10}(t)$ of the primary term is calculated. Furthermore, the following Equation (6) is calculated to obtain the constant term $c_{00}(t)$:

$$c_{00}(t) = -\sum_{(i,j)\neq(0,0)} c_{ij}(t) u_x(t)^i u_y(t)^j \quad (6)$$

Concrete Configuration of First Embodiment

A concrete configuration of a key generating apparatus according to the first embodiment of the present invention and an algorithm of the configuration will be described below. In the following explanation, as examples to help understanding, concrete numerical values and equations are given. However, these numerical values and equations are only examples, and are not necessarily the numerical values and equations which are actually used and have sufficient security. This is applied to the following embodiments and variations. As the numerical values which are not necessarily the actually used numerical values, for example, a maximum degree d of a section or the like is given.

Figure 2:
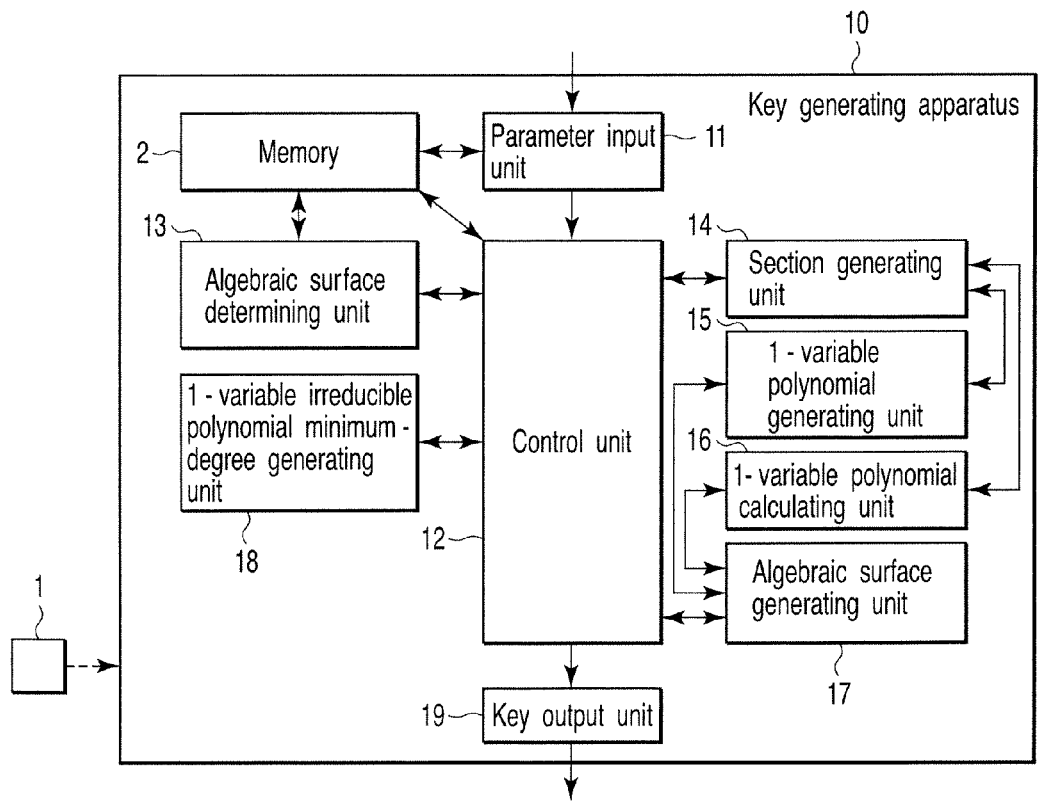
FIG. 2 is an entire block diagram of a key generating apparatus according to the first embodiment.

FIG. 2 is an entire block diagram of a key generating apparatus according to the first embodiment of the present invention. A key generating apparatus 10 can be executed by any one of a hardware configuration and a combination of a hardware configuration and software. As the software of the combination, a program which is installed from a network or a storage medium 1 in a computer of the corresponding apparatus to realize functions of the corresponding apparatus is used. This is also applied to apparatuses 10, 30, and 40 of the following embodiments.

The key generating apparatus 10, as shown in FIG. 2, includes a memory 2, a parameter input unit 11, a control unit 12, an algebraic surface determining unit 13, a section generating unit 14, a 1-variable polynomial generating unit 15, a 1-variable polynomial calculating unit 16, an algebraic surface generating unit 17, a 1-variable irreducible polynomial minimum-degree generating unit 18, and a key output unit 19. The memory (hardware resource) 2 is a storage device from/to which input data, output data, in-process data, and the like from the respective units 11 to 19 can be appropriately read/written. Arrows between the memory 2 and the units 14 to 19 are omitted in FIG. 2.

In this case, the parameter input unit 11 has a function that temporarily stores externally input parameters p and d in the memory 2 and transmits the parameters p and d in the memory 2 to the control unit 12.

Figure 4:
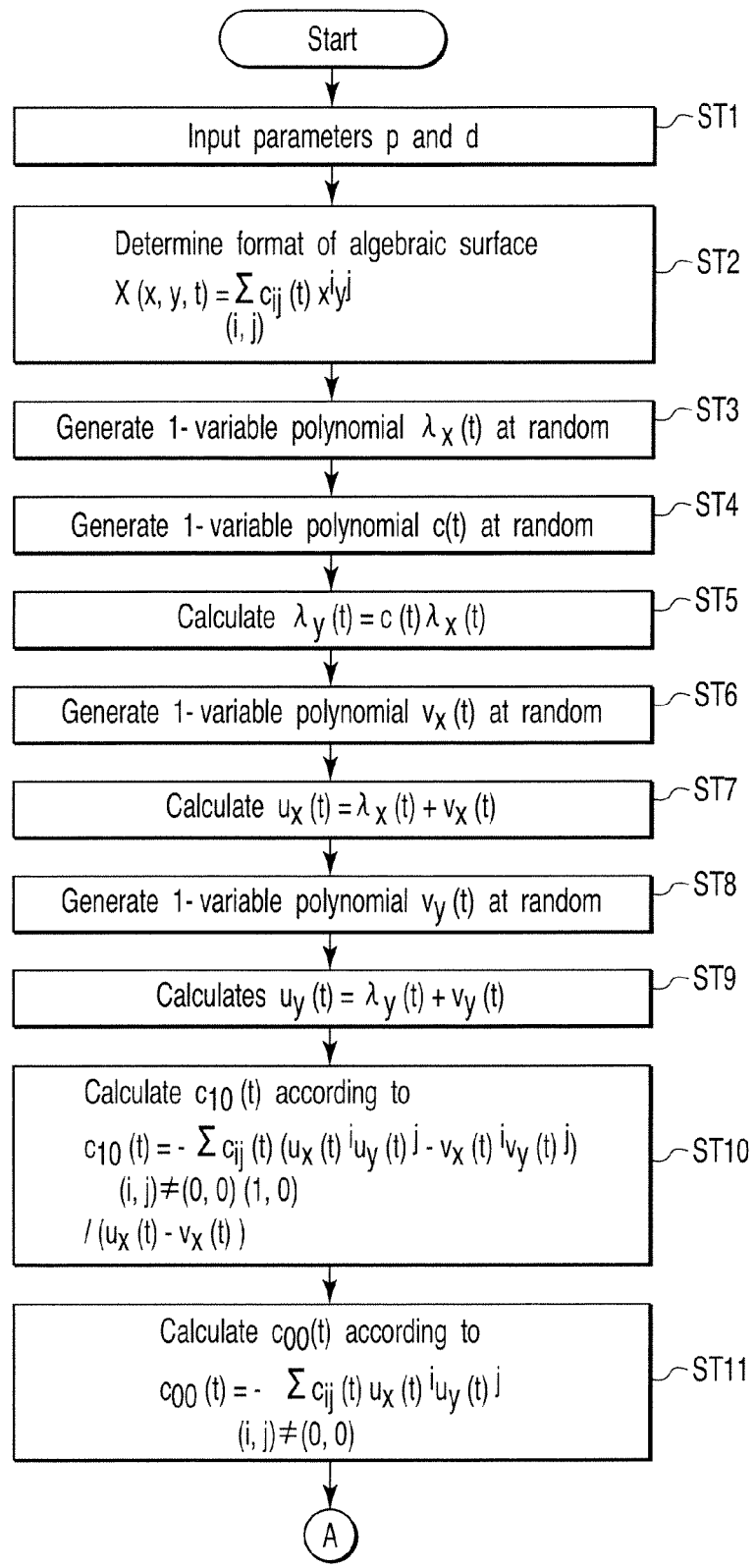
FIGS. 4 and 5 are flowcharts of the embodiment.
Figure 5:
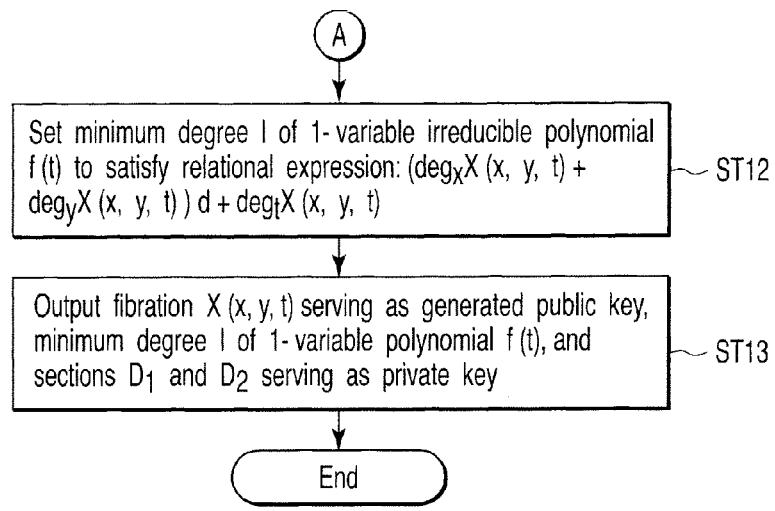

The control unit 12 has a function that controls the units 11, 13 to 14, and 17 to 19 to execute operations shown in FIGS. 4 and 5 (will be described later).

The algebraic surface determining unit 13 is controlled by the control unit 12 and has a function that selects one of format data in an algebraic surface table T (to be described later) stored in the memory 2 at random to determine format data of a fibration X(x, Y, t).

In this case, as methods of determining an algebraic surface, as shown in FIG. 3, a first method using an algebraic surface format table T and a second method which determines a total degree $d_c$ related to variables x and y and determines and generates a term having a coefficient except for 0 in this range can be appropriately used. In this embodiment, the first method is used.

With respect to the first method, the algebraic surface format table T, for example, is obtained such that a total degree $d_c$ related to the variables x and y and candidate definitional equations (format data) of the algebraic surface are stored in the memory 2 in association with each other. The format data express format data candidates of the fibration X(x, y, t) as a polynomial of $x^i y^j$ having a 1-variable polynomial $c_{ij}(t)$ of t as a coefficient.

$$X(x, y, t) = \sum_{(i,j)} c_{ij}(t) x^i y^j$$

where $0 \leq i$ and $0 \leq j$, and at least, (i,j) includes ($\geq 1, \geq 1$) and (1,0) and (0,0). The respective format data have different sets of combinations (i,j) of degrees. The set of combinations (i,j) of degrees to be used corresponds to a term except for 0.

As the format data, arbitrary data expressing a polynomial of $x^i y^j$ having the 1-variable polynomial $c_{ij}(t)$ of t as a coefficient can be used.

With respect to the second method, the number of terms each having a coefficient except for 0 is described in a program in advance, input as a parameter, or stored in the memory 2 in advance to make it possible to effectively determine a term having a coefficient except for 0. This is because, the terms each having a coefficient except for 0 are limited to make the form of a difinitional equation of an algebraic surface simple, and public-key size can be reduced.

The section generating unit 14 is controlled by the control unit 12 and has a function that controls the 1-variable polynomial generating unit 15 and the 1-variable polynomial calculating unit 16 to obtain 1-variable polynomials $u_x(t)$, $v_x(t)$, $u_y(t)$, and $v_y(t)$ and a function that generates two sections $D_1$: (x, y, t)=($u_x(t)$, $u_y(t)$, t) and $D_2$: (x, y, t)=($v_x(t)$, $v_y(t)$, t) on the basis of the 1-variable polynomials $u_x(t)$, $v_x(t)$, $u_y(t)$, and $v_y(t)$.

The 1-variable polynomial generating unit 15 is controlled by the section generating unit 14 or the algebraic surface generating unit 17 and has a function that generates a random 1-variable polynomial on the basis of the designated prime number p and the designated degree d. At this time, the 1-variable polynomial generating unit 15 generates coefficients of terms having degrees smaller than the degree d in the range of 0 to p−1 as an element of the finite field Fp at random. More specifically, 1-variable polynomials $\lambda_x(t)$ and $\lambda_y(t)$ are defined on the finite field Fp. In addition to this, other 1-variable polynomials $u_x(t)$, $v_x(t)$, $u_y(t)$, $v_y(t)$, $c_{ij}(t)$, $c_{10}(t)$, and $c_{00}(t)$ are defined on the finite field Fp.

More specifically, when the 1-variable polynomial generating unit 15 is controlled by the section generating unit 14, the 1-variable polynomial generating unit 15 has a function of generating a random 1-variable polynomial $\lambda_x(t)$ of a degree smaller than the degree d and a function of generating a 1-variable polynomial $\lambda_y(t)$ having degree smaller than the degree d which can be divided by the 1-variable polynomial $\lambda_x(t)$.

When the 1-variable polynomial generating unit 15 is controlled by the algebraic surface generating unit 17, the 1-variable polynomial generating unit 15 has a function that generates a 1-variable polynomial $c_{ij}(t)$ (where $(i,j) \neq (0,0), (1,0)$) which is a coefficient of a term except for the constant term $c_{00}(t)$ and the primary term $c_{10}(t)x$ in the determined format data at random.

The 1-variable polynomial calculating unit 16 is controlled by the section generating unit 14 or the algebraic surface generating unit 17 and has a function that executes addition, subtraction, multiplication, and division of a 1-variable polynomial on the finite field Fp on the basis of a received operation instruction.

More specifically, when the 1-variable polynomial calculating unit 16 is controlled by the section generating unit 14, the 1-variable polynomial calculating unit 16 has a function that generates two 1-variable polynomials $u_x(t)$ and $v_x(t)$ expressing a variable x by a parameter t and having degrees smaller than the degree d on the basis of the 1-variable polynomial $\lambda_x(t)$ such that a difference therebetween $\{u_x(t)-v_x(t)\}$ is given by $\lambda_x(t)$ and the degree of at least one of the polynomials is d, and a function that generates two 1-variable polynomials $u_y(t)$ and $v_y(t)$ expressing a variable y by the parameter t and having degrees equal to or smaller than the degree d on the basis of the 1-variable polynomial $\lambda_y(t)$ such that a difference therebetween $\{u_y(t)-v_y(t)\}$ is given by $\lambda_y(t)$ and the degree of at least one of the polynomials is d.

When the 1-variable polynomial calculating unit 16 is controlled by the algebraic surface generating unit 17, the 1-variable polynomial calculating unit 16 has a function that generates a 1-variable polynomial $c_{10}(t)$ which is a coefficient of a primary term expressed by Equation (4) on the basis of the 1-variable polynomials $u_x(t)$, $v_x(t)$, $u_y(t)$, $v_y(t)$, and $c_{ij}(t)$ and a function that generates a 1-variable polynomial $c_{00}(t)$ which is a constant term expressed by Equation (6) on the basis of the 1-variable polynomials $u_x(t)$, $u_y(t)$, $c_{ij}(t)$, and $c_{10}(t)$.

The algebraic surface generating unit 17 is controlled by the control unit 12 and has a function that controls the 1-variable polynomial generating unit 15 and the 1-variable polynomial calculating unit 16 to obtain the 1-variable polynomials $c_{ij}(t)$, $c_{10}(t)$, and $c_{00}(t)$ and a function that sets the obtained 1-variable polynomials $c_{ij}(t)$, $c_{10}(t)$, and $c_{00}(t)$ in the determined format data to generate a fibration $X(x, y, t)$ of the algebraic surface X.

The 1-variable irreducible polynomial minimum-degree generating unit 18 is controlled by the control unit 12 and has a function that determines a minimum degree l of a random 1-variable polynomial for encryption on the basis of degrees $\deg_x X(x, y, t)$, $\deg_y X(x, y, t)$, and $\deg_t X(x, y, t)$ of the variables x, y, and t in the generated fibration $X(x, y, t)$ such that the degrees are equal to or larger than $(\deg X(x, y, t) + \deg_y X(x, y, t))d + \deg_t X(x, y, t)$.

The key output unit 19 has a function that receives the algebraic surface X serving as a public key, the minimum degree l of a 1-variable irreducible polynomial, and the sections $D_1$ and $D_2$ serving as private keys from the control unit 12 and outputs the key data X, l, $D_1$, and $D_2$ to the outside of the key generating apparatus 10.

Next, the operation of the key generating apparatus configured as above will be described with reference to the flowcharts in FIGS. 4 and 5.

The key generating apparatus 10 starts processing when the characteristic p of a prime field serving as a parameter for key generation and the maximum degree d of the sections are input to the parameter input unit 11. In this case, for descriptive convenience, it is assumed that p=2 and d=3 are input (ST1).

The parameter input unit 11 temporarily stores the input parameters p and d in the memory 2 to transmit the parameters p and d in the memory 2 to the control unit 12. When the control unit 12 receives the parameters p and d, the control unit 12 outputs a designation to the algebraic surface determining unit 13 to output a format of the algebraic surface.

In response to this designation, the algebraic surface determining unit 13 selects any one of the format data in the algebraic surface format table T stored in the memory 2 at random to determine a format of the fibration $X(x, y, t)$ of the algebraic surface X (ST2). In this case, it is assumed that $X(x, y, t) = x^5 + y^5 + c_{21}(t) x^2 y + c_{10}(t) x + c_{00}(t)$ is determined as the format.

The algebraic surface determining unit 13 outputs the determined format data of the determined algebraic surface to the control unit 12. The control unit 12 transmits the format data of the algebraic surface and the parameters p and d to the section generating unit 14.

The section generating unit 14 starts generation of a section on the basis of the format data of the algebraic surface and the parameters p and d. First, the section generating unit 14 transmits the prime number p and a value smaller than the maximum degree d of the section to the 1-variable polynomial generating unit 15 to request generation of a 1-variable polynomial.

The 1-variable polynomial generating unit 15 generates a 1-variable polynomial $\lambda_x(t)$ ($=t^2+1$) smaller than the degree d on the basis of the request (ST3). At this time, the 1-variable polynomial generating unit 15 generates coefficients of the terms smaller than the degree d as an element of the finite field Fp in the range of 0 to p−1 at random. In this manner, the 1-variable polynomial $\lambda_x(t)$ is obtained. The 1-variable polynomial generating unit 15 outputs the obtained $\lambda_x(t)$ to the section generating unit 14.

In the section generating unit 14, as described above, the prime number p and the degree d-deg $\lambda_x(t)$ are transmitted to the 1-variable polynomial generating unit 15 to request generation of a 1-variable polynomial.

The 1-variable polynomial generating unit 15, as in step ST3, generates a 1-variable polynomial $c(t)$ ($=t$) of the degree d-deg $\lambda_x(t)$ at random (ST4). The obtained $c(t)$ is output to the section generating unit 14.

The section generating unit 14 transmits the $c(t)$ and $\lambda_x(t)$ to the 1-variable polynomial calculating unit 16. The 1-variable polynomial calculating unit 16 calculates $\lambda_y(t) = c(t)\lambda_x(t)$ on the basis of $c(t)$ and $\lambda_x(t)$ (ST5). At this time, the 1-variable polynomial calculating unit 16 performs addition, subtraction, multiplication, and division of a 1-variable polynomial on the finite field Fp to obtain $\lambda_y(t)$. The obtained $\lambda_y(t)$ ($=t^3+t$) is transmitted to the section generating unit 14.

Upon receiving $\lambda_y(t)$, the section generating unit 14, as described above, requests the 1-variable polynomial generating unit 15 to generate a 1-variable polynomial. The 1-variable polynomial generating unit 15 generates a d-degree 1-variable polynomial $v_x(t)$ at random (ST6) to output the obtained $v_x(t)$ to the section generating unit 14.

The section generating unit 14 transmits $\lambda_x(t)$ ($=t^2+1$) and $v_x(t)$ ($=t^3+1$) to the 1-variable polynomial calculating unit 16.

The 1-variable polynomial calculating unit 16 calculates $u_x(t)$ ($=\lambda_x(t)+v_x(t)=t^3+t^2$) on the basis of $\lambda_x(t)$ and $v_x(t)$ (ST7) to transmit the obtained $u_x(t)$ to the section generating unit 14.

Similarly, the section generating unit 14 causes the 1-variable polynomial generating unit 15 and the 1-variable polynomial calculating unit 16 to generate $v_y(t)$ ($=t^3+t^2+1$) (ST8) to calculate $u_y$ ($=\lambda_y(t)+v_y(t)=t^2+t+1$) (ST9).

Thereafter, the section generating unit 14 generates two sections $D_1$ and $D_2$ on the basis of the obtained $u_x(t)$, $u_y(t)$, $v_x(t)$, and $v_y(t)$. Note that $D_1$: (x, y, t)=($u_x(t)$, $u_y(t)$, t) and $D_2$: (x, y, t)=($v_x(t)$, $v_y(t)$, t) are satisfied. The sections $D_1$ and $D_2$ are transmitted from the section generating unit 14 to the control unit 12.

When the control unit 12 receives the sections $D_1$ and $D_2$, the control unit 12 inputs the sections $D_1$ and $D_2$ to the algebraic surface generating unit 17 to form an algebraic surface having the sections $D_1$ and $D_2$.

Upon receiving the sections $D_1$ and $D_2$, the algebraic surface generating unit 17 transmits a designation to generate $c_{21}(t)$ serving as a coefficient except for $c_{10}(t)$ and $c_{00}(t)$ at random to the 1-variable polynomial generating unit 15.

The 1-variable polynomial generating unit 15 generates a coefficient $c_{21}(t)$ at random in response to the designation. In this case, the degree is a multiple of d such as 2d ($c_{21}(t)=t^6+t^4+t^3+t+1$). The obtained $c_{21}(t)$ is returned from the 1-variable polynomial generating unit 15 to the algebraic surface generating unit 17.

The algebraic surface generating unit 17 transmits a repeated operation instruction to the 1-variable polynomial calculating unit 16 from the input sections $D_1$ and $D_2$ and the coefficient $c_{21}(t)$ generated at random on the basis of Equation (4) to calculate a coefficient $c_{10}(t)$ of a primary term (ST10). In this example, $c_{10}(t)=t^8+t^7+t^6+t^5+t^4+t^3+t^2$ is calculated.

Furthermore, the algebraic surface generating unit 17 transmits a repeated operation instruction to the 1-variable polynomial calculating unit 16 from $c_{10}(t)$, $c_{21}(t)$, $u_x(t)$, $u_y(t)$, $v_x(t)$, and $v_y(t)$ on the basis of Equation (6) to calculate a constant term $c_{00}(t)$ (ST11). In this example, $c_{00}(t)=t^{15}+t^{13}+t^{12}+t^{11}+t^9+t^8+t^5+t^4+t^2+t+1$ is calculated.

Generation of the coefficients of the terms required for the format data of the fibration X(x, y, t) is completed.

The algebraic surface generating unit 17 sets the 1-variable polynomials $c_{21}(t)$, $c_{10}(t)$, and $c_{00}(t)$ as the format data determined in step ST3 to generate a fibration X(x, y, t) of the algebraic surface X. The fibration X(x, y, t) is transmitted from the algebraic surface generating unit 17 to the control unit 12.

With the above processing, the fibration:

$$X(x, y, t): x^5+y^5+(t^6+t^4+t^3+t+1)x^2y+ (t^8+t^7+t^6+t^5+t^4+t^3+t^2)x+t^{15}+t^{13}+t^{12}+t^{11}+t^9+t^8+ t^5+t^4+t^2+t+1=0 \quad (7)$$

of the algebraic surface X serving as a public key, and two sections serving as private keys:

$$D_1: (u_x(t), u_y(t), t)\ (t^3+t^2, t^2+t+1, t)$$

$$D_2: (v_x(t), v_y(t), t)\ (t^3+1, t^3+t^2+1, t) \quad (8)$$

are obtained.

In the control unit 12, in order to generate a degree l which satisfies Equation (3), the algebraic surface X(x, y, t) and a maximum degree d of the sections are input to the 1-variable irreducible polynomial minimum-degree generating unit 18 to designate generation of the degree l.

The 1-variable irreducible polynomial minimum-degree generating unit 18 calculates the left-hand side ((5+5)·3+15=45) of Equation (3) on the basis of the algebraic surface X(x, y, t) and the maximum degree d of the sections. The 1-variable irreducible polynomial minimum-degree generating unit 18 selects a value larger than the calculated value (=45) at random to obtain the right-hand side of Equation (3). In this case, for example, 46 is selected as a value. The 1-variable irreducible polynomial minimum-degree generating unit 18 outputs the selected value (46) as the degree l (=46) (ST12) to the control unit 12.

The control unit 12 transmits the algebraic surface X serving as a public key, the minimum degree l of the 1-variable irreducible polynomial, and the sections $D_1$ and $D_2$ serving as private keys to the key output unit 19.

The key output unit 19 outputs the key data X, l, $D_1$, and $D_2$ to the outside of the key generating apparatus 10 (ST13).

As described above, according to the embodiment, when the fibration X(x, y, t) serving as a part of the public key is generated, a term $c_{ij}x^iy^j$ is included in the format of the fibration X(x, y, t) to make it possible to remove limitation of the class of the public key to be generated.

In order to realize the configuration including the term $c_{ij}x^iy^j$, the term $c_{ij}x^iy^j$ is set to be a term except for a primary term and a constant term $c_{00}$. First, the term $c_{ij}x^iy^j$ is generated at random. Subsequently, a coefficient of the primary term is generated based on the term $c_{ij}x^iy^j$ and the 1-variable polynomial in the two sections. Finally, the constant term coo is generated on the basis of the term $c_{ij}x^iy^j$ and the primary term.

With this configuration, in the embodiment, when a private key is constituted by two sections, limitation of the class of the public key to be generated can be removed. Therefore, a decrypting method based on the limited class can be prevented.

Variation of First Embodiment

Several variations of the embodiment will be described below.

A first variation is a variation related to a definition field of an algebraic surface. In the embodiment, a prime field is used as the definition field of the algebraic surface. However, in addition to this, a general finite field $F_q$ ($q=p^r$) may be a definition field of the algebraic surface. This is because the finite field, like a prime field, can define the four operations except for division by 0, and a value is uniquely determined. The finite field is constituted by a prime field and (finite degree) expanded field thereof. The expanded field is defined as an element of a linear space of an extended degree r on the prime field Fp. The expanded field is reduced by a primitive polynomial of the expanded field to define operation. The reduction is an operation similar to reduction (division) by p in a prime field.

According to the first variation, when a finite field is used as a definition field of an algebraic surface, the number of types of keys which can be generated increases due to the introduction of the expanded field to contribute to further improvement on security. When the first variation is executed, an extended degree r may be further input to a part to which the prime number p is input in the embodiment. In the first variation, all internal operations must be performed on the expanded field Fq. Since only the four operations are used in an algorithm of key generation, the internal operations of the embodiment are directly satisfied.

The second variation is a variation in which, in step ST1, any one or both (to be referred to as "and/or" hereinafter) of the input prime number p and the maximum degree d of the sections are fixed as system parameters. A user can generate a secure key under the appropriate parameters in the key generating apparatus 10 without minding security level by fixing the parameters p and/or d. The "appropriate parameters" mean parameters having sufficiently high security levels.

Figure 6:
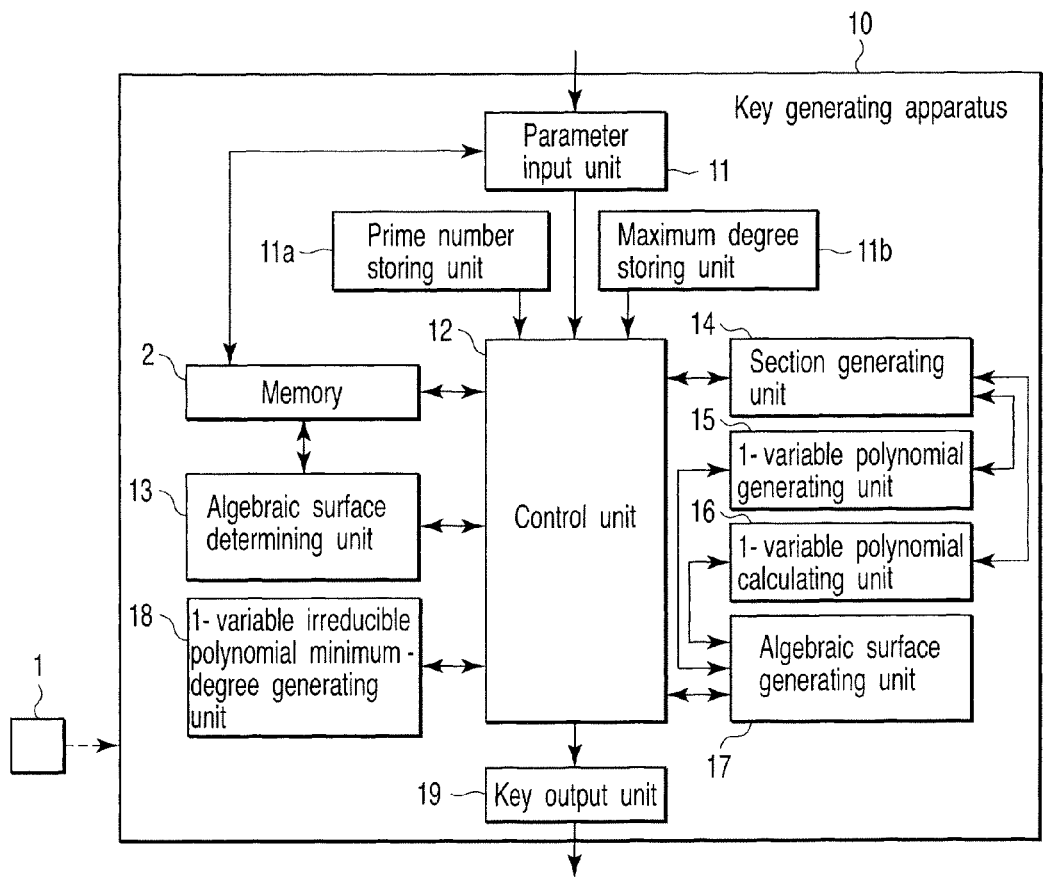
FIG. 6 is an entire block diagram of a second variation of the embodiment.
Figure 7:
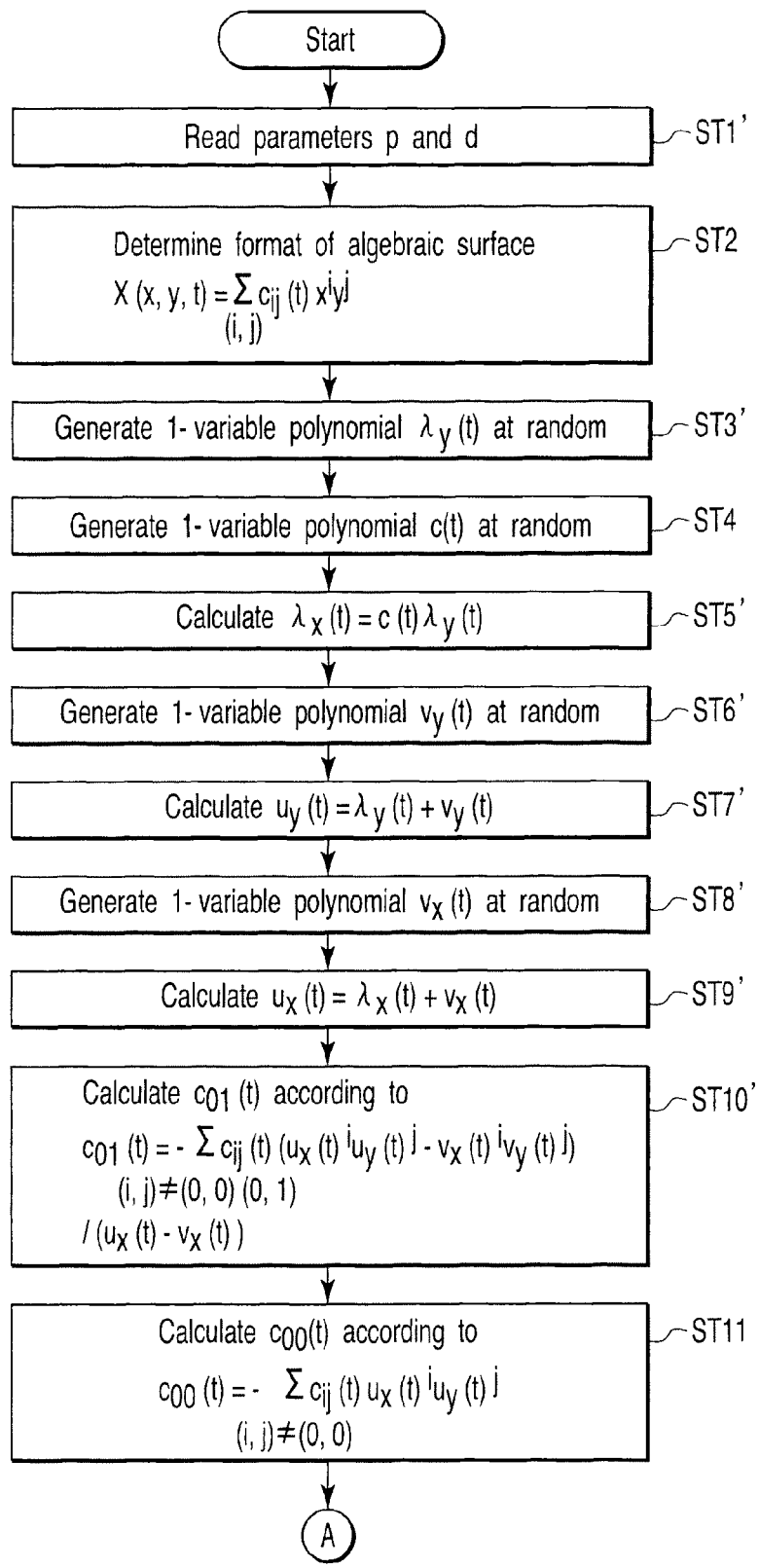
FIG. 7 is a flowchart of the second variation of the embodiment.
Figure 8:
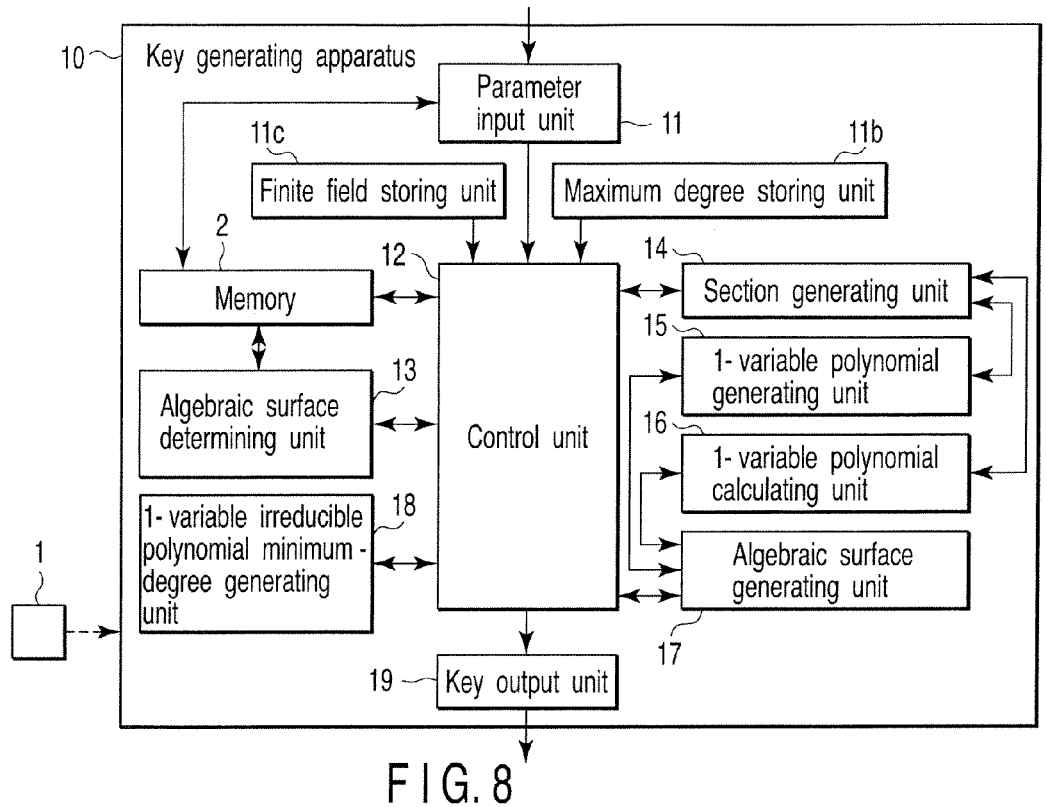
FIG. 8 is an entire block diagram of first and second variations of the embodiment.

In order to realize the second variation, as shown in FIG. 6, a prime number storing unit 11a and/or a section maximum degree storing unit 11b are further arranged, and in a key-generation algorithm, in place of step ST1 in which these parameters p and d are input, as shown in FIG. 7, the step of reading values in the storing units 11a and 11b may be inserted. The same conditions described above are established for the extended degree r described in the first variation. In this case, in place of the prime number storing unit 11a, as shown in FIG. 8, a finite field storing unit 11c which stores the prime number p and the extended degree r may be arranged.

A third variation is a variation related to a constant term $c_{00}(t)$ except for 0 and a primary term $c_{10}(t)x$. In this embodiment, the constant term $c_{00}(t)$ and primary term $c_{10}(t)x$ are used. As shown in FIG. 7, not only these terms but also a constant term $c_{00}(t)$ and a primary term $c_{01}(t)y$ may be used. This is because when an algebraic surface can be calculated from sections, any one of $c_{10}(t)$ and $c_{01}(t)y$ may be used as the primary term. In the embodiment, when the primary term $c_{10}(t)x$ is used, a coefficient $c_{ij}(t)$ of a term except for $c_{00}(t)$ and $c_{10}(t)x$ is determined at random, and $c_{00}(t)$ and $c_{10}(t)x$ are calculated from the coefficient $c_{ij}(t)$. Similarly, when the primary term $c_{01}(t)y$ is used, a coefficient $c_{ij}(t)$ of a term except for $c_{00}(t)$ and $c_{01}(t)y$ is determined at random, and $c_{00}(t)$ and $c_{01}(t)y$ may be calculated from the coefficient $c_{ij}(t)$. In the calculation of $c_{00}(t)$ and $c_{01}(t)$, $\lambda_x(t)$ in the embodiment is replaced with $\lambda_y(t)$, and, accordingly, $u_x(t)$ and $v_x(t)$ are replaced with $u_y(t)$ and $v_y(t)$, respectively.

A fourth variation is a variation in which, in a key generating process, a process of calculating a minimum degree l of a 1-variable irreducible polynomial f(t) is executed outside the apparatus. A main part of the key generating process is a process of generating an algebraic surface having higher security from two sections. For this reason, a process of calculating the minimum degree l can be executed outside the key generating apparatus 10 on the basis of the algebraic surface X(x, y, t) and the parameter d. When the 1-variable irreducible polynomial minimum-degree generating unit 18 is arranged outside the key generating apparatus 10, the configuration of the key generating apparatus 10 can be simplified. In addition to this, the 1-variable irreducible polynomial minimum-degree generating unit 18 is formed as a module to make it possible to realize packaging having higher security.

Second Embodiment

A public key and a private key in this embodiment are the same as those in the first embodiment.

In the second embodiment, in order to assure security of an algebraic surface in the future, it is inspected whether an algebraic surface obtained in the first embodiment belongs to a special class to avoid an algebraic surface belonging to the special class.

Supplementary, there are algebraic surfaces called an elliptic surface and a rational surface which belong to a special class. The algebraic surface belonging to the special class has well known characteristics. Therefore, the algebraic surface belonging to the special class, although an efficient solution of a section finding problem has not been found, has the following easily-analyzable characteristics. That is, when one section is calculated, the other section is relatively easily calculated. For this reason, the security is poor. Therefore, in order to assure the security in the future, an easy-analyzable algebraic surface belonging to the special class is desirably avoided.

With respect to the generated algebraic surface, a quantity called a genus required to determine whether an algebraic surface belongs to a special class is defined. First, a fibration of an algebraic surface is expressed by:

$$X(x, y, t) = \sum_{i,j} c_{ij}(t) x^i y^j$$

Furthermore, a curve obtained when this fibration is regarded as an algebraic curve on an algebraic function field K (=Fp(t)) including x and y as variables is expressed by C(x, y)=0 or C. The genus is defined with respect to the curve C and expressed by g(C). When a total degree of C related to the variables x and y is represented by $d_c$, the genus g(C) is expressed by:

$$g(C) = \frac{(d_c - 1)(d_c - 2)}{2} - \sum \frac{\sigma(P)}{2}$$

where P expresses a singular point of C, and a sum of the second term of the right-hand side covers all the singular points of C. The singular point is a point at which a differential coefficient on an algebraic curve C(x, y)=0 is not uniquely determined. A crossing point and a cusp are singular points. The crossing point corresponds to two differential coefficients, and the cusp corresponds to two or more differential coefficients. In Equation (9), σ(P) denotes a quantity which measures singularity of each singular point. For example, the quantity is defined in reference Iidaka Shigeru, Ueno Kenji, Namikawa Yukihiko, "Dekaruto no seishin to daisuukika" (Descartes' Spirit and Algebra), Nippon Hyoron-sha Co., Ltd., 1993 p. 23. However, as is easily known from the definition of σ(P), even though a computer is used, σ(P) cannot be easily calculated.

On the other hand, when the size (p in this embodiment) of a finite field or a maximum degree e of $c_{ij}(t)$ are sufficiently large, a probability that an algebraic curve (non-singular algebraic curve) being free from a singular point can be obtained is sufficiently high when an arbitrary algebraic curve is extracted for the following reason. A total degree of x and y of a difinitional equation of C:

$$C(x, y) = X(x, y, t) = \sum_{i,j} c_{ij}(t) x^i y^j$$

is represented by $d_c$. An arbitrary $d_c$-degree polynomial will be considered without considering a condition in which a fibration has two given sections. At this time, the number of terms appearing in C(x, y) is given by:

$$N_d := \binom{2 + d_c}{2} = \frac{(2 + d_c)(1 + d_c)}{2}$$

More specifically, the $d_c$-degree polynomial is entirely parametrized by $N_d$ coefficients $\{c_{ij}(t)\}$. The $\{c_{ij}(t)\}$ is considered as an $N_{dc}$-degree vector. In the following explanation, the subscript "c" of the subscript "d" is properly expressed by using an underline_ in the subscript. For example, $N_{d_c}$ is also expressed as $N_{d\_c}$.

When $\{c_{ij}(t)\}$ is considered as the $N_{d\_c}$-degree vector, and the entire $\{c_{ij}(t)\}$ constitutes an $N_{d\_c}$-dimensional vector space on K.

Furthermore, one vector $\{c_{ij}(t)\}$ is multiplied by a constant except for 0 (b(t)-fold), and the obtained $d_c$-degree polynomial $b(t)C(x, y)$ is essentially the same as an original polynomial $C(x, y)$. For this reason, a set constituting an entire $d_c$-degree homogeneous polynomial is divided by a constant-fold function, and the obtained set is represented by $H_{d\_c}$. More specifically, $H_{d\_c}=\{$3-variable $d_c$-degree polynomial on K$\}$/(constant-fold). In this case, by a correspondence given by:

$$C(x, y) = \sum_{i,j} c_{ij}(t)x^i y^j \mapsto \{c_{ij}(t)\}$$

each $C(x, y)$ corresponds to a point on $N_{d\_c}-1$-dimensional projective space $$\mathbb{P}_K^{N_{d_c}-1}$$

on K. Furthermore, since it is understood that this correspondence is a one-to-one correspondence, as a manifold, an isomorphism given by:

$$H_{d_c} \cong \mathbb{P}_K^{N_{d_c}-1}$$

is shown. In particular, $$\dim_K H_{d_c} = N_{d_c} - 1 = \frac{(2+d_c)(1+d_c)}{2} - 1$$

is satisfied.

In the $H_{d\_c}$, a subset constituted by a polynomial having a singular point is represented by $H_{d_c}^{sing}$. At this time, $H_{d_c}^{sing}$ is defined by one equation in the manifold $H_{d\_c}$, and the following equation is established:

$$\dim_K H_{d_c}^{sing} = \dim_K H_{d_c} - 1 = \frac{(2+d_c)(1+d_c)}{2} - 2$$

(Mukai Shigeru, "Moduli Riron 1" (Moduli theory 1), Iwanami Koza, Gendaisugaku no Tenkai, p. 147). The above equation shows that almost all polynomials in $H_{d\_c}$ define non-singular curves. This is because, when the upper limit of the degree of the coefficient $\{c_{ij}(t)\}$ is represented by e, #K=$p^{e+1}$ is satisfied.

Therefore, a probability that a curve arbitrarily selected from $H_{d\_c}$ is a singular curve is given by:

$$\frac{(p^{e+1})^{N_{d_c}-1}}{(p^{e+1})^{N_{d_c}}} = \frac{1}{p^{e+1}}$$

This probability becomes an extremely small number when p or e is large. In an algebraic surface generated by the key generating apparatus 10, a degree e of $c_{ij}(t)$ is very large. For this reason, even though p is small, a non-singular algebraic surface is obtained with sufficiently high probability. Therefore, Equation (10) which approximately calculates a genus g(C) is established with considerably high probability:

$$g(C) = \frac{(d_c-1)(d_c-2)}{2} \quad (10)$$

It is known that a genus g and an algebraic surface (elliptic surface and rational surface) belonging to a special class has the following relationships:

$g=0 \Rightarrow$(rational surface)

$g=1 \Rightarrow$(elliptic surface)  (11)

Therefore, in order to generate a secure key, an algebraic surface which satisfies $g \geq 2$ is desirably used.

Concrete Configuration of Second Embodiment

Figure 9:
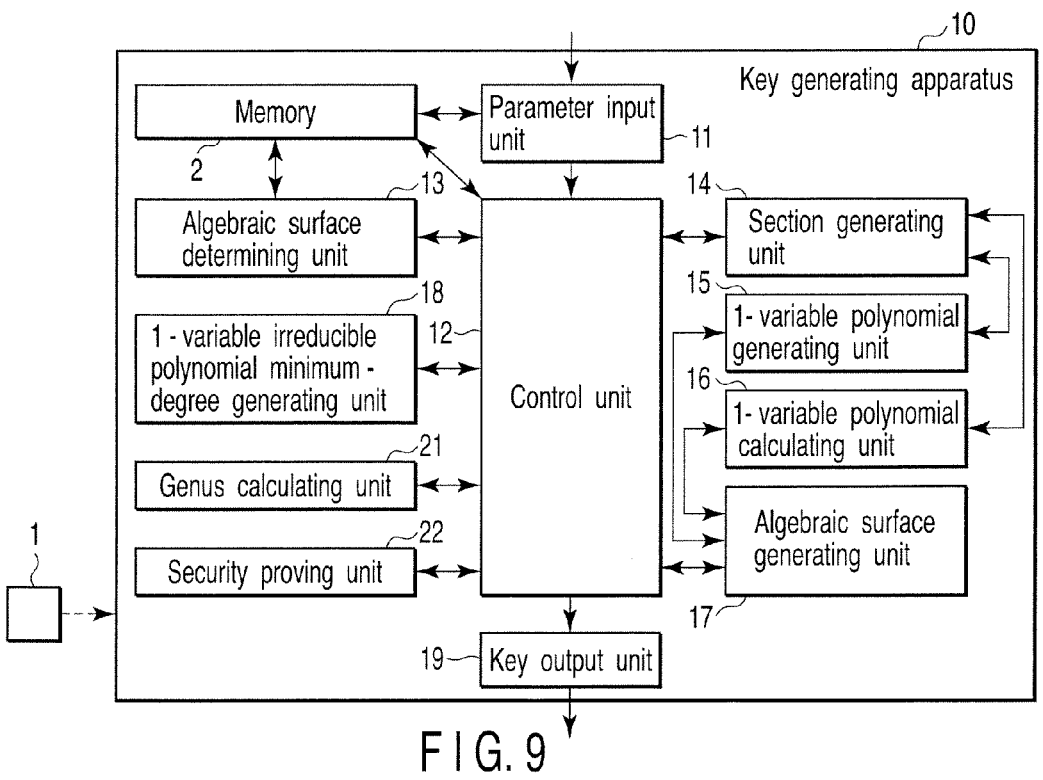
FIG. 9 is an entire block diagram of a key generating apparatus according to a second embodiment.

FIG. 9 is an entire block diagram of a key generating apparatus according to a second embodiment of the present invention. The same reference numerals as in FIG. 2 denote the same parts as in FIG. 9, and a detailed description thereof omitted. Only different parts will be mainly described. In the following embodiments, explanations of overlapping parts are omitted.

The present embodiment is a modification example of the first embodiment, and a genus calculating unit 21 and a security proving unit 22 are added to the apparatus in order to avoid algebraic surfaces belonging to a special class in advance.

In this case, the genus calculating unit 21 has a function that calculates a genus g(C) obtained when, on the basis of a total degree $d_c=\deg_x X(x, y, t)+\deg_y X(x, y, t)$ related to variables x y in a fibration X(x, y, t) generated by the units 11 to 17, the fibration X(x, y, t) is regarded as an algebraic curve C(x, y) on a 1-variable function field $F_p(t)$ on the basis of a computational expression $g(C)=(d_c-1)(d_c-2)/2$, and a function that transmits the calculated genus g(C) to the control unit 12.

The security proving unit 22 has a function that determines whether the genus g(C) received from the control unit 12 is less than 2, a function that transmits an error signal to the control unit 12 when the genus g(C) is less than 2 as the determination result such that processes from the algebraic surface determining unit 13 to the genus calculating unit 21 are re-executed, and a function that transmits a signal notifying the control unit 12 of security to the control unit 12 when the genus g(C) is 2 or more as the determination result.

Figure 10:
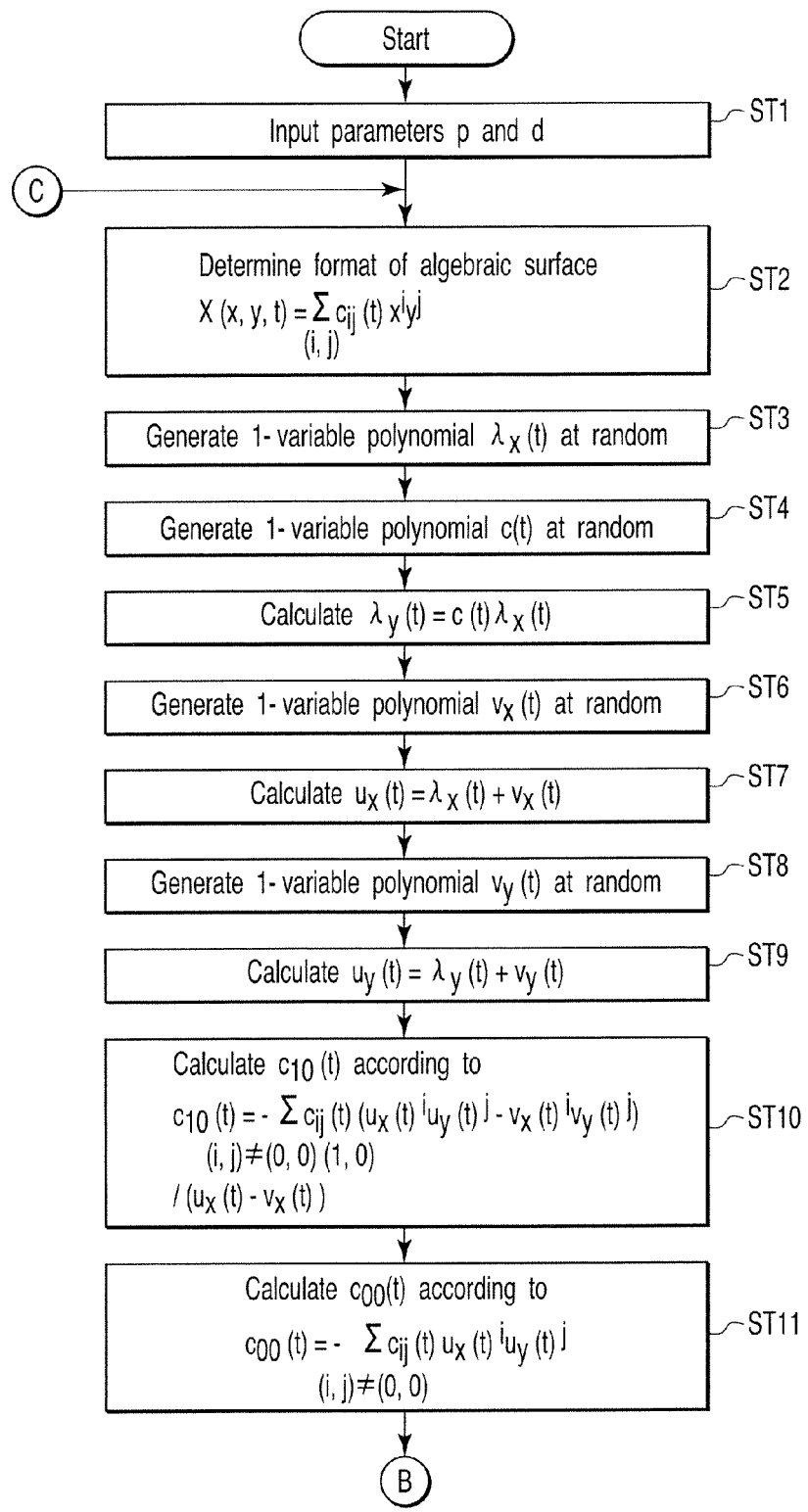
FIGS. 10 and 11 are flowcharts of the embodiment.
Figure 11:
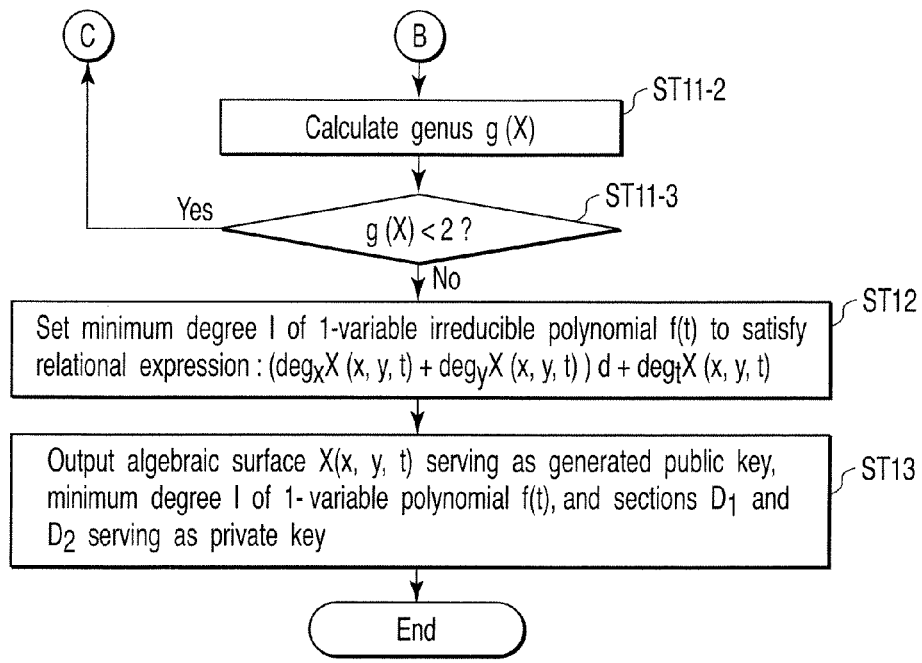

An operation of the key generating apparatus structured as described above will described below with reference to the flowcharts in FIGS. 10 and 11.

In the key generating apparatus 10, as described above, processes in steps ST1 to ST11 are executed. The control unit 12 transmits information (prime number p in this embodiment) of a finite field obtained in the processes and an algebraic surface X(x, y, t) to the genus calculating unit 21.

The genus calculating unit 21 approximately calculates a genus g(X) on the basis of the information of the finite field, the algebraic surface X(x, y, t), and Equation (10) (ST11-2). More specifically, a total degree $d_c$ obtained when the algebraic surface is considered as a polynomial related to x and y is calculated. This calculation is executed such that a total degree related to x and y of the respective terms of the algebraic surface is calculated and the maximum value of the total degree is represented by $d_c$. The maximum value $d_c$ is assigned to Equation (10) to calculate the genus g(X). The obtained genus g(X) is transmitted to the control unit 12.

The control unit 12 transmits the genus g(X) to the security proving unit 22. The security proving unit 22 determines whether the genus g(X) is less than 2 (g(X)<2) (ST11-3). When the genus g(X) is less than 2, a fibration X is an algebraic surface (elliptic surface or rational surface) belonging to a special class. For this reason, security in the future cannot be assured.

Therefore, the security proving unit 22 transmits an error signal to the control unit 12 when the genus g(X) is less than 2 such that the processes in step ST2 to step ST11-3 are re-executed. When the control unit 12 receives the error signal, the control unit 12 returns to step ST2 to generate another key and controls the algebraic surface determining unit 13.

On the other hand, when the result in step ST11-3 is NO (g(X)≧2), the fibration X is not an algebraic surface belonging to a special class. For this reason, security can be assured. Therefore, the security proving unit 22 transmits a signal which notifies the control unit 12 of security to the control unit 12 when the result is NO (g(X)≧2).

When the control unit 12 receives a signal which notifies the control unit 12 of security, the control unit 12 transmits a designation to calculate a maximum degree l of the 1-variable irreducible polynomial f(t) to the 1-variable irreducible polynomial minimum-degree generating unit 18. As in the first embodiment, the processes in steps ST12 and ST13 are executed.

As described above, according to the embodiment, in addition to the effect of the first embodiment, the genus g(C) obtained when the generated fibration X(x, y, t) is regarded as the algebraic curve C(x, y) is calculated. When the obtained genus g(C) is less than 2, the control returns to step ST2 to generate another fibration X(x, y, t), so that an algebraic surface belonging to an easily analyzable class can be avoided from being used. Therefore, security in the future can be assured.

Variation of Second Embodiment

Figure 12:
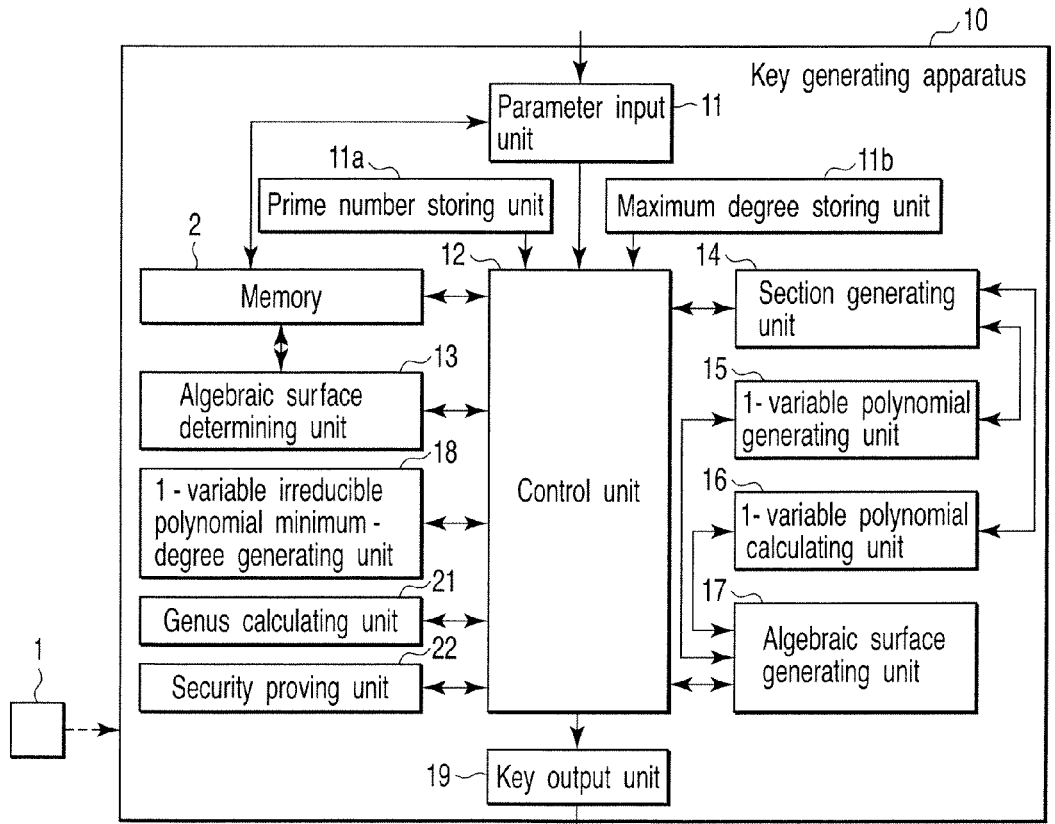
FIG. 12 is an entire block diagram of a second variation of the embodiment.
Figure 13:
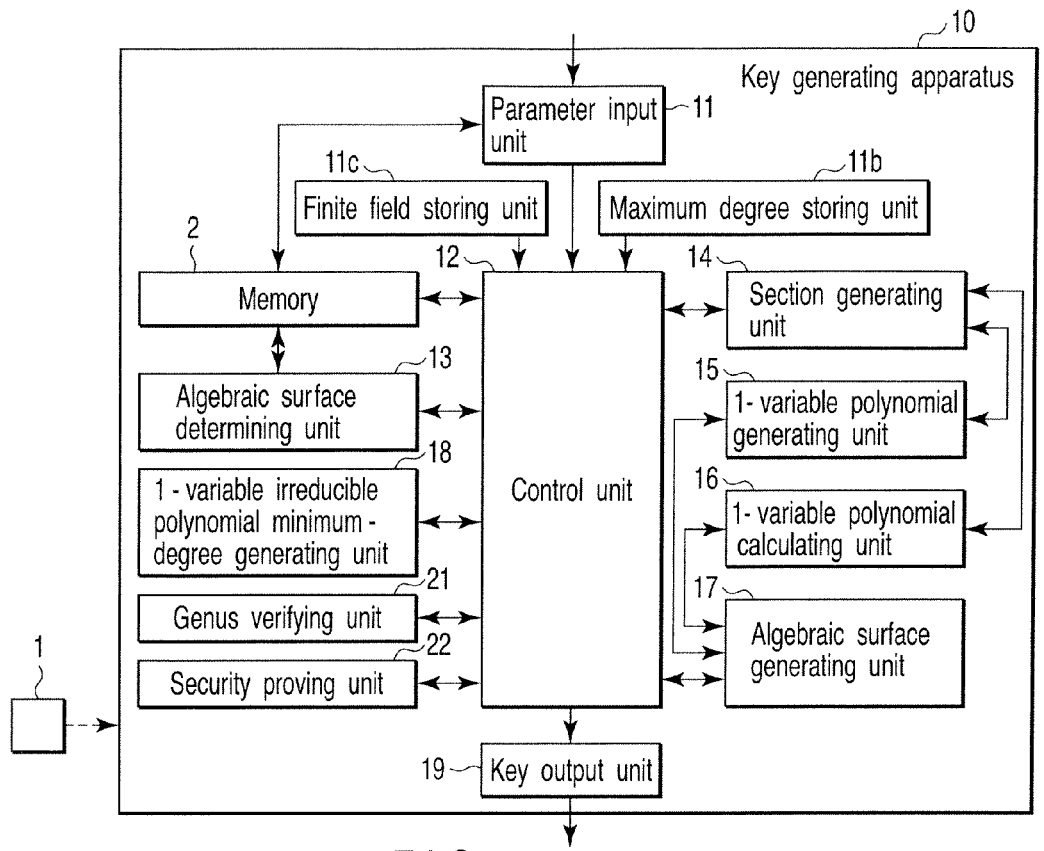
FIG. 13 is an entire block diagram of first and second variations of the embodiment.

The first to fourth variations described above, as shown in FIGS. 12 and 13, are established in this embodiment.

A fifth variation is a variation in which an algebraic surface is narrowed down by an algebraic surface determining unit 13 on the basis of a total degree $d_c$ of the algebraic surface. In the fifth variation, a genus calculating unit 21 and a security proving unit 22 (steps ST11-2 and ST11-3) are omitted, and an algebraic surface belonging to a special class is excluded by the algebraic surface determining unit 13 in advance. The genus calculating unit 21 and the security proving unit 22 (steps ST11-2 and ST11-3) may not be omitted.

In this case, the algebraic surface determining unit 13, more specifically, excludes an algebraic surface belonging to a special class on the basis of the following relationships obtained from Equations (10) and (11):

$d_c=1, 2 \Rightarrow g=0$ (rational surface)

$d_c=3 \Rightarrow g=0$ (elliptic surface)

Figure 14:
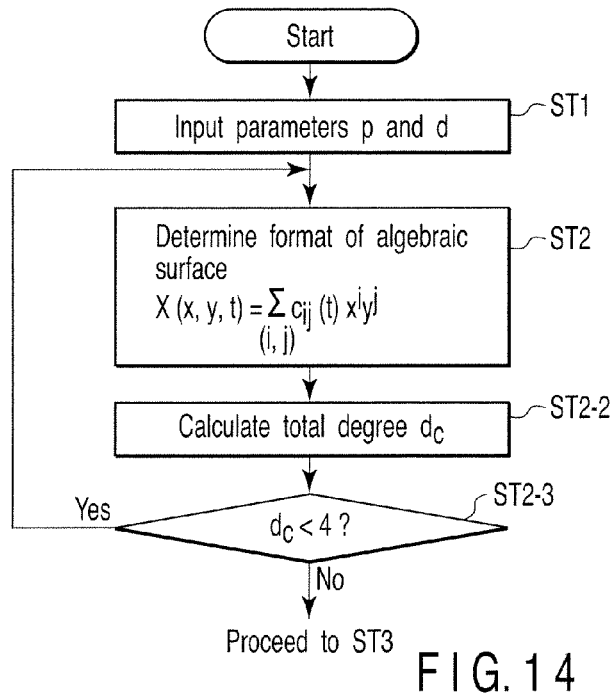
FIG. 14 is a flowchart of a fifth variation of the embodiment.

According to the relationships, an algebraic surface having a total degree $d_c$ of 3 or less is reliably an algebraic surface belonging to a special class. On the other hand, an algebraic surface having a total degree of 4 or more is not an algebraic surface belonging to a special class with high probability. Therefore, in the algebraic surface determining unit 13, as shown in FIG. 14, a total degree $d_c=\deg_x X(x, y, t)+\deg_y X(x, y, t)$ related to variables x and y of the fibration X(x, y, t) in format data selected in step ST2 is calculated (ST2-2) to determine whether the total degree $d_c$ is less than 4 (ST2-3).

The algebraic surface determining unit 13 returns to step ST2 when the total degree $d_c$ is less than 4 as a result of the determination, and the algebraic surface determining unit 13 selects format data different from the selected format data again. With respect to the re-selected format data, the processes in step ST2-2 to step ST2-3 are executed. When the total degree $d_c$ is 4 or more as the result of the determination in step ST2-3, the algebraic surface determining unit 13 shifts to step ST3, as a matter of course.

More specifically, the algebraic surface determining unit 13 performs filtering by the processes in step ST2-2 to step ST2-3 to prevent a format of an algebraic surface having a total degree $d_c$ of 3 or less from being output. In this manner, the algebraic surface determining unit 13 does not return to step ST2 after step ST11. For this reason, efficiency of key generation can be improved.

In the fifth variation, the determining method which determines that an algebraic surface is secure when the total degree $d_c$ is 4 or more and which determines that the algebraic surface is not secure when the total degree $d_c$ is less than 4 is used in not only a part which narrows down an algebraic surface in the algebraic surface determining unit 13 but also in place of determination by using the genus g(X) in the security proving unit 22 in the second embodiment. This is because both the determination using the genus g(X) and the determination using the total degree $d_c$ are a determining method to prove the security of an obtained algebraic surface, and, as is apparent from Equation (10), only the total degree $d_c$ is used as a parameter. Therefore, the configuration of the security proving unit 22 is changed into a configuration in which determination is performed by the total degree $d_c$, so that the genus calculating unit 21 which is necessary in the second embodiment is not required, and vice versa. More specifically, in place of security proving of the algebraic surface by the genus g(X) calculated by Equation (10) in the second embodiment, the determining method using only the total degree $d_c$ described in the fifth variation may be used. In this manner, the genus calculating unit 21 is omitted, and time for a calculating operation is shortened.

As a modification of the fifth variation, when an algebraic surface is narrowed down in the algebraic surface determining unit 13, the genus calculating unit 21 and the security proving unit 22 are used to make it possible to apply a configuration which executes determination by the genus g(X). In the determination by the algebraic surface determining unit 13 and the determination performed after the algebraic surface X(x, y, t) is generated, any one of the determining method using the genus g(X) and the determining method using the total degree $d_c$ may be used, or the determining methods may be alternately used. As another modification, when the genus g(X) is to be calculated, the genus g(X) may be calculated on the basis of Equation (9).

Third Embodiment

An embodiment related to an encrypting/decrypting process which can use a key generated by the first or second embodiment of the present invention will be described below. The key generated according to the first or second embodiment can also be applied to an encrypting/decrypting process described in Jpn. Pat. Appln. KOKAI Publication No. 2005-331656. An embodiment related to another encrypting/decrypting process will be described here. Before an explanation of the third embodiment, security proof will be described as an assumption.

It is considered that security of a public key cryptosystem is based on the difficulty of a problem which is used as the basis of security as in the problem of factorization into prime factors and the discrete logarithm problem. However, this concept does not describe a strict result relationship therebetween.

In order to describe the strict result relationship, attack by a decryptor and security to be achieved must be modelized, and it must be proved that the achievement of the security under the modelized attack is equivalent to the difficulty of the problem which is the basis of security. More specifically, it is security proof that a strict result relationship between the security of a public-key cryptosystem and the difficulty of the problem constituting the public-key cryptosystem is described.

In the security proof, models of attacks are roughly classified into a passive attack (chosen plaintext attack [CPA]) and an active attack (chosen cipher attack [CCA]).

The passive attack is an attack that repeatedly encrypts a plaintext by using a public key to extract information from an obtained encrypted text. The active attack is an attack which adaptively inputs an encrypted text to a decrypting device to extract information of a private key from an obtained decryption result. In this sense, the CCA is stronger than CPA.

In the security proof, two standards are proposed to security to be achieved.

The first standard is that two plaintexts cannot be distinguished (indistinguishable [IND]) after the plaintexts are encrypted. The second standard is that, even though an encrypted text is calculated in polynomial time, an encrypted text related to an original plaintext cannot be created (non-malleable [NM]).

Therefore, the standards of the security proof are expressed as IND-CPA and NM-CCA by a combination of a model of an attack by an adversary and security to be achieved. The IND-CPA means that information which distinguishes an original plaintext from two encrypted texts under the passive attack cannot be obtained. The NM-CCA means that information related to an original plaintext cannot be obtained from a result obtained by operating an encrypted text under the active attack. At present, a standard considered as the strongest security is IND-CCA.

On the other hand, a method of converting a public-key cryptosystem in which the security is proved in the sense of the IND-CPA into a public-key cryptosystem algorithm which can be provably secure in the sense of the IND-CCA is known (for example, see Japanese Patent No. 3306384). Therefore, when a public-key cryptosystem the security of which is proved in the sense of the IND-CPA can be constituted, the public-key cryptosystem can be converted into a public-key cryptosystem which can be provably secure in the sense of the IND-CCA.

Subsequently, the third embodiment will be described below. The following embodiments are premised on the section finding problem, and can prove security on the basis of a randomized polynomial determining problem related to the section finding problem.

(Outline)

Public keys of the embodiment are the following five keys.

1. Characteristic P of prime field
2. Fibration of algebraic surface X on $F_p$: $X(x, y, t)=0$
3. Degree 1 of 1-variable irreducible polynomial f(t) on $F_p$ where $$\deg_t X(x, y, t) < l \tag{12}$$

4. Maximum degree d of polynomials $u_x(t)$, $u_y(t)$, $v_x(t)$, and $v_y(t)$ in section (serving as private key)
5. Maximum index e of x and y of 3-variable polynomial p(x, y, t)

Private key includes two different sections $D_1$ and $D_2$.

1. Section of algebraic surface X on $F_p$: $D_1$: $(x, y, t)=(u_x(t), u_y(t), t)$
2. Section of algebraic surface X on $F_p$: $D_2$: $(x, y, t)=(v_x(t), v_y(t), t)$ These values can be easily calculated by the key generating method described above.

An outline of an encrypting process will be described below. In the encrypting process, a message (to be referred to as a plaintext hereinafter) to be encrypted is divided into blocks to obtain:

$$m = m_0 \| m_1 \| \ldots \| m_{l-1}$$

and, the blocks are embedded as coefficients of a plaintext polynomial m(t) as described in the following equation (plaintext embedding process).

$$m(t) = m_{l-1} t^{l-1} + \ldots + m_1 t + m_0$$

In this case, in order to apply m(t) as a polynomial on $F_p$, each $m_i$ ($0 \le i \le l-1$) must be set such that the $m_i$ is an element of $F_p$. More specifically, the plaintext m is divided on the basis of a bit length of p to satisfy the following condition:

$$0 \le m_i \le p-1$$

The plaintext m is an integer. For example, the plaintext is structured such that a character code sequence expressing a message is reread into an integer.

A random polynomial p(x, y, t) and q(x, y, t) on $F_p$ are determined at random. At this time, p(x, y, t) is determined to satisfy the following conditions (13) and (14):

$$\alpha > \deg_x X(x, y, t)$$

$$\beta > \deg_y X(x, y, t)$$

for the indexes $\alpha$ and $\beta$, a term $x^\alpha y^\beta$ is included] (13)

$$(\deg_x p(x, y, t) + \deg_y p(x, y, t))d + \deg_t p(x, y, t) < l \tag{14}$$

In this expression, it is assumed that degrees related to x, y, and t of the polynomials are expressed by $\deg_x$, $\deg_y$, and $\deg_t$. Furthermore, q(x, y, t) is determined to satisfy the following condition (15):

$$\deg_t q(x, y, t) < l \tag{15}$$

An l-degree irreducible polynomial f(t) of having one random variable on $F_p$ is determined. The irreducible polynomial is a polynomial which cannot be factorized any more. It is known that the irreducibility of a 1-variable polynomial on a finite field can be easily determined. An encrypted text F(x, y, t) is calculated by the following Equation (16) from the above equations m(t), p(x, y , t), q(x, y, t), and f(t) and a fibration X(x, y, t) of the algebraic surface X serving as a public key:

$$F(x, y, t) = m(t) + f(t)p(x, y, t) + X(x, y, t)q(x, y, t) \qquad (16)$$

A receiver who receives an encrypted text F(x, y, t) performs decryption by using her/his own private keys $D_1$ and $D_2$ as follows. First, the sections $D_1$ and $D_2$ are assigned to the encrypted text F(x, y, t). In this case, when the sections $D_1$ and $D_2$ are assigned to the algebraic surface X(x, y, t), by $X(u_x(t), u_y(t), t) = 0$, $X(v_x(t), v_y(t), t) = 0$, the following two equations $h_1(t)$ and $h_2(t)$ are calculated:

$$h_1(t) = F(u_x(t), u_y(t), t) = m(t) + f(t)p(u_x(t), u_y(t), t)$$

$$h_2(t) = F(v_x(t), v_y(t), t) = m(t) + f(t)p(v_x(t), v_y(t), t)$$

The two equations are subtracted from each other to calculate the following Equation (17).

$$h_1(t) - h_2(t) = f(t)\{p(u_x(t), u_y(t), t) - p(v_x(t), v_y(t), t)\} \qquad (17)$$

Next, $h_1(t) - h_2(t)$ is factorized to determine a factor having a maximum degree as f(t). In this case, in order to give the factor having the maximum degree by f(t), when the degree of f(t) is given by l, it is necessary and sufficient that p(x, y , t) is selected to satisfy Condition (18)

$$\deg(p(u_x(t), u_y(t), t) - p(v_x(t), v_y(t), t)) < l \qquad (18)$$

For this purpose, the p(x, y , t) must be selected to satisfy both Conditions (19).

$$\deg(p(u_x(t), u_y(t), t)) < l$$

$$\deg(p(v_x(t), v_y(t), t)) < l \qquad (19)$$

However, since sections are concealed from a transmitter, the degree l of f(t) is set to be sufficiently large, and a maximum value d of the degrees of polynomials $u_x(t)$, $u_y(t)$, $v_x(t)$, and $v_y(t)$ serving as elements of the sections is disclosed as a public key. More specifically, when p(x, y , t) is determined, it is sufficient that only Conditional Expression (14) is satisfied. Since the factorization of 1-variable polynomial is easy, the factorization of $h_1(t) - h_2(t)$ can be performed within sufficiently effective time. When $_1(t)$ is divided by obtained f(t), (it is noted that a degree of m(t) is equal to or smaller than a degree l of f(t)), a plaintext polynomial m(t) is obtained from the following relationship:

$$h_1(t) = m(t) + f(t)p(u_x(t), u_y(t), t)$$

A plaintext m can be obtained from the obtained plaintext polynomial m(t) by a reverse process of the plaintext embedding process. In this case, it must be specially mentioned that m(t) is uniquely determined as a residual. If m(t) is not uniquely determined, a plurality of candidates of the plaintext polynomial m(t) are present, and it is difficult to specify a true plaintext polynomial. The reason why m(t) is uniquely determined is that, since 1-variable polynomial ring F[t] including $h_1(t)$ satisfies the theorem of division like an integer, a quotient and a residual obtained by dividing a 1-variable polynomial by a 1-variable polynomial are uniquely determined. It is known that the theorem of division is not satisfied in a polynomial having two or more variables.

Subsequently, when the algorithm of the embodiment assumes that a randomizing polynomial determining problem (will be described later) is difficult, it will be explained that the cryptosystem is provably secure in the sense of the IND-CPA. A decryption algorithm fails when the following equation:

$$\{p(u_x(t), u_y(t), t) - p(v_x(t), v_y(t), t)\} = 0$$

is satisfied in Equation (17). However, this failure occurs only in a probability which is negligible to a public key e.

[Proposition 1] A probability that Equation (20):

$$p(u_x(t), u_y(t), t) = p(v_x(t), v_y(t), t) \qquad (20)$$

is satisfied for a fibration X(x, y, t) of an algebraic surface defined a finite field $F_p$ having at least two different sections:

$$(x, y, t) = \begin{cases} (u_x(t), u_y(t), t) \\ (v_x(t), v_y(t), t) \end{cases}$$

and a maximum value e of an index related to x and y of a 3-variable polynomial p(x, y , t) is $1/p^{e+1}$.

[Proof 1] It is assumed that $u_x(t) \neq v_x(t)$ is satisfied in different sections $(u_x(t), u_y(t), t)$ and $(v_x(t), v_y(t), t)$ held by X(x, y, t). If $u_x(t) = v_x(t)$ is satisfied, $u_y(t) \neq v_y(t)$ is satisfied, and the following discussion can be similarly developed on the assumption that $u_y(t) \neq v_y(t)$ is satisfied.

It is assumed that p(x, y , t) which takes the maximum value e of the index in x satisfying Equation (20) is present. At this time, p(x, y , t) + g(x) does not satisfy Equation (20) for a 1-variable polynomial g(x) ($\neq 0$) having an arbitrary degree of (e−1) or less on $F_p$. This is because, if Equation (20) is satisfied, $$g(u_x(t)) = g(v_x(t))$$

is satisfied, an infinite number of solutions are present when the finite field $F_p$ is expanded to an infinite field, and $u_x(t) = v_x(t)$ depends on the equation. The equation generated as described above does not equal to a polynomial obtained by the same means from another p(x, y , t) which satisfies Equation (20) at all. In fact, it is assumed that for other $p_1(x, y, t)$ and $p_2(x, y, t)$ and 1-variable polynomials $g_1(x)$ and $g_2(x)$ which satisfy Equation (20), the following equation is satisfied:

$$p_1(x, y, t) + g_1(x) = p_2(x, y, t) + g_2(x) \qquad (21)$$

At this time, the following equation is satisfied:

$$p_1(x, y, t) - p_2(x, y, t) = g_2(x) - g_1(x)$$

In this case, when $g_1(x) = g_2(x)$ is satisfied, the equation conflicts because $p_1(x, y, t) = p_2(x, y, t)$. Therefore, $g_1(x) \neq g_2(x)$ is satisfied. When $g(x) = g_2(x) - g_1(x)$ is satisfied, due to the property of $p_1(x, y, t) - p_2(x, y, t)$, the following equation is satisfied:

$$g(u_x(t)) = g(v_x(t))$$

For this reason, $u_x(t) = v_x(t)$ depends on the equation. Therefore, there is no combination between $(p_1(x, y, t)g_1(t))$ and $(p_2(x, y, t), g_2(t))$ which are different from each other and satisfy Equation (21). When p(x, y, t) takes a maximum value of an index at y, the proof is directly satisfied by changing roles of x and y.

For this reason, at least $p^{e+1}$ polynomials which do not satisfy Equation (20) can be associated with each other without overlapping for the 3-variable polynomial p(x, y , t) on one $F_p[x,y,t]$ which satisfy Equation (20). Therefore, p(x, y, t) which satisfies Equation (20) occurs in a probability of $1/p^{e+1}$ at most.

The security of an algebraic surface cryptosystem depends on a randomizing polynomial determining problem related to the algebraic surface cryptosystem.

[Definition 1] Randomizing Polynomial Determining Problem Related to Algebraic Surface Cryptosystem When a fibration X(x, y, t)=0 and a natural number l of an algebraic surface having two different sections each having a degree equal to or smaller than the degree d defined on $F_p$ are given, a problem that determines whether a 3-variable polynomial A(x, y, t) belongs to a set S:

$$S(X, l, d) = \{Y(x, y, t) \mid \exists\, p(x, y, t), q(x, y, t) (\in F_p[x, y, t]),$$
$$p(x, y, t) : satisfies condition (13)(14) q(x, y, t):$$
$$satisfies condition (15) \exists\, f(t) (\in F_p[t]) : irreducible,$$
$$\deg f \geq l\, Y(x, y, t) = f(t)p(x, y, t) + X(x, y, t)q(x, y, t)\}$$

is called a randomizing polynomial determining problem related to an algebraic surface cryptosystem. When it is apparent that the problem belongs to the algebraic surface cryptosystem, the problem is simply called a randomizing polynomial determining problem.

The randomizing polynomial determining problem is a problem that determines whether, when a fibration X(x, y, t) of an algebraic surface having two different sections each having a degree equal to or smaller than the degree d and a minimum degree l of an irreducible polynomial f(t) are given, the given polynomial g(x, y, t) can be written in the form of Expression (22):

$$f(t)p(x, y, t) + X(x, y, t)q(x, y, t) \qquad (22)$$

Assume that the polynomial g(x, y, t) can be written in the form of Expression (22) by two or more writing methods. In this case, an attacker (person who solves a problem) may find only one of the plurality of writing methods. Accordingly, the randomizing polynomial determining problem becomes easy. However, the problem does not become easy as long as p(x, y, t) satisfies Conditions (13) and (14) and q(x, y, t) satisfies Condition (15), and the polynomial can be uniquely written as follows.

[Proposition 2] When the polynomial g(x, y, t) can be written as follows:

$$f(t)p(x, y, t) + X(x, y, t)q(x, y, t)$$

by a fibration X(x, y, t)=0 of an algebraic surface having two different sections each having a degree equal to or smaller than the degree d, a minimum degree l of the irreducible polynomial f(t), p(x, y , t) which satisfies Conditions (13) and (14), and q(x, y, t) which satisfies Condition (15), the writing method is uniquely determined.

[Proof 2] It is assumed that there is g(x, y, t) which can be written in two expressions as in the assumption.

$$g(x, y, t) = f_1(t)p_1(x, y, t) + X(x, y, t)q_1(x, y, t) = f_2(t)p_2(x, y, t) + X(x, y, t)q_2(x, y, t) \qquad (23)$$

According to the assumption, X(x, y, t) is an algebraic surface having two different sections each having a degree equal to or smaller than the degree d. For this reason, when the sections are given by $(u_x(t), u_y(t), t)$ and $(v_x(t), v_y(t), t)$, the following relationship is satisfied:

$$\frac{g(u_x(t), u_y(t), t) -}{g(v_x(t), v_y(t), t)} = f_1(t)(p_1(u_x(t), u_y(t), t) - p_1(v_x(t), v_y(t), t))$$

$$= f_2(t)(p_2(u_x(t), u_y(t), t) - p_2(v_x(t), v_y(t), t))$$

In this case, when a negligible probability is removed from Proposition 1, $$p_1(u_x(t), u_y(t), t) - p_1(v_x(t), v_y(t), t) \neq 0$$

is obtained. For this reason, $$p_2(u_x(t), u_y(t), t) - p_2(v_x(t), v_y(t), t) \neq 0$$

is obtained. Since $p_1(x, y, t)$ and $p_2(x, y, t)$ satisfy Condition (14), $f_2(t) = c f_1(t)$ is satisfied in relation to the degrees. Here, reference symbol c denotes an element of the finite field $F_p$. Therefore, when the sides of Equation (23) are subtracted from the sides of the equation, respectively, to reflect the equation, the following equation is obtained:

$$f_1(t)(p_1(x, y, t) - c p_2(x, y, t)) = X(x, y, t)(q_2(x, y, t) - q_1(x, y, t))$$

In this case, due to the irreducibility of the algebraic surface X(x, y, t), (f(t), X(x, y, t))=1 is satisfied, and $F_p[x,y,t]$ is a unique factorization domain. For this reason, $$f_1(t) \mid q_2(x, y, t) - q_1(x, y, t)$$

depends on the equation. In this case, according to Condition (15) to q(x, y, t), the following condition is satisfied:

$$\deg_t q_2(x, y, t) - q_1(x, y, t) < \deg f_1(t)$$

For this reason, the following equation is satisfied:

$$q_1(x, y, t) = q_2(x, y, t)$$

Therefore, the following equation is satisfied:

$$p_1(x, y, t) = p_2(x, y, t)$$

and c=1, i.e., $$f_1(t) = f_2(t)$$

depends on the equation. Therefore, the two expressions are equal to each other.

In this manner, in order to solve the randomizing polynomial determining problem, it must be determined whether a solution of a problem having a unique solution is present. For this reason, the randomizing polynomial determining problem cannot be easily solved. As a matter of course, when a section finding problem is easily solved, the randomizing polynomial determining problem can be easily solved. However, a method of solving the randomizing polynomial determining problem is not known except for a method of solving the section finding problem. Therefore, the randomizing polynomial determining problem is considered as a sufficiently difficult problem.

According to the proposition, it is shown that a decryption result of the public key cryptosystem of the present invention is uniquely determined as follows.

[Lemma 1] To a fibration $X(x, y, t)=0$ of an algebraic surface having at least two different sections each having a degree equal to or smaller than the degree d and a randomizing polynomial $G(x, y, t)$ corresponding to a minimum degree l of an irreducible polynomial $f(t)$, $m(t)+G(x, y, t)$ is not a randomizing polynomial. Reference symbol $m(t)$ denotes a 1-variable polynomial having a degree which is not zero and which is equal to or smaller than a degree $l-1$.

[Proof 3] If $m(t)+G(x, y, t)$ is a randomizing polynomial, Equation (24) can be written.

$$m(t)+G(x, y, t)=f_1(t)p_1(x, y, t)+X(x, y, t)q_1(x, y, t)=m(t)+f_2(t)p_2(x, y, t)+X(x, y, t)q_2(x, y, t) \quad (24)$$

In this case, according to the assumption, $X(x, y, t)$ is an algebraic surface having two sections. For this reason, if the two sections are given by $(u_x(t), u_y(t), t)$, $(v_x(t), v_y(t), t)$, the following equation can be written:

$$G(u_x(t), u_y(t), t) - G(v_x(t), v_y(t), t) = f_1(t)(p_1(u_x(t), u_y(t), t) - p_1(v_x(t), v_y(t), t))$$
$$= f_2(t)(p_2(u_x(t), u_y(t), t) - p_2(v_x(t), v_y(t), t))$$

In this case, when a negligible probability is removed from Proposition 1, $$p_1(u_x(t), u_y(t), t) - p_1(v_x(t), v_y(t), t) \neq 0$$

is obtained. For this reason, $$p_2(u_x(t), u_y(t), t) - p_2(v_x(t), v_y(t), t) \neq 0$$

is obtained. Since $p_1(x, y, t)$ and $p_2(x, y, t)$ satisfy Condition (14), $$f_2(t)=cf_1(t)$$

is satisfied in relation to the degrees. Therefore, when $(u_x(t), u_y(t), t)$ and the above equation are assigned to Equation (24), the following equation is obtained:

$$m(t)=f_1(t)\{p_1(u_x(t), u_y(t), t) - cp_2(u_x(t), u_y(t), t)\}$$

However, this equation conflicts because $\deg m(t) \geq l$ is satisfied. Therefore, $m(t)+G(x, y, t)$ is not a randomizing polynomial.

[Theorem 1] A fibration $X(x, y, t)=0$ of an algebraic surface having at least two sections, the minimum degree l of the irreducible polynomial $f(t)$, a randomizing polynomial $G(x, y, t)$ corresponding to the maximum degree d of a 1-variable polynomial included in the two sections, and an expression $m(t)+G(x, y, t)$ obtained by a 1-variable polynomial $m(t)$ having a degree equal to or smaller than a degree $l-1$ are uniquely determined.

[Proof 4] It is assumed that 1-variable polynomials $m_1(t)$ and $m_2(t)$ which satisfy $\deg m_1(t), \deg m_2(t)<l$ and randomizing polynomials $G_1(x, y, t)$ and $G_2(x, y, t)$ satisfy the following equation:

$$m_1(t)+G_1(x, y, t)=m_2(t)+G_2(x, y, t)$$

At this time, $$m_1(t)-m_2(t)+G_1(x, y, t)$$

is a randomizing polynomial. In this case, according to Lemma 1, $$m_1(t)=m_2(t)$$

is satisfied, and $$G_1(x, y, t)=G_2(x, y, t)$$

depends on the equation. Therefore, the expression is uniquely determined.

On the basis of these results, security proof of a public-key cryptosystem is performed.

[Definition 2] IND-CPA $\pi:=(K,E,D)$ is regarded as a public-key cryptosystem, and a probabilistic algorithm $A:=(A_1, A_2)$ to the public-key cryptosystem is considered. To the algorithm, a security parameter is defined by $k \in N$, and the following equation is defined:

$$Adv_{A,\pi}^{ind-cpa}(k):=2 Pr[(pk,sk) \leftarrow k(1^k); (x_0, x_1, s) \leftarrow A_1(pk);$$

$$b \leftarrow R\{0,1\}; y \leftarrow \epsilon_{pk}(x_b):A_2(x_0, x_1, s, y)=b]-1$$

When, with respect to any probabilistic algorithm A, $Adv_{A,\pi}^{ind-cpa}(k)$ is negligible to k, it is said that the public-key cryptosystem $\pi$ is secure in the sense of the IND-CPA.

In this case, definition of the IND-CPA will be described in detail. $Adv_{A,\pi}^{ind-cpa}(k)$ denotes a probability that a public-key cryptosystem having a parameter k defined by $\pi$ is defeated by the algorithm A in the sense of indistinguishable (IND) under chosen plaintext attack (CPA).

The parameter k is an index expressing difficulty of a problem serving as a base of security of the public-key cryptosystem. In the public-key cryptosystem according to the present invention, when p is fixed, d or l serves as a parameter. In fact, as is apparent from a parameter designing method (to be described later), since l is a function of d, d may be regarded as a parameter.

In this case, the CPA means that a plaintext is applied to an encrypting program and the plaintext is adaptively structured with reference to an output encrypted text. The algorithm A $(=A_1, A_2)$ assumes that the CPA can be executed. As will be described later, since the algorithm has two roughly classified algorithms $A_1$ and $A_2$, the algorithm is written as A $(=A_1, A_2)$.

The IND serving as a standard of security to be achieved will be explained. The IND means that an original message can be expected from an encrypted text obtained by the following procedures (i) to (iv).

(i) A pair (pk, sk) of a public key and a private key generated to satisfy the parameter k is output by using a key-generating algorithm K.

$$(pk, sk) \leftarrow K(1^k)$$

(ii) After the algorithm $A_1$ which knows only a public key pk of the key pair adaptively encrypts a plaintext on occasion, two messages $m_0$ and $m_1$ are selected.

$$(x_0, x_1, s) \leftarrow A_1(pk);$$

(iii) It is assumed that a third party called an encrypting Oracle is caused to select any one of $m_0$ and $m_1$ and to encrypt the selected message and obtains an encrypted text y.

$$b \leftarrow R\{0,1\}; y \leftarrow E_{pk}(xb):$$

(iv) It is expected from the obtained encrypted text y by using the algorithm $A_2$ whether the corresponding message is $m_0$ or $m_1$.

$$A_2(x_0, x_1, s, y)=b$$

On the other hand, in the IND, since the answer is 0 or 1, when an answer is given at random, a right answer can be obtained in a probability of ½. Therefore, a degree of difference of an accuracy rate (probability of success) from ½ is a problem. More specifically, a probability $Adv_{A,\pi}^{ind-cpa}(k)$ obtained by subtracting 1 from a probability obtained by doubling a probability given by:

$$Pr[(pk, sk) \leftarrow K(1^k); (x_0, x_1, s) \leftarrow A_1(pk); b \leftarrow R\{0, 1\}; y \leftarrow \epsilon_{pk}(x_b): A_2(x_0, x_1, s, y) = b]$$

may be negligible with respect to the parameter k.

The "negligible" means that the probability exponentially decreases with respect to the parameter k. For example, it can be said that $1/p^j$, $1/p^d$, and the like are negligible probabilities by using a parameter d.

If the randomizing polynomial determining problem is difficult, the security of an algebraic surface cryptosystem can be proved as follows.

[Theorem 2] The fact that the algebraic surface cryptosystem is secure in the sense of the IND-CPA is equivalent to the fact that the randomizing polynomial determining problem cannot be solved within polynomial time.

Figure 15:
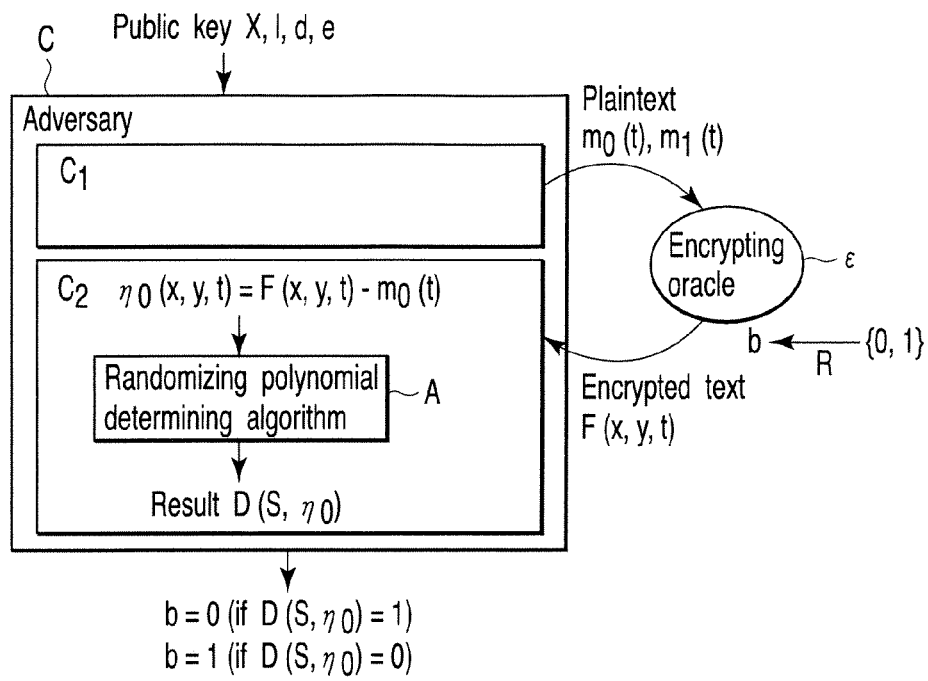
FIGS. 15 and 16 are pattern diagrams of security proof of third and fourth embodiments.

[Proof 5] If the algebraic surface cryptosystem $\pi$ is secure in the sense of the IND-CPA, it is shown that the randomizing polynomial determining problem cannot be solved in a non-negligible probability within polynomial time. It is assumed that there is an algorithm A which solves the randomizing polynomial determining problem in a non-negligible probability $Adv_A$ within the polynomial time. At this time, an adversary $C=(C_1, C_2)$ which solves the algebraic surface cryptosystem $\pi$ in the sense of the IND-CPA can be constituted as shown in FIG. 15. $C_1$ performs any process using a public key when X, l, d, and e given as public keys are input to output two plaintexts $m_0(t)$ and $m_1(t)$ to an encrypting Oracle $\epsilon$. The encrypting Oracle $\epsilon$ selects a plaintext $m_b(t)$ which is one of the input plaintexts, encrypts the plaintext by using the public key, and returns an encrypted text $F(x, y, t)$ to the adversary C. The adversary C creates:

$$\eta_0(x, y, t) = F(x, y, t) - m_0(t)$$

to the received encrypted text $F(x, y, t)$, and obtains a result $D(\eta_0, S)$ by the algorithm A. In this case, $D(\eta, S)$ is a function which employs $\{0, 1\}$ as a range. The function is set at 1 when a polynomial $\eta$ belongs to a set S of randomizing polynomials, and the function is set at 0 when the polynomial $\eta$ does not belong to the set S. The adversary C outputs b=1 when the value of $D(\eta_0, S)$ is 0 and outputs b=0 when the value of $D(\eta_0, S)$ is 1. Since the above processes are performed on the assumption that the algorithm A is ended at the polynomial time, the processes are ended at the polynomial time.

In this case, a probability of success $Adv_{A,\pi}^{ind-cpa}(k)$ can be evaluated as follows:

$$Adv_{A,\Pi}^{ind-cpa}(k) = Pr[D(\eta_0, S) = 0 \mid b = 1] + Pr[D(\eta_0, S) = 1 \mid b = 0]$$

$$= Pr[D(\eta_0, S) = 0 \wedge b = 1]/Pr[b = 1] +$$

$$Pr[D(\eta_0, S) = 1 \wedge b = 0]/Pr[b = 0]$$

In this case, $Pr[b=1]=Pr[b=0]=½$ is satisfied, and thus $$=2(Pr[D(\eta_0, S)=0 \hat{} b=1]+Pr[D(\eta_0, S)=1 \hat{} b=0])$$

In this case, according to Theorem 1, it is impossible that $\eta_0(x, y, t)$ is a randomizing polynomial of $m(t)_{\bar{b}}$. Therefore, a probability that an event $\{D(\eta_0, S)=0 \hat{} b=1\} \vee \{D(\eta_0, S)=1 \hat{} b=0\}$ occurs is equal to the probability of success of the algorithm A. Therefore $$=2 Adv_A$$

is satisfied. For this reason, $Adv_{A,\pi}^{ind-cpa}(k)$ becomes a non-negligible probability.

Figure 16:
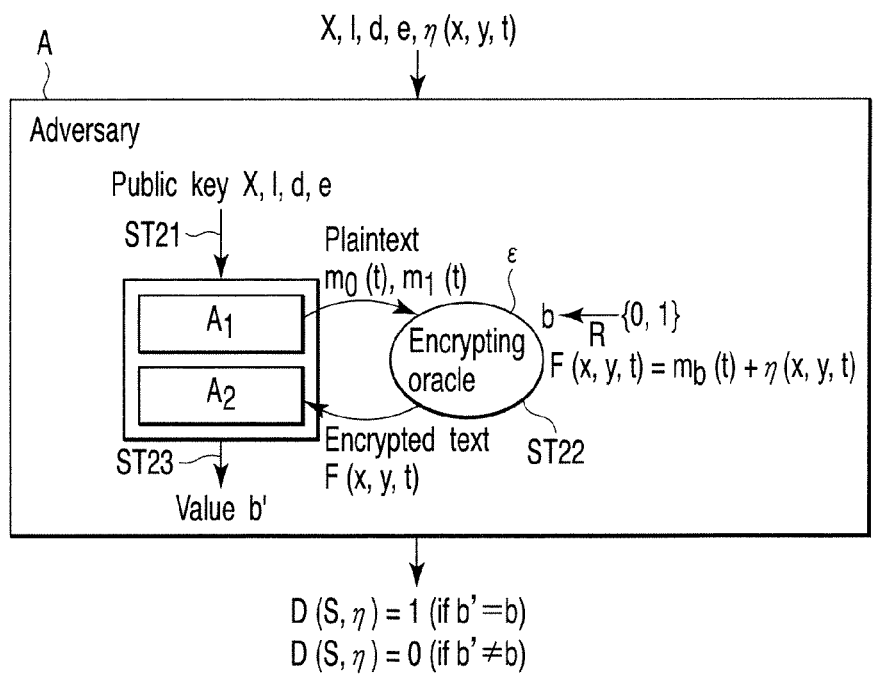

When the randomizing polynomial determining problem cannot be solved in a non-negligible probability within the polynomial time, it is shown that the algebraic surface cryptosystem $\pi$ is secure in the sense of the IND-CPA. It is assumed that the algebraic surface cryptosystem $\pi$ is not secure in the sense of the IND-CPA. At this time, there is an adversary $A=(A_1, A_2)$ which defeats the algebraic surface cryptosystem $\pi$ in the sense of the IND-CPA. The adversary A is assumed, and it is shown that the algorithm A which can solve the randomizing polynomial determining problem in a non-negligible probability within the polynomial time is present. More specifically, when a randomizing polynomial set S (=S(X, l, d)) and a polynomial $\eta(x, y, t)$ are given, the algorithm A determines whether the $\eta(x, y, t)$ belongs to S as shown in FIG. 16. In FIG. 16, a public-key cryptosystem $\pi$ having parameters X, l, and d of the randomizing polynomial set as public keys is considered, and the parameters X, l, and d are input to the adversary $A=(A_1, A_2)$ as public keys (ST21). The adversary $A_1$ outputs plaintexts $m_0(t)$ and $m_1(t)$ to the encrypting Oracle $\epsilon$. The encrypting Oracle $\epsilon$ selects b from a set $\{0, 1\}$ at random, and is simulated by generating an encrypted text $F(x, y, t)$ $(=m_b(t)+(x, y, t))$ (ST22). The adversary A receives the encrypted text $F(x, y, t)$ generated by the encrypting Oracle (in $A_2$), processes the encrypted text by an algorithm which ends within the polynomial time, and outputs b' (ST23). In this case, it is assumed that $D(\eta, S)=1$ is satisfied when b'=b and that $D(\eta, S)=0$ is satisfied when b'≠b. The algorithm A apparently ends within the polynomial time. $Adv_A$ is evaluated as follows. Here, $G=F_p[x,y,t]$, $R=G-S$ is defined.

$$Adv_A = Pr[D(\eta, S) = 0 \mid \eta \in S] - Pr[D(\eta, S) = 1 \mid \eta \in G]$$

$$= Pr[b' = b \mid \eta \in S] - Pr[b' = b \mid \eta \in G]$$

$$= Pr[b' = 1 \mid b = 1 \wedge \eta \in S]/2 + Pr[b' = 0 \mid b = 0 \wedge \eta \in S]/2 -$$

$$Pr[b' = b \mid \eta \in G]$$

$$= Pr[b' = 1 \mid b = 1 \wedge \eta \in S]/2 +$$

$$(1 - Pr[b' = 0 \mid b = 0 \wedge \eta \in S])/2 - Pr[b' = b \mid \eta \in G]$$

$$= (Pr[b' = 1 \mid b = 1 \wedge \eta \in S] - Pr[b' = 0 \mid b = 0 \wedge \eta \in S])/2 +$$

$$1/2 - Pr[b' = b \mid \eta \in G]$$

$$= Adv_{A,\Pi}^{ind-cpa}(k)/2 + 1/2 - Pr[b' = b \mid \eta \in G]$$

$$= Adv_{A,\Pi}^{ind-cpa}(k)/2 + 1/2 - \begin{pmatrix} Pr[b = b' \mid \eta \in S]Pr[\eta \in S] + \\ Pr[b = b' \mid \eta \in R]Pr[\eta \in R] \end{pmatrix}$$

In this case, when $\eta \in R$ (i.e., $\eta \notin S$), a polynomial $\eta_1(x, y, t)$ is present in the set S, and it is possible that the following equation is satisfied:

$$m_b(t)+\eta(x,y,t)=m_{\bar{b}}(t)+\eta_1(x,y,t)$$

where $\bar{b}$ denotes the value other than b. More specifically, when b=0, $\bar{b}$=1. When b=1, $\bar{b}$=0. In this case, since b≠b' is necessarily satisfied, the following equation is satisfied:

$$Pr[b==b'|\eta \in R] \leq 1/2$$

Therefore, the following equations are satisfied:

$$= Adv_{A,\Pi}^{ind-cpa}(k)(1 - Pr[\eta \in S])/2 + 1/2 - Pr[\eta \in S]/2 -$$
$$(1 - Pr[\eta \in S])/2$$
$$= Adv_{A,\Pi}^{ind-cpa}(k)(1 - Pr[\eta \in S])/2$$

In this case, according to Lemma 1, with respect to the η(x, y, t) belonging to the set S, m(t)+η(x, y, t) (where 0≦deg m(t)<l) necessarily belongs to R. According to Theorem 1, the expression of m(t)+η(x, y, t) is uniquely determined.

Therefore, with respect to the polynomial η(x, y, t) belonging to the set S, sets of polynomials belonging to the set R:

$$\{m(t)+\eta(x, y, t)|m(t) \in F_p[t] \,^{\deg} m(t) < l\}$$

have one-to-one correspondence, and any two of these sets do not overlap. For this reason, the following expression is obtained:

$$Pr[\eta \in R] \leq 1/p^l$$

Therefore, the following expression is obtained:

$$\geq Adv_{A,\pi}^{ind-cpa}(k)(l-1/p^l)/2$$

In this case, since p≧2, l≧1, the following expression is obtained:

$$\geq Adv_{A,\pi}^{ind-cpa}(k)/4$$

Therefore, $Adv_A$ is non-negligible.

[Method of Setting Parameter]

This paragraph relates to a public-key cryptosystem according to the present invention in which security is based on a randomizing polynomial determining problem in the above discussion, and will explain a concrete method of setting parameters.

The parameters of the public-key cryptosystem includes a size p of a finite field $F_p$ and a maximum degree d of a section. According to Condition (14), a degree l(d) of a 1-variable polynomial f(t) may be defined as follows:

$$l(d)=(2d+1)e(d)+1 \qquad (25)$$

A maximum index e(d) of x and y of a 3-variable polynomial p(x, y, t) is a parameter related to a probability of failure of decryption. The failure probability is given by $1/p^{e(d)+1}$ according to Proposition 1. Therefore, if the failure probability is desirably set to be $2^n$, the failure probability may be set to satisfy the following condition:

$$(|p|-1)(e(d)+1) > n$$

where |p| denotes a bit length of p.

Concrete Configuration of Third Embodiment

Figure 17:
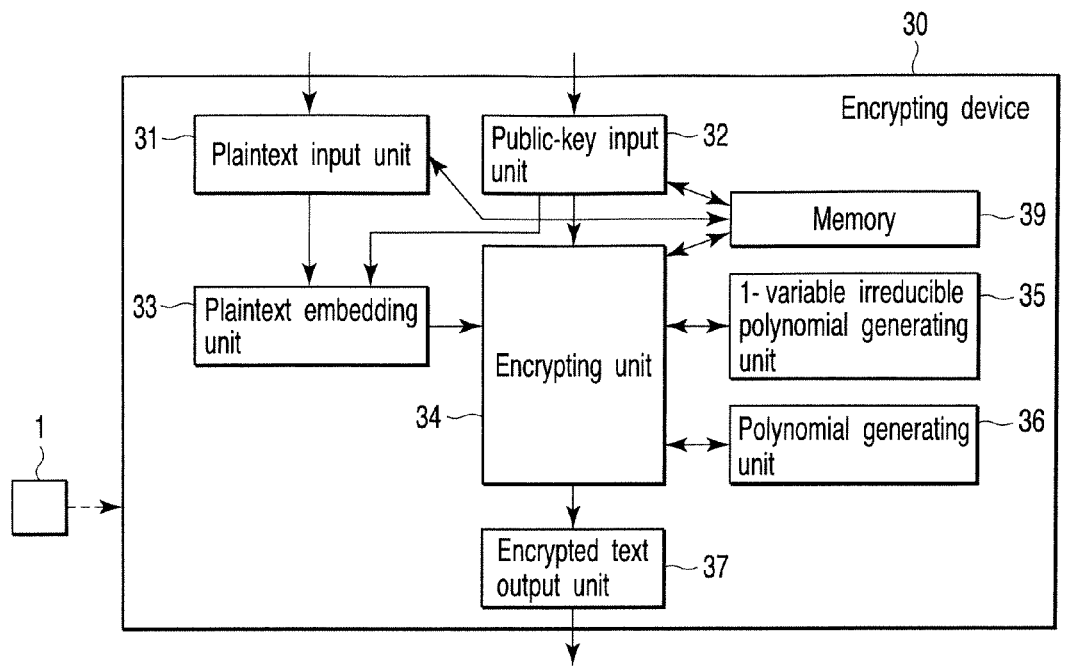
FIG. 17 is an entire block diagram of an encrypting device according to the third embodiment.
Figure 18:
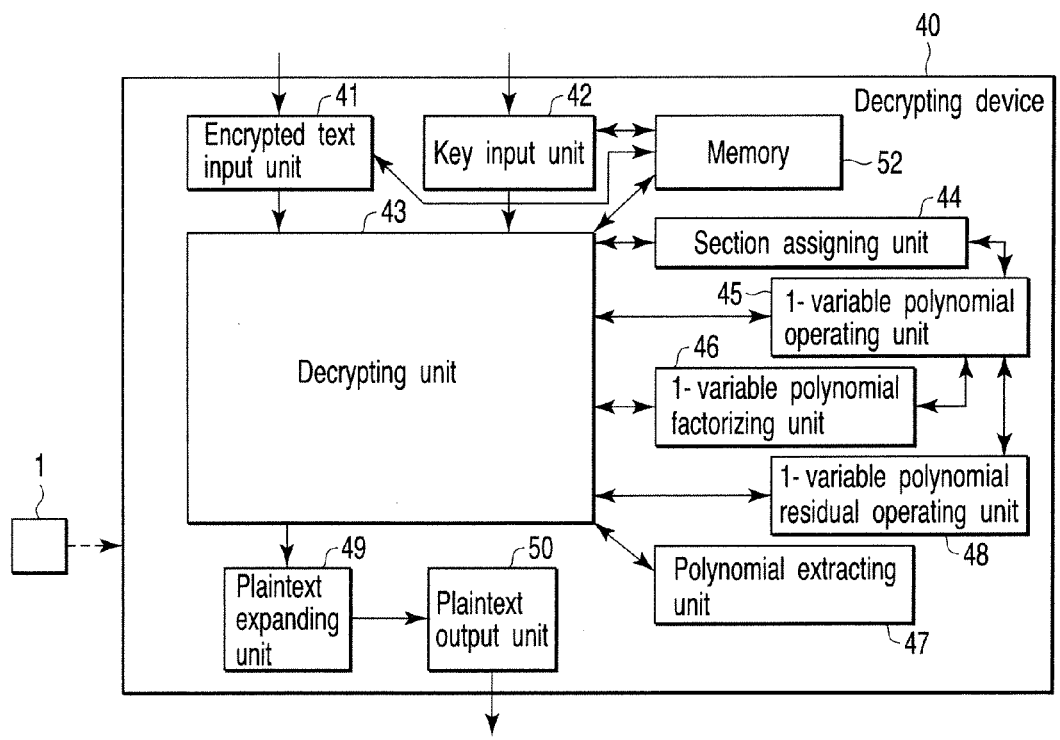
FIG. 18 is an entire block diagram of a decrypting device according to the embodiment.

Concrete configurations of an encrypting device and a decrypting device in a public-key cryptosystem according to the embodiment and an algorithm for the encrypting device and the decrypting device will be described below. FIG. 17 is an entire block diagram of an encrypting device according to a third embodiment of the present invention, and FIG. 18 is an entire block diagram of a decrypting device according to the embodiment.

In this case, an encrypting device 30, as shown in FIG. 17, includes a plaintext input unit 31, a public-key input unit 32, a plaintext embedding unit 33, an encrypting unit 34, a 1-variable irreducible polynomial generating unit 35, a polynomial generating unit 36, an encrypted text output unit 37, and a memory 39. The memory (hardware resource) 39 is a storage device from/in which input data, output data, in-processing data, and the like from the units 31 to 37 can be appropriately read/written. However, arrows between the memory 39 and the units 33 and 35 to 37 are omitted in FIGS. 17 and 18.

In this case, the plaintext input unit 31 has a function that temporarily holds an externally input plaintext (message) m in the memory 39 and transmits the plaintext m to the plaintext embedding unit 33.

The public-key input unit 32 has a function that temporarily holds the externally input public key in the memory 39 and transmits the public key to the plaintext embedding unit 33 and the encrypting unit 34.

The plaintext embedding unit 33 has a function that embeds the plaintext m as a coefficient of a plaintext polynomial m(t) having a one variable t and a degree equal to or smaller than a degree l−1 on the basis of the plaintext m received from the plaintext input unit 31 and the public key received from the public-key input unit 32, and a function that transmits the obtained plaintext polynomial m(t) to the encrypting unit 34.

Figure 19:
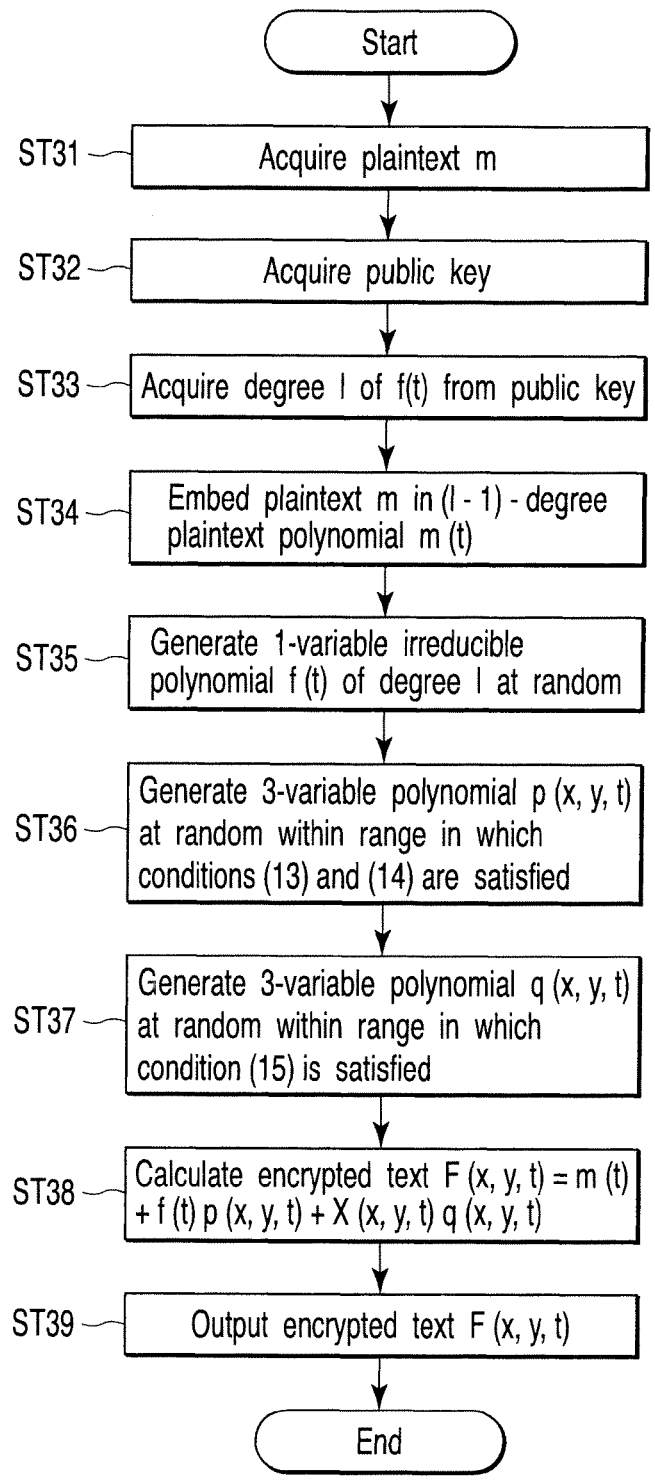
FIG. 19 is a flowchart of the encrypting device according to the embodiment.

The encrypting unit 34 controls the units 35 to 37 subsequent to the encrypting unit 34 on the basis of the plaintext polynomial m(t) received from the plaintext embedding unit 33 and the public keys X(x, y, t), p, l, d, and e received from the public-key input unit 32 such that an operation shown in FIG. 19 is executed. In particular, the encrypting unit 34 has a function that generates an encrypted text $F(x, y, t)(=E_{pk}(m, p, q, f, X))$ from the plaintext polynomial m(t) by an encrypting process that performs an operation including at least one of addition, subtraction, and multiplication between the polynomials p(x, y, t), q(x, y, t) and f(t) and a fibration X(x, y, t) with respect to the plaintext polynomial m(t).

The 1-variable irreducible polynomial generating unit 35 is controlled by the encrypting unit 34 and has a function that generates a random 1-variable irreducible polynomial f(t) having a degree equal to or smaller than l.

The polynomial generating unit 36 is controlled by the encrypting unit 34 and has a function that generates random polynomial p(x, y, t) and q(x, y, t) of three variables.

The encrypted text output unit 37 has a function that outputs the encrypted text F(x, y, t) generated by the encrypting unit 34.

On the other hand, as shown in FIG. 18, a decrypting device 40 includes an encrypted text input unit 41, a key input unit 42, a decrypting unit 43, a section assigning unit 44, a 1-variable polynomial operating unit 45, a 1-variable polynomial factorizing unit 46, a polynomial extracting unit 47, a 1-variable polynomial residual operating unit 48, a plaintext expanding unit 49, a plaintext output unit 50, and a memory 52. Input data, output data, in-processing data, and the like from the units 41 to 50 can be appropriately read/written in/from the memory (hardware resource) 52. However, arrows between the memory 52 and the units 44 to 50 are omitted in FIG. 18.

The encrypted text input unit 41 has a function that temporarily holds an externally input encrypted text F in the memory 52 and transmits the encrypted text F to the decrypting unit 43.

The key input unit 42 has a function that temporarily holds an externally input public key in the memory 52 and transmits the public key to the decrypting unit 43.

Figure 20:
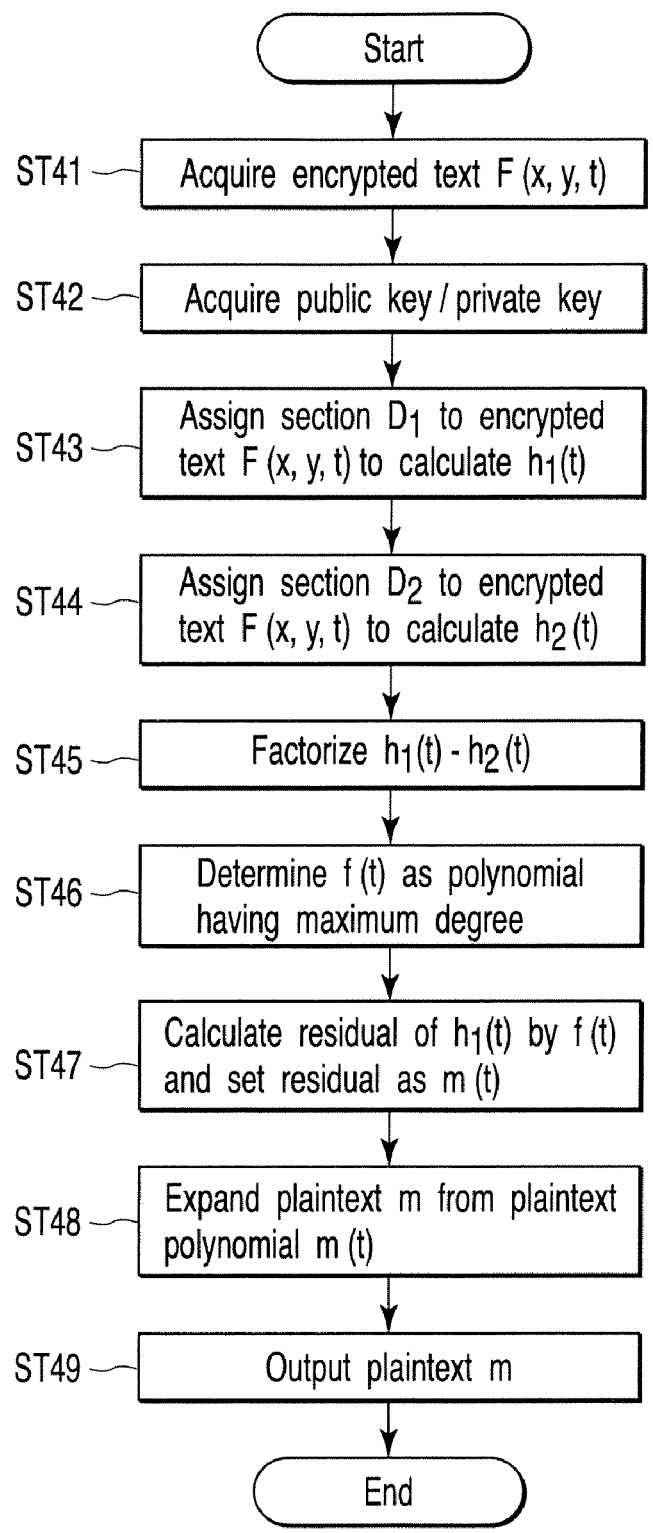
FIG. 20 is a flowchart of the decrypting device according to the embodiment.

The decrypting unit 43 has a function that controls the sections 44 to 50 subsequent to the decrypting unit 43 such that an operation shown in FIG. 20 is executed.

The section assigning unit 44 is controlled by the decrypting unit 43 and has a function that assigns sections $D_1$ and $D_2$ to the input encrypted text F to generate two 1-variable polynomials $h_1(t)$ and $h_2(t)$.

The 1-variable polynomial operating unit 45 is controlled by the decrypting unit 43 and has a function that subtracts the 1-variable polynomials $h_1(t)$ and $h_2(t)$ from each other to obtain a subtraction result $\{h_1(t)-h_2(t)\}$.

The 1-variable polynomial factorizing unit 46 is controlled by the decrypting unit 43 and has a function that factorizes the subtraction result $\{h_1(t)-h_2(t)\}$.

The polynomial extracting unit 47 is controlled by the decrypting unit 43 and has a function that extracts an irreducible polynomial f(t) having a maximum degree from a factorization result.

The 1-variable polynomial residual operating unit 48 is controlled by the decrypting unit 43 and has a function that divides the 1-variable polynomial $h_1(t)$ by the irreducible polynomial f(t) to obtain a plaintext polynomial m(t) as a residual.

The plaintext expanding unit 49 has a function that extracts the plaintext m from a coefficient of the plaintext polynomial m(t) mt received from the decrypting unit 43.

The plaintext output unit 50 has a function that outputs the plaintext m received from the plaintext expanding unit 49.

Operations of the encrypting device and the decrypting device constituted as described above will be described below with reference to the flowcharts in FIGS. 19 and 20.

(Encrypting Process: FIG. 19)

In the encrypting device 30, when a plaintext (message) m is input from the plaintext input unit 31 (ST31) and public keys X(x, y, t), p, l, d, and e are input from the public-key input unit 32 (ST32), an encrypting process is started. Of the input public keys, a degree l of the 1-variable irreducible polynomial f(t) and a characteristic p of a prime field are acquired (ST33), and the values l and p are transmitted to the plaintext embedding unit 33.

In the plaintext embedding unit 33, additionally, the plaintext m transmitted from the plaintext input unit 31 is divided into bit lengths smaller than a bit length of the characteristic p by 1. For example, when p=17, the plaintext m is divided into four bits. Here, it is assumed that the plaintext m is given by:

m=0x315763ef25c04c792ef151 in hexadecimal notation.

In this case, the plaintext embedding unit 33 divides the plaintext m expressed in hexadecimal notation every four bits and embeds the divided texts as coefficients of the plaintext polynomial m(t) as expressed in the following equation (ST34):

$$m(t)=3t^{21}+t^{20}+5t^{19}+7t^{18}+6t^{17}+3t^{6}+$$

$$15t^{15}+11t^{14}+2t^{13}+5t^{12}+12t^{11}+0t^{10}+4t^{9}+$$

$$12t^{8}+7t^{7}+9t^{6}+2t^{5}+14t^{4}+15t^{3}+t^{2}+5t+1$$

The plaintext embedding unit 33 transmits the plaintext polynomial m(t) to the encrypting unit 34. On the other hand, the public-key input unit 32 transmits the public keys X(x, y, t), p, l, d, and e to the encrypting unit 34.

In the encrypting unit 34, of the public keys, l and p are transmitted to the 1-variable irreducible polynomial generating unit 35.

The 1-variable irreducible polynomial generating unit 35 generates a 1-variable irreducible polynomial f(t) of degree l at random (ST35) and returns the obtained 1-variable irreducible polynomial f(t) to the encrypting unit 34. Here, in generation of the irreducible polynomial, a polynomial of degree l is generated at random, and irreducibility determination on $F_p$ is repeated until the obtained 1-variable polynomial is an irreducible polynomial.

When the encrypting unit 34 obtains the 1-variable irreducible polynomial f(t), the encrypting unit 34 transmits p, l, d, and e to the polynomial generating unit 36. The polynomial generating unit 36 generates a random 3-variable polynomial p(x, y, t) on the basis of p, l, d, and e such that the terms of the 3-variable polynomial satisfy Relational Expression (13) and Condition (14) related to a degree (ST36). As a generating method, a method of generating a polynomial at random, checking that the two conditions are not satisfied, and generating the polynomial at random again when the two conditions are satisfied and a method of restricting a 3-variable polynomial to be generated to satisfy the two conditions are known. In any method, since sufficiently various coefficients can be taken in the ranges of Conditions (13) and (14), the generation is ended within executable time. The polynomial generating unit 36 transmits the obtained 3-variable polynomial p(x, y, t) to the encrypting unit 34.

When the encrypting unit 34 receives the 3-variable polynomial p(x, y, t), the encrypting unit 34 transmits p, l, d, and e of the public keys to the polynomial generating unit 36. The polynomial generating unit 36 generates a random 3-variable polynomial q(x, y, t) on the basis of p, l, d, and e to satisfy Condition (5) (ST37) and transmits the obtained 3-variable polynomial q(x, y, t) to the encrypting unit 34.

The encrypting unit 34 calculates and expands the encrypted text F(x, y, t) according to Equation (16) by using m(t), f(t), p(x, y, t), and q(x, y, t) and the algebraic surface X(x, y, t) serving as a public key (ST38). The encrypting unit 34 outputs the encrypted text from the encrypted text output unit 37 (ST39) to end the encrypting process. The encrypting unit 34 may transform the encrypted text in accordance with a predetermined format as needed to output the transformed encrypted text from the encrypted text output unit 37.

(Decrypting Process: FIG. 20)

In the decrypting device 40, when the encrypted text F(x, y, t) is acquired from the encrypted text input unit 41 (ST41) and the public keys X(x, y, t) and p and a private key are acquired from the key input unit 42 (ST42), the decrypting process is started. The private key is two sections $D_1$ and $D_2$. The acquired encrypted text and the key information are transmitted to the decrypting unit 43.

The decrypting unit 43 transmits the encrypted text F(x, y, t) and the section $D_1$ to the section assigning unit 44. The section assigning unit 44 assigns $D_1$ to F(x, y, t), and as needed, the 1-variable polynomial operating unit 45 is used to obtain $h_1(t)$ (ST43). In this case, the 1-variable polynomial operating unit 45 performs addition, subtraction, multiplication, and division of the 1-variable polynomial. The obtained $h_1(t)$ is transmitted from the section assigning unit 44 to the decrypting unit 43.

Similarly, the decrypting unit 43 transmits the encrypted text F(x, y, t) and the section $D_2$ to the section assigning unit 44. The section assigning unit 44 assigns the section $D_2$ to the F(x, y, t) to obtain $h_2(t)$ (ST44). The obtained $h_2(t)$ is transmitted from the section assigning unit 44 to the decrypting unit 43.

The decrypting unit 43 transmits $h_1(t)$ and $h_2(t)$ to the 1-variable polynomial operating unit 45 to subtract $h_1(t)$ and $h_2(t)$ from each other. The 1-variable polynomial operating unit 45 transmits a subtraction result $\{h_1(t)-h_2(t)\}$ to the decrypting unit 43.

The decrypting unit 43 transmits the subtraction result $\{h_1(t)-h_2(t)\}$ to the 1-variable polynomial factorizing unit 46 to factorize the subtraction result $\{h_1(t)-h_2(t)\}$ (ST45). The 1-variable polynomial factorizing unit 46 determines, of a factorization result, an irreducible polynomial f(t) as a factor of the maximum degree (ST46) and transmits the irreducible polynomial f(t) to the decrypting unit 43.

The decrypting unit 43 transmits f(t) and $h_1(t)$ to the 1-variable polynomial residual operating unit 48.

The 1-variable polynomial residual operating unit 48 divides $h_1(t)$ by f(t) to calculate the plaintext polynomial m(t) as a residual (ST47) and transmits the plaintext polynomial m(t) to the decrypting unit 43.

In the decrypting unit 43, m(t) is transmitted to the plaintext expanding unit 49. The plaintext expanding unit 49 expands the plaintext m from the plaintext polynomial m(t) and transmits the obtained plaintext m to the plaintext output unit 50. The plaintext output unit 50 outputs the plaintext m (ST49). In this manner, the decrypting device 40 ends the decrypting process.

As described above, according to the embodiment, in addition to the effect of the first or second embodiment, a provable secure public-key cryptosystem which may assure security even if a quantum computer appears, which can be securely realized by a current computer, and which may be realized in a low-power environment can be structured.

Supplementary, according to the embodiment, a private key for decryption is two or more sections corresponding to a fibration X(x, y, t)=0 of an algebraic surface X, and a public key is the fibration X(x, y, t) of the algebraic surface X. For this reason, a public-key cryptosystem which may assure security even if a quantum computer appears, which can be securely realized by a current computer, and which may be realized in a low-power environment can be structured.

According to the embodiment, by a configuration using the plaintext polynomial m(t) having a degree equal to or smaller than a degree l−1 and the random 1-variable irreducible polynomial f(t) having a degree equal to or larger than l, on the basis of the Proof 5 described above, a secure public-key cryptosystem which can be proved in the sense of the IND-CPA can be structured.

Variation of Third Embodiment

A sixth variation is a variation in which the size of a public key is reduced by a configuration in which p, l, d, and e of public keys of the embodiment are used as fixed parameters. As a matter of course, a method which uses some of the parameters as fixed parameters may be employed.

In this variation, since some of the parameters are fixed, key generation is restricted. However, when sufficiently large l, d, and e are acquired, a desired public key X(x, y, t) can be generated by several trials.

A seventh variation is a variation related to transformation of Equation (16) used in encryption. Even though Equation (16), for example, is transformed as follows:

$$F(x, y, t) = m(t) - f(t)p(x, y, t) - X(x, y, t)q(x, y, t)$$

encryption/decryption can be similarly performed, and the same security can be proved. In this manner, an equation of encryption can be transformed without departing from the spirit and scope of the present invention, and, accordingly, it is sufficiently possible to change a decrypting process.

An eighth variation is a system which embeds a plaintext m in a 1-variable irreducible polynomial f(t). The above embodiment shows the system which generates f(t) at random. It is a property of the public-key cryptosystem of the present invention that f(t) is difficult to calculate without a private key. For this reason, the system which also embeds plaintext information in f(t) can be realized.

When a plaintext m is to be also embedded in f(t), a plaintext having a larger size can be encrypted at once. However, the embedded result f(t) is made an irreducible polynomial, it must be determined in advance that a random coefficient is assigned to a specific coefficient. Since a very large number of irreducible polynomials are present, even though the plaintext m is embedded in some coefficient, an irreducible polynomial can be probably obtained. If an irreducible polynomial cannot be obtained, the degree of f(t) is increased to make it possible to increase a range for search. Similar security can be proved even with such a variation.

A ninth variation is a system which removes a parameter e serving as a maximum index of x and y of a 3-variable polynomial p(x, y , t) from a public key. The parameter e, as shown in Proposition 1, serves as an index when a probability of failure of decryption is expressed. More specifically, since the index does not serve as a direct index related to security, when a rule is determined such that encryption is performed again (by changing p(x, y , t)) in failure of decryption, an embodiment which removes the parameter e from the public key can be realized. With this embodiment, a public-key size decreases, and generation of p(x, y , t) need not be restricted more than necessary.

Fourth Embodiment

A fourth embodiment of the present invention will be described below. A public key and a private key according to the embodiment are the same as those in the third embodiment. The public-key cryptosystem according to the embodiment assures security higher than that of the third embodiment which assures security (IND-CPA) to a passive attack. More specifically, the public key also assures security (IND-CCA) to an active attack.

The embodiment constitutes a public key cryptosystem which is secure in the sense of the IND-CCA by using conversion described in Japanese Patent No. 3306384 because the public key cryptosystem described in the third embodiment has security in the sense of the IND-CPA.

In a technique described in Japanese Patent No. 3306384, when there is a public-key cryptosystem $\pi(K,E,D)$ including random elements which are secure in the sense of the IND-CPA, the public-key cryptosystem is converted into a public-key cryptosystem $\bar{\pi}(K,\bar{E},\bar{D})$ also including random elements to try to realize a public-key cryptosystem which satisfies the IND-CCA. In this case, reference symbols K, E, and D denote a key generating algorithm, an encrypting algorithm, and a decrypting algorithm, respectively. Here, the encrypting process is concretely executed as follows:

$$\bar{E}(m, r) = E(m\|r, H(m\|r))$$

More specifically, a public key encrypted on the basis of the plaintext m and a random element r (corresponding to the 3-variable polynomials p(x, y , t) and q(x, y, t), coefficients of factors of the 1-variable polynomial f(t), and the like in the third embodiment) is converted into a public key in a system in which encryption is performed by using m∥r as a plaintext and using a hash value $\pi(m\|r)$ of m∥r as a random element.

Accordingly, in the decrypting process, after decryption is performed by the same decrypting process as that in the third embodiment, a true message m is extracted from the plaintext m||r, and the hash value H(m||r) of the plaintext m||r is calculated to compare the text with the encrypted text F(x, y, t) input by reproducing an encrypted text F'(x, y, t) having the hash value H(m||r) as a random element. When the text is equal to the encrypted text F(x, y, t), the decrypted plaintext m is output. When the texts are not equal to each other, a decryption result is not output, and it is output that the encrypted text is invalid.

However, since the conversion described in Japanese Patent No. 3306384 strongly insists security, a certain kind of structure is given to an encrypted text. For this reason, the structure of an encrypted text having a strong randomization property as described in the third embodiment is complicated. Accordingly, the cryptosystem itself described in Japanese Patent No. 3306384 has a weak algorithm (viewed from a side of the randomization property). For example, when a type of a term of a polynomial used in p(x, y , t) and q(x, y, t), i.e., terms $x^i y^j {}_{,k}$ and $x^l {}_{,y} m_{,n}$ appearing in $$p(x, y, t) = \sum_{i,j,k} a_{i,j,k} x^i y^j t^k$$

$$q(x, y, t) = \sum_{l,m,n} b_{l,m,n} x^l y^m t^n$$

are determined, and when only such simple conversion that a random element H(m||r) is assigned to coefficients $a_{i,j,k}$ and $b_{l,m,n}$ is performed, a secure system cannot be structured.

On the other hand, in the embodiment, a concrete system which performs conversion while keeping security is shown.

Concrete Configuration of Fourth Embodiment

The fourth embodiment of the present invention will be described below. Since a public key and a private key of the embodiment are the same as those in the third embodiment, a description thereof will be omitted. The same key generation as that in the third embodiment is performed.

Figure 21:
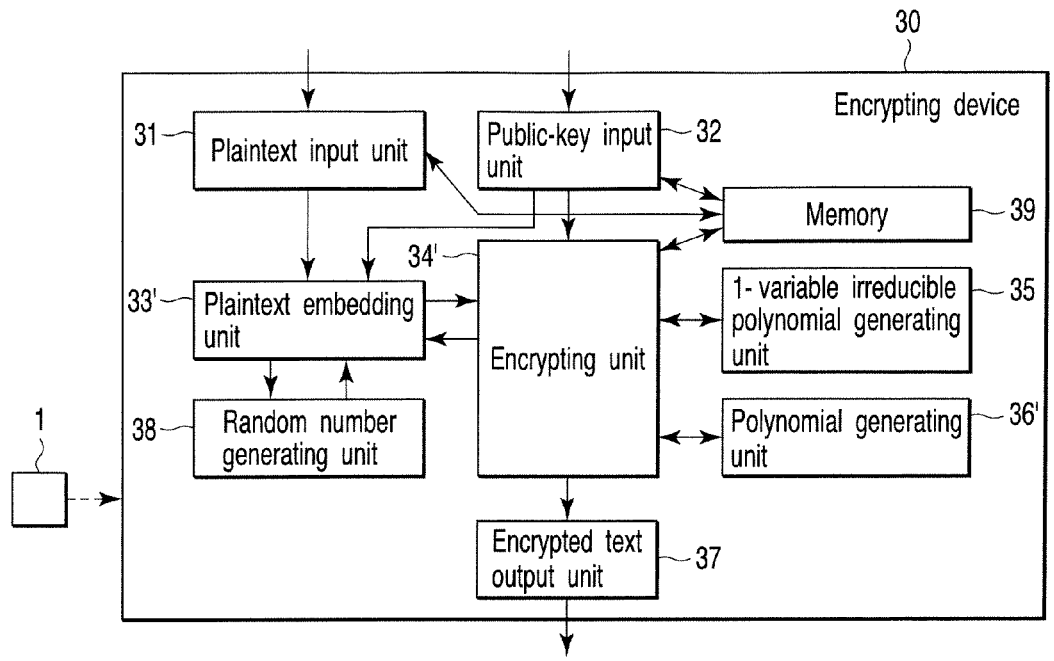
FIG. 21 is an entire block diagram of an encrypting device according to the fourth embodiment.
Figure 22:
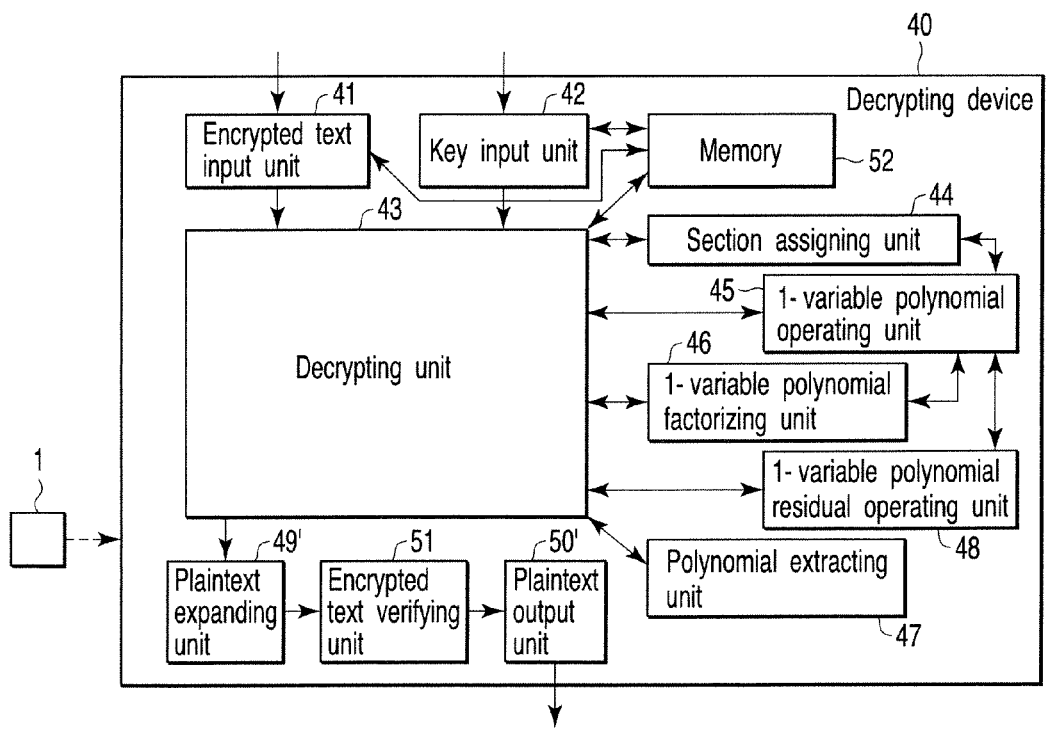
FIG. 22 is an entire block diagram of a decrypting device according to the fourth embodiment.

FIG. 21 is an entire block diagram of an encrypting device according to the fourth embodiment of the present invention, and FIG. 22 is an entire block diagram of a decrypting device in the embodiment. The same reference numerals as in FIGS. 17 and 18 denote the same parts in FIGS. 21 and 22, and a description thereof will be omitted. Only different parts will be mainly described below.

More specifically, the embodiment is a modification of the third embodiment, and as described above, higher security is assured. In the embodiment, a random number r is connected to a plaintext m to obtain m||r, and a hash value H(m||r) of m||r is used as a random element.

More specifically, in an encrypting device 30, a plaintext embedding unit 33', an encrypting unit 34', and a polynomial generating unit 36' are slightly modified, and a random number generating unit 38 is added. In a decrypting device 40, a plaintext expanding unit 49' and a plaintext output unit 50' are slightly modified, and an encrypted text verifying unit 51 is added.

Here, the plaintext embedding unit 33' has a function that designates the random number generating unit 38 to generate a random number when the plaintext embedding unit 33' receives a plaintext (message) m transmitted from a plaintext input unit 31 and receives a public key transmitted from a public-key input unit 32, a function that connects the plaintext m and the random number r to each other to generate a new plaintext M (=m||r), and a function that embeds the plaintext M as a coefficient of a plaintext polynomial M(t) having one variable t and a degree equal to or smaller than a degree l−1 on the basis of the public key.

Figure 23:
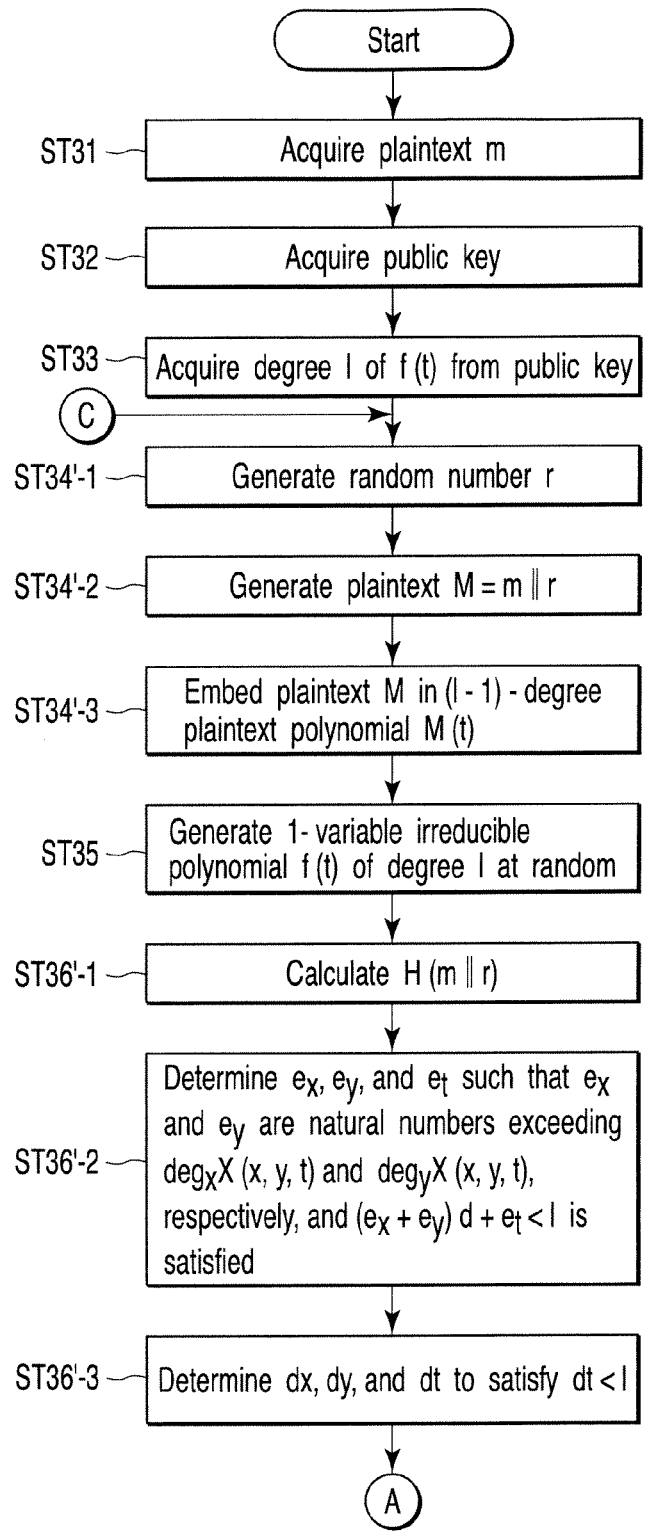
FIGS. 23 to 25 are flowcharts of the decrypting device according to the embodiment.
Figure 24:
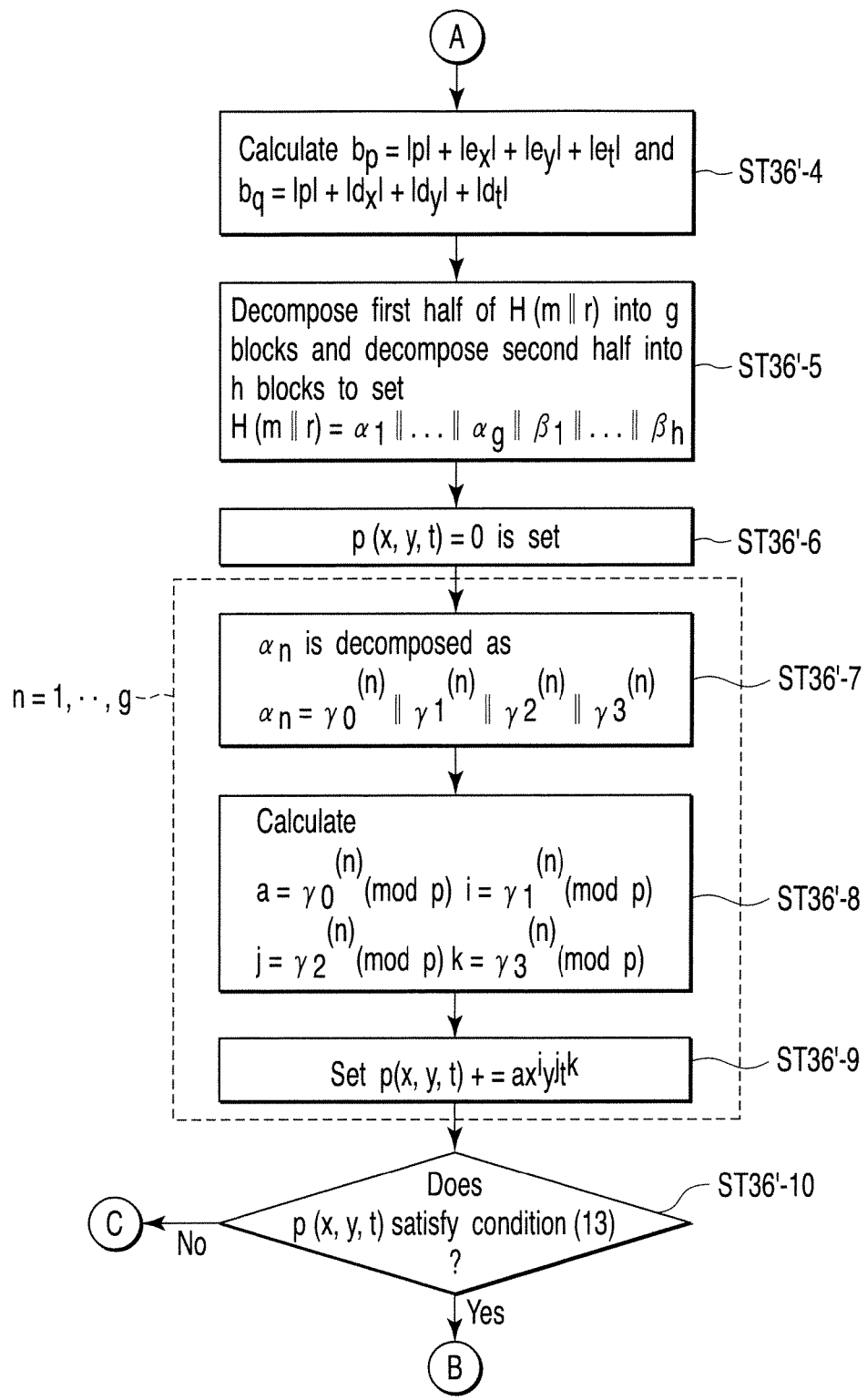
Figure 25:
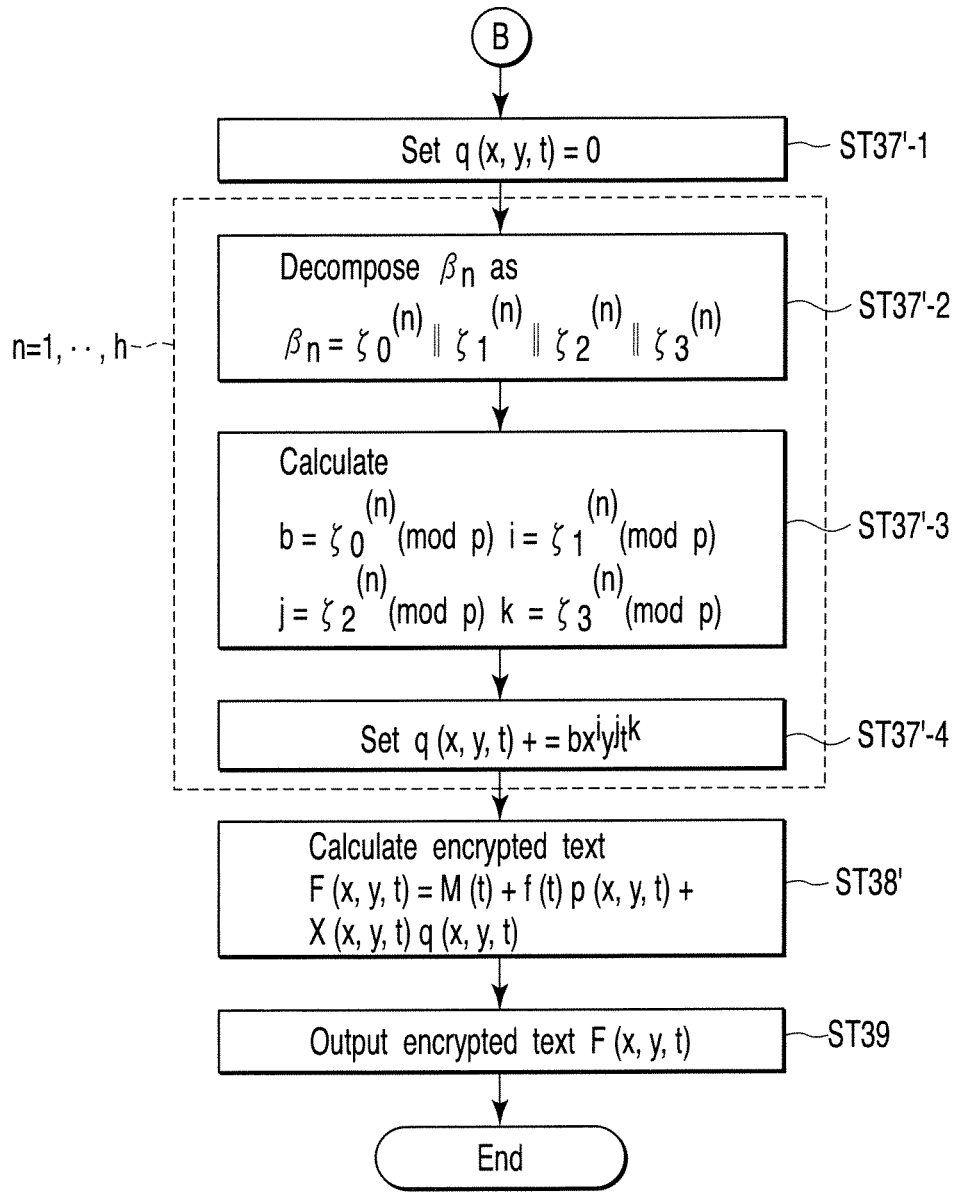

The encrypting unit 34' has, in addition to the above functions, a function that controls the polynomial generating unit 36' such that the operations shown in FIGS. 23 to 25 are realized.

The polynomial generating unit 36' is controlled by the encrypting unit 34' and generates random polynomials p(x, y , t) and q(x, y, t) of three variables x, y, and t on the basis of a hash value H(M) of the plaintext M. The polynomial generating unit 36' has a function that generates at least two of an x index, a y index, a t index, and a coefficient of the terms of the random polynomials p(x, y , t) and q(x, y, t) of the three variables x, y, and t on the basis of a hash value H(M) of the plaintext M.

The random number generating unit 38 is controlled by the plaintext embedding unit 33' and has a function that generates a random number r having a fixed length and a function that transmits the generated random number r to the plaintext embedding unit 33'.

On the other hand, the plaintext expanding unit 49' has a function that extracts the plaintext M from a coefficient of the plaintext polynomial M(t) received from the decrypting unit 43 and a function that transmits the plaintext M to the encrypted text verifying unit 51.

The plaintext output unit 50' has a function that outputs the plaintext M or the message m received from the encrypted text verifying unit 51 when a determination result obtained by the encrypted text verifying unit 51 is YES and a function that outputs encrypted text invalid information when the determination result is NO.

The encrypted text verifying unit 51 has a function that calculates the hash value H(M) of the plaintext M on the basis of the plaintext M obtained by the plaintext expanding unit 49', a function that holds the obtained hash value H(M) in a memory 52, a function that generates polynomials p(x, y , t) and q(x, y, t) of three variables x, y, and t on the basis of the hash value H(M) in the memory 52, a function that reproduces an encrypted text F'(x, y, t) (=$E_{pk}$(M, p, q, f, X)) by the same process as the encrypting process in the encrypting device 30 on the basis of the polynomials p(x, y , t) and q(x, y, t) and a fibration X(x, y, t), a function that determines whether the input encrypted text F(x, y, t) is equal to the reproduced encrypted text F'(x, y, t), and a function that controls the plaintext output unit 50' according to the determination result.

Operations of the encrypting device and the decrypting device structured as described above will be described below with reference to the flowcharts in FIGS. 23 to 26.

(Encrypting Process: FIGS. 23 to 25)

Processes in steps ST31 to ST33 are executed as described above.

The plaintext embedding unit 33' designates the random number generating unit 38 to generate a random number for the plaintext m input from the plaintext input unit 31. The random number generating unit 38 generates a random number r having a fixed length by the designation and transmits the random number r to the plaintext embedding unit 33' (ST34'-1).

The plaintext embedding unit 33' connects the received random number r to the plaintext m to generate M (=m||r) (ST34'-2) and generates a plaintext polynomial M(t) as a new plaintext by the same process as in the third embodiment (ST34'-3).

A generating process of the 3-variable polynomials p(x, y , t) and q(x, y, t) in the embodiment will be described below. The encrypting unit 34' cause the 1-variable irreducible polynomial generating unit 35 to generate the 1-variable irreducible polynomial f(t) (ST35) and calculates a hash value H(m||r) of M (=m||r) (ST36'-1). The encrypting unit 34' then transmits p, l, d, e, and H(m||r) to the polynomial generating unit 36'.

The polynomial generating unit 36' generates 3-variable polynomials p(x, y , t) and q(x, y, t) on the basis of p, l, d, e, and H(m||r) such that the terms of the 3-variable polynomials p(x, y , t) and q(x, y, t) reflect a value of the hash value H(m||r). At this time, the 3-variable polynomial p(x, y , t) is generated to satisfy Condition (13) and Condition (14) and to set a maximum degree at e or more. The 3-variable polynomial q(x, y, t) is generated to satisfy Condition (15). A concrete generating method is as follows.

Values $e_x$, $e_y$, and $e_t$ are determined such that the values $e_x$ and $e_y$ are natural numbers exceeding $\deg_x X(x, y, t)$ and $\deg_y X(x, y, t)$, respectively, and $(e_x+e_y)d+e_t<1$ is satisfied (ST36'-2). These values $e_x$, $e_y$, and $e_t$ can be concretely determined because l is set at a sufficiently large value.

Furthermore, in order to cause the generated polynomial q(x, y, t) to satisfy Condition (15), $d_x$, $d_y$, and $d_t$ are determined under the condition given by $d_t<1$ (ST36'-3). Subsequently, as expressed in the following equations, block sizes $b_p$ and $b_q$ are determined (ST36'-4).

$$b_p=|p|+|e_x|+|e_y|+|e_t|,$$

$$b_q=|p|+|d_x|+|d_y|+|d_t|$$

In these equations, |a| means a bit length of a. Reference symbol $b_p$ is a block size required to generate one term $a_{i,j,k}x^i y^j t^k$ of p(x, y , t). Similarly, reference symbol $b_q$ is a block size required to generate one term $b_{i,j,k}x^i y^j t^k$ of q(x, y, t).

In response to this, the first half of H(m||r) is decomposed into g blocks each having $b_p$ bits, and the second half is decomposed into h blocks each having $b_q$ bits to obtain the following equation:

$$H(m||r)=\alpha_1||\ldots||\alpha_g||\beta_1||\ldots||\beta_h \quad (ST36\text{-}5')$$

p(x, y , t)=0 is set (ST36'-6), and the 3-variable polynomial p(x, y , t) is generated to satisfy Condition (14). More specifically, to respective blocks of the first half $\alpha_1||\alpha_2||\ldots||\alpha_g$ of H(m||r), the following operations are repeated under the condition given by n=1 . . . , g (ST36'-7 to ST36'-9).

Here, each $\alpha_n$ of the block has a size given by the following equation:

$$|\gamma_0|=|p|, |\gamma_1|=|e_x|, |\gamma_2|=|e_y|, |\gamma_3|=|e_t|$$

and is divided as expressed by the following equation:

$$\alpha_n=\gamma_0^{(n)}||\gamma_1^{(n)}||\gamma_2^{(n)}||\gamma_3^{(n)} \quad (ST36'\text{-}7)$$

$$a=\gamma_0^{(n)}(\bmod p)$$

$$i=\gamma_1^{(n)}(\bmod e_x)$$

$$j=\gamma_2^{(n)}(\bmod e_y)$$

$$k=\gamma_3^{(n)}(\bmod e_t) \quad (ST36'\text{-}8)$$

$$p(x, y, t)+=ax^i y^j t^k \quad (ST36'\text{-}9)$$

Note that a sign "+=" means that a right-hand side is added to a left-side hand.

It is determined whether p(x, y , t) completed as described above satisfies Condition (13) (ST36'-10). When NO is determined, the polynomial generating unit 36' notifies the encrypting unit 34' that Condition (13) is not satisfied.

The encrypting unit 34' returns to the state after step ST33 to designate the plaintext embedding unit 33' to re-embed the plaintext. As in the above description, the processes in steps ST34 to ST36'-10 are executed again.

On the other hand, it is assumed that as a result of the determination in step ST36'-10, p(x, y , t) satisfies Condition (13). In this case, q(x, y, t)=0 is set (ST37'-1), the 3-variable random polynomial q(x, y, t) is generated to satisfy Condition (15). More specifically, to respective blocks of the second half $\beta_1||\beta_2||\ldots||\beta_h$ of H(m||r), the following operations are repeated under the condition given by m=1 . . . , h (ST37'-2 to ST37'-4).

Here, each $\beta_m$ of the block has a size given by the following equation:

$$|\zeta_0|=|p|, |\zeta_1|=|d_x|, |\zeta_2|=|d_y|, |\zeta_3|=|d_t|$$

and is divided as expressed by the following equation:

$$\beta_n=\zeta_0^{(m)}||\zeta_1^{(m)}||\zeta_2^{(m)}||\zeta_3^{(m)} \quad (ST37'\text{-}2).$$

$$b=\zeta_0^{(m)}(\bmod p)$$

$$i=\zeta_1^{(m)}(\bmod d_x)$$

$$j=\zeta_2^{(m)}(\bmod d_y)$$

$$k=\zeta_3^{(m)}(\bmod d_t) \quad (ST37'\text{-}3)$$

$$q(x, y, t)+=bx^i y^j t^k \quad (ST37'\text{-}4)$$

In this manner, the 3-variable polynomial q(x, y, t) is generated. The polynomial generating unit 36' outputs these 3-variable polynomials p(x, y , t) and q(x, y, t) to the encrypting unit 34'.

The encrypting unit 34' uses M(t), f(t), p(x, y , t), and q(x, y, t) to calculate an encrypted text F(x, y, t) by F(x, y, t)=M(t)+f(t)p(x, y , t)+X(x, y, t)q(x, y, t) (ST38'). The obtained encrypted text F(x, y, t) is output from the encrypted text output unit 37 as in the above description (ST39).

Figure 26:
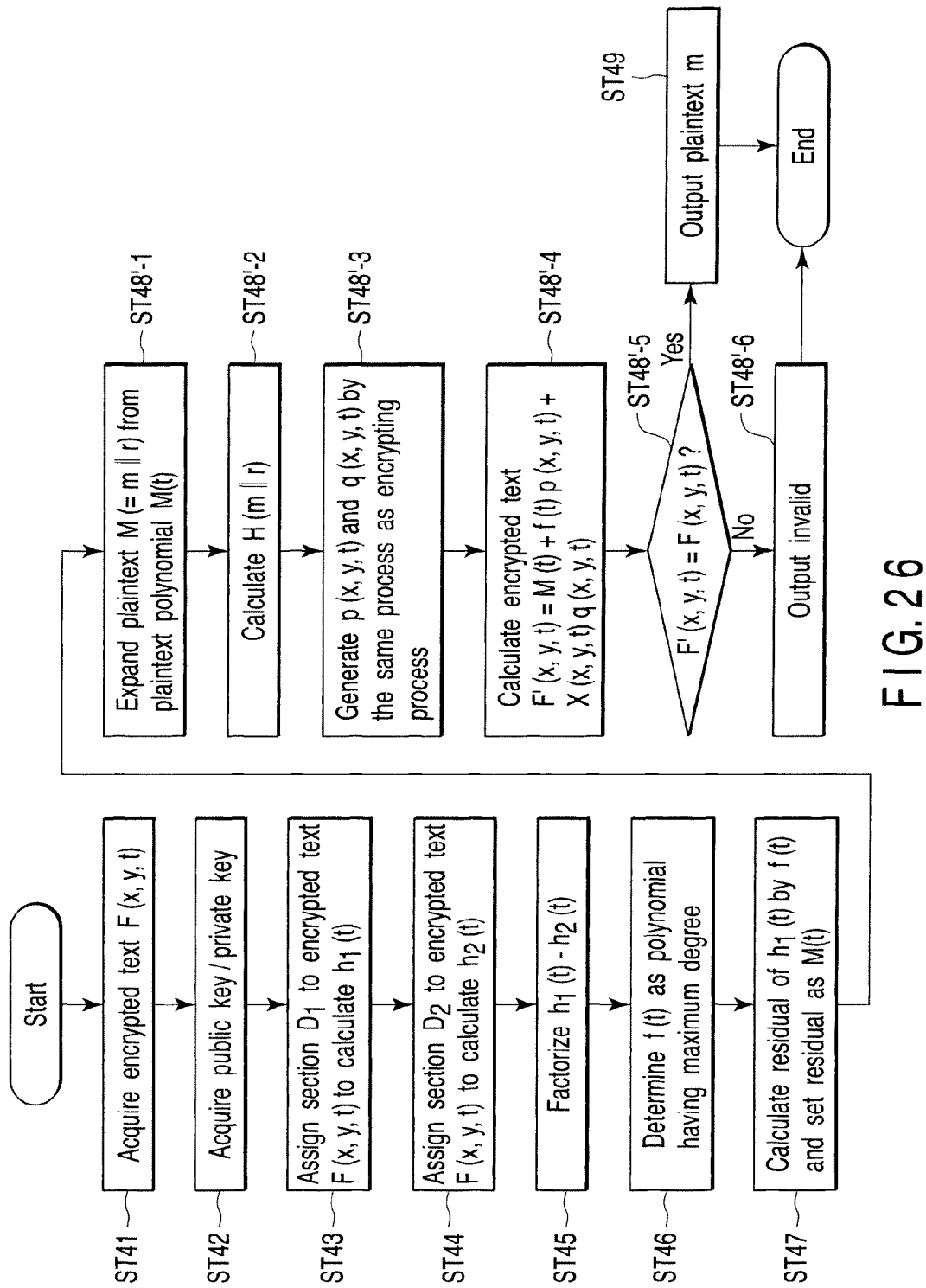
FIG. 26 is a flowchart of the decrypting device according to the embodiment.

(Decrypting Process: FIG. 26)

Processes in steps ST41 to ST47 are executed as described above. In this manner, in the decrypting unit 43, a plaintext polynomial M(t) is obtained from the encrypted text F(x, y, t) input in step ST41.

The decrypting unit 43 transmits the plaintext polynomial M(t) to the plaintext expanding unit 49'. The plaintext expanding unit 49' expands the plaintext M on the basis of the plaintext polynomial M(t) (ST48'-1) and transmits the obtained plaintext M to the encrypted text verifying unit 51.

In the encrypted text verifying unit 51, a hash value H(m||r) is calculated from the plaintext M (ST48'-2), and 3-variable polynomials p(x, y , t) and q(x, y, t) are generated from the obtained hash value H(m||r) by the same process as the encrypting process in the encrypting device 30 (ST48'-3). The encrypted text verifying unit 51 reproduces an encrypted text F'(x, y, t) on the basis of the 3-variable polynomials p(x, y , t) and q(x, y, t), the irreducible polynomial f(t) obtained in advance, and the plaintext polynomial M(t) obtained in advance (ST48'-4).

Thereafter, the encrypted text verifying unit 51 determines whether the encrypted text F(x, y, t) input in step ST41 and the encrypted text F'(x, y, t) reproduced in step ST48'-4 are equal to each other (ST48'-5).

When the determination result is NO, the encrypted text verifying unit 51 sends a signal representing that the encrypted text is invalid to the plaintext output unit 50', and the plaintext output unit 50' outputs encrypted text invalid information (ST48'-6).

On the other hand, when the determination result in step ST48'-5 is YES, the encrypted text verifying unit 51 sends the plaintext M to the plaintext output unit 50'. The plaintext output unit 50' converts the plaintext M into a true plaintext m and outputs the plaintext m (ST49).

As described above, according to the embodiment, in addition to the effect of the third embodiment, a secure public-key cryptosystem which can be proved and made secure in the sense of the IND-CCA which is more secure than the IND-CPA in the fourth embodiment can be structured.

Supplementary, in the embodiment, the plaintext M obtained by connecting the message m to the random number r is embedded as a coefficient of the plaintext polynomial M(t), so that the public-key cryptosystem which is secure in the sense of the IND-CPA is converted into a public-key cryptosystem which can be proved and made secure in the sense of the IND-CCA. Therefore, according to the embodiment, a public-key cryptosystem which can be proved and made secure in the sense of the IND-CCA can be structured.

Variation of Fourth Embodiment

The sixth to ninth variations described in the third embodiment are also directly established in the present embodiment. More specifically, as the sixth variation, some or all of p, l, d, and e of a public key are set as fixed parameters to make it possible to reduce the size of the public key.

As the seventh variation, for example, Equation (16) used in encryption is transformed as described below:

$$F(x, y, t) = m(t) - f(t)p(x, y, t) - X(x, y, t)q(x, y, t)$$

so that encryption/decryption may be performed.

Figure 27:
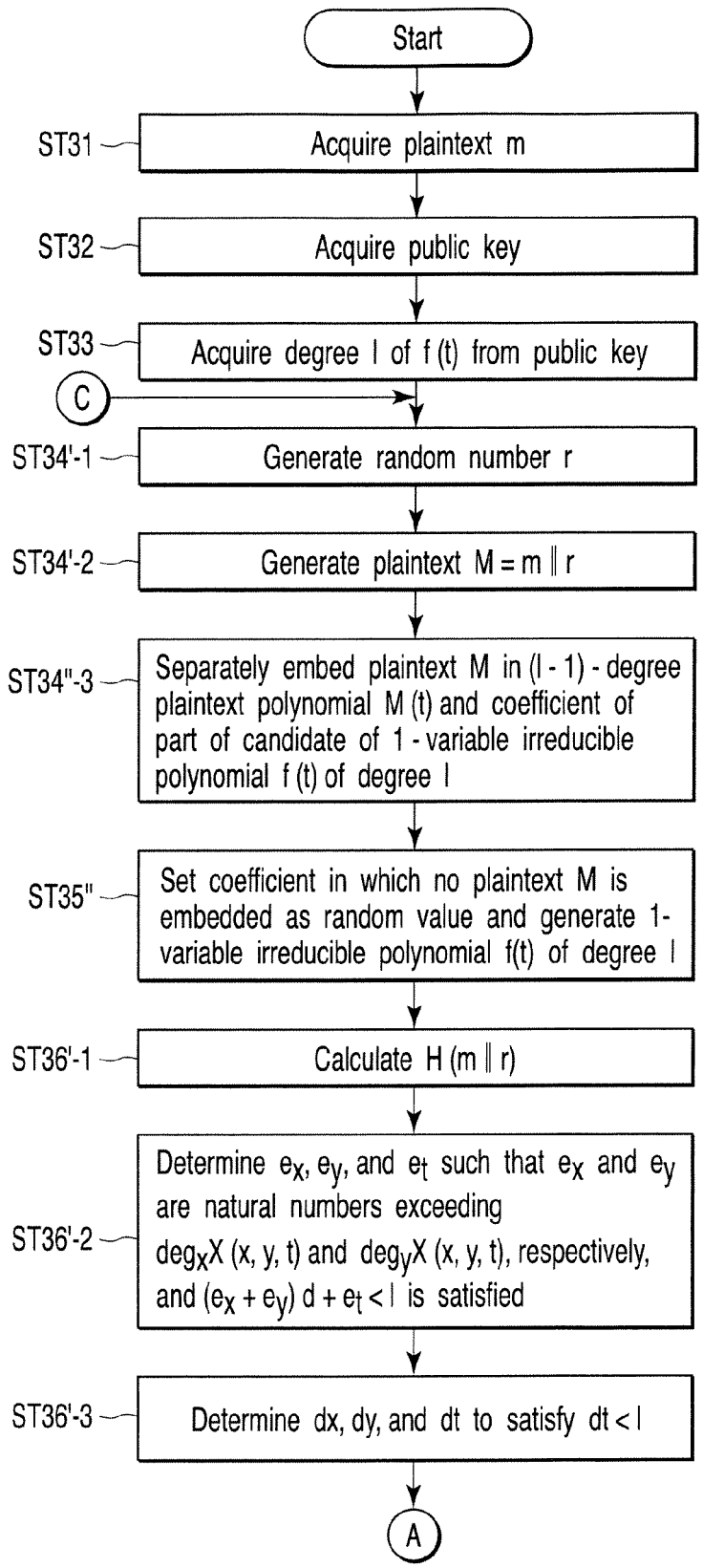
FIGS. 27 and 28 are flowcharts of an eighth variation of the embodiment.
Figure 28:
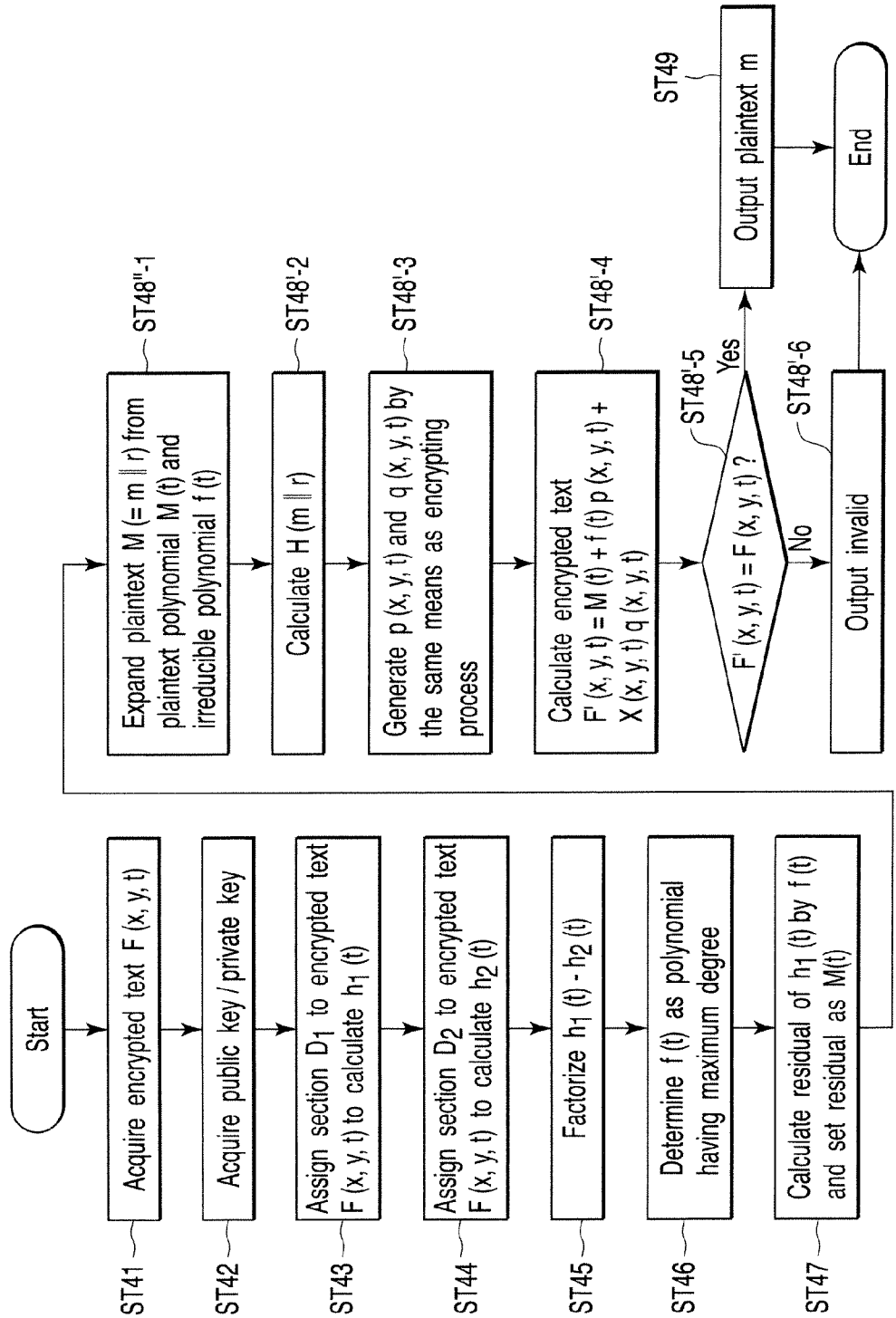

Furthermore, as the eighth variation, a system in which a plaintext M=m∥r is also embedded in a 1-variable irreducible polynomial f(t) may be used. In this case, the flowcharts of the encrypting process and the decrypting process are transformed into flowcharts shown in FIG. 27 (ST34"-3 and ST35") or FIG. 28 (ST48"). Accordingly, the plaintext embedding unit 33', the 1-variable irreducible polynomial generating unit 35, and the plaintext expanding unit 49' are modified as follows.

More specifically, the plaintext embedding unit 33' is transformed such that the plaintext M obtained by connecting the message m and the random number r to each other is separately embedded in the plaintext polynomial M(t) having one variable t and a degree equal to or smaller than a degree l–1 and some coefficients of candidates of the 1-variable irreducible polynomial f(t) having a degree equal to or larger than a degree l. The 1-variable irreducible polynomial generating unit 35 is transformed such that, of coefficients of the candidates of the 1-variable irreducible polynomial f(t), coefficients in which the plaintext M is not embedded are set at random values to generate a 1-variable irreducible polynomial f(t). Furthermore, the plaintext expanding unit 49' is transformed such that the plaintext M is extracted from coefficients of the plaintext polynomial M(t) and some coefficients of the irreducible polynomial f(t).

As described above, in the fourth embodiment, the sixth to eighth variations described in the third embodiment can be used.

The method exhibited in each above-mentioned embodiment can be distributed as a computer executable program by storing into a storage medium such as a magnetic disk [Floppy™ disk, hard disk, etc.], an optical disk (CD-ROM, DVD, etc.), a magnet-optical disk (MO) and a semiconductor memory.

Regardless of type of storage format, any storage medium capable of storing the program and being read by the computer is usable as the storage medium for this program.

An operating system (OS) or middleware (MW) such as a database management software and a network software running on the computer, based on the instruction installed in the computer from the storage medium, may executes a part of each processing to achieve each above-described embodiment.

The storage medium for the invention is not limited to a medium independent from the computer, and includes the storage medium with a program transmitted via a LAN, the Internet, etc., downloaded and stored or temporarily stored thereon.

The number of the storage medium for the invention is not limited only one, and the storage medium of the invention includes the case that processing in each embodiment is respectively executed by means of a plurality of media, and any structure of the medium is acceptable.

The computer in the invention executes each processing in each above mentioned embodiment, based on the program stored in the storage medium. Any configuration of the computer such as a device composed of a single personal computer, etc., and a system composed of a plurality of devices network-connected therein are available.

The computer in the invention is not limited to a personal computer, and includes computing processing device, a micro-computer, etc., included in information processing equipment and generically means equipment and a device capable of achieving the functions of the invention.

The invention in its broader aspects is not limited to the specific details and representative embodiments shown and described herein, and can be embodied in their implementation phases by modifying constituent components without departing from the spirit or scope of the general inventive concept of the invention. A variety of modifications of the invention may be made by appropriate combinations of a plurality of constituent components shown in each foregoing embodiment. For example, some constituent components may be omitted from the whole of the constituent components shown in each embodiment. Furthermore, the constituent components over different embodiments can be appropriately combined.

What is claimed is:

1. A key generating apparatus, comprising:
a format data storing device configured to store a plurality of format data which express candidates of format data of a fibration X(x, y, t) of an algebraic surface X on the basis of the following equation as a polynomial $x^i y^j$ having a 1-variable polynomial $c_{ij}(t)$ of t as a coefficient, the fibration X(x, y, t) being a part of a public key, the algebraic surface X being defined on a finite field $F_q$ (where $q=p^r$ [p is a prime number and r is an extended degree]):

$$X(x, y, t) = \sum_{(i,j)} c_{ij}(t)\, x^i\, y^j$$

where $0 \leq i$, $0 \leq j$; at least (i,j) satisfies ($\geq 1$, $\geq 1$) and includes (1,0) and (0,0); the respective pieces of format data have different sets of combinations (i,j) of degrees;

a parameter storing device configured to store parameters which are another part of the public key and which include a maximum degree d of two sections $D_1$ and $D_2$, the prime number p, and the extended degree r, the two sections $D_1$ and $D_2$ being a private key and corresponding to the fibration $X(x, y, t)=0$;

a format data determining device configured to determine format data of the fibration $X(x, y, t)$ by selecting any one of the format data in the format data storing device at random;

a first polynomial generating device configured to generate a random 1-variable polynomial $\lambda_x(t)$ having a degree less than the degree d and defined on $F_q$;

a second polynomial generating device configured to generate 1-variable polynomial $\lambda_y(t)$ defined on $F_q$ and having a degree which can be divided by the 1-variable polynomial $\lambda_x(t)$ and is not more than the degree d;

a third polynomial generating device configured to generate two 1-variable polynomials $u_x(t)$ and $v_x(t)$ expressing a variable x by a parameter t, having a degree not more than the degree d, and defined on $F_q$ on the basis of the 1-variable polynomial $\lambda_x(t)$ such that a difference between the polynomials $\{u_x(t)-v_x(t)\}$ is $\lambda_x(t)$ and a degree of at least one of the polynomials is d;

a fourth polynomial generating device configured to generate two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t)-v_y(t)\}$ is $\lambda_y(t)$ and a degree of at least one of the polynomials is d;

a section generating device configured to generate the two sections $D_1$: $(x, y, t)=(u_x(t), u_y(t), t)$ and $D_2$: $(x, y, t)=(v_x(t), v_y(t), t)$ on the basis of the 1-variable polynomials $u_x(t)$, $v_x(t)$, $u_y(t)$, and $v_y(t)$;

a fifth polynomial generating device configured to generate a 1-variable polynomial $c_{ij}(t)$ (where $(i,j)\neq(0,0), (1,0)$) defined on $F_q$ and serving as a coefficient of a term except for a constant term $c_{00}(t)$ and a primary term $c_{10}(t)x$ in the determined format data at random;

a sixth polynomial generating device configured to generate a 1-variable polynomial $c_{10}(t)$ defined on $F_q$ and serving as a coefficient of a primary term expressed by the following equation on the basis of the 1-variable polynomials $u_x(t)$, $v_x(t)$, $u_y(t)$, $v_y(t)$, and $c_{ij}(t)$:

$$c_{10}(t) = \frac{-\sum_{(i,j)\neq(0,0),(1,0)} c_{ij}(t)(u_x(t)^i u_y(t)^j - v_x(t)^i v_y(t)^j)}{u_x(t) - v_x(t)}$$

a seventh polynomial generating device configured to generate a 1-variable polynomial $c_{00}(t)$ serving as a constant term expressed by the following equation and defined on $F_q$ on the basis of the 1-variable polynomials $u_x(t)$, $v_x(t)$, $c_{ij}(t)$, and $c_{10}(t)$:

$$c_{00}(t) = -\sum_{(i,j)\neq(0,0)} c_{ij}(t) u_x(t)^i u_y(t)^j$$

a fibration generating device configured to generate a fibration $X(x, y, t)$ of the algebraic surface X by setting the 1-variable polynomials $c_{ij}(t)$, $c_{10}(t)$, and $c_{00}(t)$ to the determined format data; and a key output device configured to output a public key based on the algebraic surface X.

2. The apparatus according to claim 1, further comprising:
a parameter input device to input parameters including the prime number p, the extended degree r, and the degree d; and
a parameter write device configured to write the parameters in the parameter storing device.

3. The apparatus according to claim 1, further comprising a minimum degree determining device configured to determine a minimum degree l of a random 1-variable polynomial for encryption on the basis of degrees $\deg_x X(x, y, t)$, $\deg_y X(x, y, t)$, and $\deg_t X(x, y, t)$ of variables x, y, and t in the generated fibration $X(x, y, t)$ and the degree d such that the degree l is not less than $(\deg_x X(x, y, t) + \deg_y X(x, y, t))d + \deg_t X(x, y, t)$.

4. The apparatus according to claim 1, further comprising:
a genus calculating device configured to calculate a genus g(C) obtained when the fibration $X(x, y, t)$ is regarded as an algebraic curve $C(x, y)$ on a 1-variable function field $F_p(t)$ on the basis of a total degree $d_c = \deg_x X(x, y, t) + \deg_y X(x, y, t)$ related to the variables x and y in the generated fibration $X(x, y, t)$;
a genus determining device configured to determine whether the calculated genus g(C) is less than 2; and
a control device configured to control the format data determining device such that processes from the format data determining device to the genus determining device are re-executed when the genus g(C) is less than 2 as a result of the determination.

5. The apparatus according to claim 1, further comprising:
a total degree determining device configured to determine whether a total degree $d_c = \deg_x X(x, y, t) + \deg_y X(x, y, t)$ related to the variables x and y in the generated fibration $X(x, y, t)$ is less than 4; and
a control device configured to control the format data determining device to re-execute processes from the format data determining device to the total degree determining device when the total degree $d_c$ is less than 4 as a result of the determination.

6. The apparatus according to claim 1, wherein
the format data determining device further comprises:
a genus calculating device configured to calculate a genus g(C) obtained when the fibration $X(x, y, t)$ is regarded as an algebraic curve $C(x, y)$ on a 1-variable function field $F_p(t)$ on the basis of a total degree $d_c = \deg_x X(x, y, t) + \deg_y X(x, y, t)$ related to the variables x and y in the fibration $X(x, y, t)$ in the selected format data;
a genus determining device configured to determine whether the calculated genus g(C) is less than 2; and
a re-selecting device configured to re-select format data different from the selected format data when the genus g(C) is less than 2 as a result of the determination; and
a transmitting device configured to transmit the re-selected format data to the genus calculating device.

7. The apparatus according to claim 1, wherein
the format data determining device further comprises:
a total degree determining device configured to determine whether a total degree $d_c = \deg_x X(x, y, t) + \deg_y X(x, y, t)$ related to the variables x and y in the fibration $X(x, y, t)$ in the selected format data is less than 4;
a re-selecting device configured to re-select format data different from the selected format data when the total degree $d_c$ is less than 4 as a result of the determination; and
a transmitting device configured to transmit the re-selected format data to the total degree determining device.

8. A key generating apparatus comprising:

a format data storing device configured to store a plurality of format data that express candidates of format data of a fibration X(x, y, t) of an algebraic surface X on the basis of the following equation as a polynomial $x^i y^j$ having a 1-variable polynomial $c_{ij}(t)$ of t as a coefficient, the fibration X(x, y, t) being a part of a public key, the algebraic surface X being defined on a finite field $F_q$ (where $q=p^r$ [p is a prime number and r is an extended degree]):

$$X(x, y, t) = \sum_{(i,j)} c_{ij}(t) x^i y^j$$

where $0 \leq i$, $0 \leq j$; at least (i,j) satisfies ($\geq 1$, $\geq 1$) and includes (1,0) and (0,0); the respective pieces of format data have different sets of combinations (i,j) of degrees;

a parameter storing device configured to store parameters which are another part of the public key and which include a maximum degree d of two sections $D_1$ and $D_2$, the prime number p, and the extended degree r, the two sections $D_1$ and $D_2$ being a private key and corresponding to the fibration X(x, y, t)=0;

a format data determining device configured to determine format data of the fibration X(x, y, t) by selecting any one of the pieces of format data in the format data storing device at random;

a first polynomial generating device configured to generate a random 1-variable polynomial $\lambda_y(t)$ having a degree less than the degree d and defined on $F_q$;

a second polynomial generating device configured to generate 1-variable polynomial $\lambda_x(t)$ defined on $F_q$ and having a degree which can be divided by the 1-variable polynomial $\lambda_y(t)$ and is not more than the degree d;

a third polynomial generating device configured to generate two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t)-v_y(t)\}$ is $\lambda_y(t)$ and a degree of at least one of the polynomials is d;

a fourth polynomial generating device configured to generate two 1-variable polynomials $u_x(t)$ and $v_x(t)$ expressing a variable y by a parameter t, having a degree not more than the degree d, and defined on $F_q$ on the basis of the 1-variable polynomial $\lambda_x(t)$ such that a difference between the polynomials $\{u_x(t)-v_x(t)\}$ is $\lambda_x(t)$ and a degree of at least one of the polynomials is d;

a section generating device configured to generate the two sections $D_1$: (x, y, t)=($u_x(t), u_y(t), t$) and $D_2$: (x, y, t)=($v_x(t), v_y(t), t$) on the basis of the 1-variable polynomials $u_x(t), v_x(t), u_y(t),$ and $v_y(t)$;

a fifth polynomial generating device configured to generate a 1-variable polynomial $c_{ij}(t)$ (where $(i,j) \neq (0,0), (0,1)$) defined on $F_q$ and serving as a coefficient of a term except for a constant term $c_{00}(t)$ and a primary term $c_{01}(t)y$ in the determined format data at random;

a sixth polynomial generating device configured to generate a 1-variable polynomial $c_{01}(t)$ defined on $F_q$ and serving as a coefficient of a primary term expressed by the following equation on the basis of the 1-variable polynomials $u_x(t), v_x(t), u_y(t), v_y(t),$ and $c_{ij}(t)$:

$$c_{01}(t) = \frac{-\sum_{(i,j) \neq (0,0),(0,1)} c_{ij}(t)(u_x(t)^i u_y(t)^j - v_x(t)^i v_y(t)^j)}{u_x(t) - v_x(t)}$$

a seventh polynomial generating device configured to generate a 1-variable polynomial $c_{00}(t)$ serving as a constant term expressed by the following equation and defined on $F_q$ on the basis of the 1-variable polynomials $u_x(t), v_x(t), c_{ij}(t),$ and $c_{01}(t)$:

$$c_{00}(t) = -\sum_{(i,j) \neq (0,0)} c_{ij}(t) u_x(t)^i u_y(t)^j$$

a fibration generating device configured to generate a fibration X(x, y, t) of the algebraic surface X by setting the 1-variable polynomials $c_{ij}(t), c_{01}(t),$ and $c_{00}(t)$ to the determined format data; and a key output device configured to output a public key based on the algebraic surface X.

9. A non-transitory computer-readable medium storing a computer program that, when executed by a computer having a memory, causes the computer to generate an algebraic surface so as to define a public key, the program comprising:

first program code to cause the computer to execute a process of writing a plurality of format data which express candidates of format data of a fibration X(x, y, t) of an algebraic surface X on the basis of the following equation as a polynomial $x^i y^j$ having a 1-variable polynomial $c_{ij}(t)$ of t as a coefficient in the memory, the fibration X(x, y, t) being a part of a public key, the algebraic surface X being defined on a finite field $F_q$ (where $q=p^r$ [p is a prime number and r is an extended degree]):

$$X(x, y, t) = \sum_{(i,j)} c_{ij}(t) x^i y^j$$

where $0 \leq i$, $0 \leq j$; at least (i,j) satisfies ($\geq 1$, $\geq 1$) and includes (1,0) and (0,0); the respective pieces of format data have different sets of combinations (i,j) of degrees;

second program code to cause the computer to execute a process of writing parameters which are another part of the public key and which include a maximum degree d of two sections $D_1$ and $D_2$, the prime number p, and the extended degree r in the memory, the two sections $D_1$ and $D_2$ being a private key and corresponding to the fibration X(x, y, t)=0;

third program code to cause the computer to execute a process of selecting any one of the pieces of format data in the memory at random to determine format data of the fibration X(x, y, t);

fourth program code to cause the computer to execute a process of generating a random 1-variable polynomial $\lambda_x(t)$ having a degree less than the degree d and defined on $F_q$;

fifth program code to cause the computer to execute a process of generating a 1-variable polynomial $\lambda_y(t)$ defined on $F_q$ and having a degree which can be divided by the 1-variable polynomial $\lambda_x(t)$ and is not more than the degree d;

sixth program code to cause the computer to execute a process of generating two 1-variable polynomials $u_x(t)$ and $v_x(t)$ expressing a variable x by a parameter t, having a degree not more than the degree d, and defined on $F_q$ on the basis of the 1-variable polynomial $\lambda_x(t)$ such that a difference between the polynomials $\{u_x(t)-v_x(t)\}$ is $\lambda_x(t)$ and a degree of at least one of the polynomials is d;

seventh program code to cause the computer to execute a process of generating two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t)-v_y(t)\}$ is $\lambda_y(t)$ and a degree of at least one of the polynomials is d;

eighth program code to cause the computer to execute a process of generating the two sections $D_1$: (x, y, t)=($u_x(t), u_y(t), t$) and $D_2$: (x, y, t)=($v_x(t), v_y(t), t$) on the basis of the 1-variable polynomials $u_x(t), v_x(t), u_y(t),$ and $v_y(t)$;

ninth program code to cause the computer to execute a process of generating a 1-variable polynomial $c_{ij}(t)$ (where (i,j)≠(0,0), (1,0)) defined on $F_q$ and serving as a coefficient of a term except for a constant term $c_{00}(t)$ and a primary term $c_{10}(t)x$ in the determined format data at random;

tenth program code to cause the computer to execute a program of generating a 1-variable polynomial $c_{10}(t)$ defined on $F_q$ and serving as a coefficient of a primary term expressed by the following equation on the basis of the 1-variable polynomials $u_x(t), v_x(t), u_y(t), v_y(t),$ and $c_{ij}(t)$:

$$c_{10}(t) = \frac{-\sum_{(i,j)\neq(0,0),(1,0)} c_{ij}(t)(u_x(t)^i u_y(t)^j - v_x(t)^i v_y(t)^j)}{u_x(t) - v_x(t)}$$

eleventh program code to cause the computer to execute a process of generating a 1-variable polynomial $c_{00}(t)$ serving as a constant term expressed by the following equation and defined on $F_q$ on the basis of the 1-variable polynomials $u_x(t), v_x(t), c_{ij}(t),$ and $c_{10}(t)$:

$$c_{00}(t) = -\sum_{(i,j)\neq(0,0)} c_{ij}(t) u_x(t)^i u_y(t)^j$$

and twelfth program code to cause the computer to execute a process of generating a fibration X(x, y, t) of the algebraic surface X by setting the 1-variable polynomials $c_{ij}(t), c_{10}(t),$ and $c_{00}(t)$ to the determined format data.

10. The computer-readable medium according to claim 9, wherein the program further comprises:
thirteenth program code to cause the computer to execute a process of inputting parameters including the prime number p, the extended degree r, and the degree d; and
fourteenth program code to cause the computer to execute a process of writing the input parameters in the memory.

11. The computer-readable medium according to claim 9, wherein the program further comprises:
fifteenth program code to cause the computer to execute a process of determining a minimum degree/of a random 1-variable polynomial for encryption on the basis of degrees $\deg_x X(x, y, t), \deg_y X(x, y, t),$ and $\deg_t X(x, y, t)$ of variables x, y, and t in the generated fibration X(x, y, t) and the degree d such that the degree l is not less than $(\deg_x X(x, y, t)+\deg_y X(x, y, t))d+\deg_t X(x, y, t)$.

12. The computer-readable medium according to claim 9, wherein the program further comprises:
sixteenth program code to cause the computer to execute a process of calculating a genus g(C) obtained when the fibration X(x, y, t) is regarded as an algebraic curve C(x, y) on a 1-variable function field $F_p(t)$ on the basis of a total degree $d_c=\deg_x X(x, y, t)+\deg_y X(x, y, t)$ related to the variables x and y in the generated fibration X(x, y, t);
seventeenth program code to cause the computer to execute a process of determining whether the calculated genus g(C) is less than 2; and
eighteenth program code to cause the computer to re-execute the process of determining the format data to the process of determining the genus when the genus g(C) is less than 2 as a result of the determination.

13. The computer-readable medium according to claim 9, wherein the program further comprises:
nineteenth program code to cause the computer to execute a process of determining whether a total degree $d_c=\deg_x X(x, y, t)+\deg_y X(x, y, t)$ related to the variables x and y in the generated fibration X(x, y, t) is less than 4; and
twentieth program code to cause the computer to re-execute the process of determining the format data to the process of determining the total degree when the total degree $d_c$ is less than 4 as a result of the determination.

14. The computer-readable medium according to claim 9, wherein the third program code further comprises:
twenty-first program code to cause the computer to execute a process of calculating a genus g(C) obtained when the fibration X(x, y, t) is regarded as an algebraic curve C(x, y) on a 1-variable function field $F_p(t)$ on the basis of a total degree $d_c=\deg_x X(x, y, t)+\deg_y X(x, y, t)$ related to the variables x and y in the fibration X(x, y, t) in the selected format data;
twenty-second program code to cause the computer to execute a process of determining whether the calculated genus g(C) is less than 2; and
twenty-third program code to cause the computer to execute a process of re-selecting format data different from the selected format data when the genus g(C) is less than 2 as a result of the determination; and
twenty-fourth program code to cause the computer to re-execute a process of calculating the genus on the basis of the re-selected format data.

15. The computer-readable medium according to claim 9, wherein the third program code further comprises:
twenty-fifth program code to cause the computer to execute a process of determining whether a total degree $d_c=\deg_x X(x, y, t)+\deg_y X(x, y, t)$ related to the variables x and y in the fibration X(x, y, t) in the selected format data is less than 4;
twenty-sixth program code to cause the computer to execute a process of re-selecting format data different from the selected format data when the total degree $d_c$ is less than 4 as a result of the determination; and
twenty-seventh program code to cause the computer to re-execute a process of determining the total degree on the basis of the re-selected format data.

16. A non-transitory computer-readable medium storing a computer program that, when executed by a computer having a memory, causes the computer to define an algebraic surface so as to define a public key, the program comprising:
first program code to cause the computer to execute a process of writing a plurality of format data which express candidates of format data of a fibration $X(x, y, t)$ of an algebraic surface X on the basis of the following equation as a polynomial $x^i y^j$ having a 1-variable polynomial $c_{ij}(t)$ of t as a coefficient in the memory, the fibration $X(x, y, t)$ being a part of a public key, the algebraic surface X being defined on a finite field $F_q$ (where $q=p^r$ [p is a prime number and r is an extended degree]):

$$X(x, y, t) = \sum_{(i,j)} c_{ij}(t) x^i y^j$$

where $0 \leq i$, $0 \leq j$; at least (i,j) satisfies ($\geq 1$, $\geq 1$) and includes (0,1) and (0,0); the respective pieces of format data have different sets of combinations (i,j) of degrees;

second program code to cause the computer to execute a process of writing parameters which are another part of the public key and which include a maximum degree d of two sections $D_1$ and $D_2$, the prime number p, and the extended degree r in the memory, the two sections $D_1$ and $D_2$ being a private key and corresponding to the fibration $X(x, y, t)=0$;

third program code to cause the computer to execute a process of selecting any one of the format data in the memory at random to determine format data of the fibration $X(x, y, t)$;

fourth program code to cause the computer to execute a process of generating a random 1-variable polynomial $\lambda_y(t)$ having a degree less than the degree d and defined on $F_q$;

fifth program code to cause the computer to execute a process of generating a 1-variable polynomial $\lambda_x(t)$ defined on $F_q$ and having a degree which can be divided by the 1-variable polynomial $\lambda_y(t)$ and is not more than the degree d;

sixth program code to cause the computer to execute a process of generating two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t) - v_y(t)\}$ is $\lambda_y(t)$ and a degree of at least one of the polynomials is d;

seventh program code to cause the computer to execute a process of generating two 1-variable polynomials $u_x(t)$ and $v_x(t)$ expressing a variable x by a parameter t, having a degree not more than the degree d, and defined on $F_q$ on the basis of the 1-variable polynomial $\lambda_x(t)$ such that a difference between the polynomials $\{u_x(t) - v_x(t)\}$ is $\lambda_x(t)$ and a degree of at least one of the polynomials is d;

eighth program code to cause the computer to execute a process of generating the two sections $D_1$: $(x, y, t) = (u_x(t), u_y(t), t)$ and $D_2$: $(x, y, t) = (v_x(t), v_y(t), t)$ on the basis of the 1-variable polynomials $u_x(t)$, $v_x(t)$, $u_y(t)$, and $v_y(t)$;

ninth program code to cause the computer to execute a process of generating a 1-variable polynomial $c_{ij}(t)$ (where $(i,j) \neq (0,0), (0,1)$) defined on $F_q$ and serving as a coefficient of a term except for a constant term $c_{00}(t)$ and a primary term $c_{01}(t) y$ in the determined format data at random;

tenth program code to cause the computer to execute a program of generating a 1-variable polynomial $c_{01}(t)$ defined on $F_q$ and serving as a coefficient of a primary term expressed by the following equation on the basis of the 1-variable polynomials $u_x(t)$, $v_x(t)$, $u_y(t)$, $v_y(t)$, and $c_{ij}(t)$:

$$c_{01}(t) = -\frac{\sum_{(i,j) \neq (0,0),(0,1)} c_{ij}(t)(u_x(t)^i u_y(t)^j - v_x(t)^i v_y(t)^j)}{u_x(t) - v_x(t)}$$

eleventh program code to cause the computer to execute a process of generating a 1-variable polynomial $c_{00}(t)$ serving as a constant term expressed by the following equation and defined on $F_q$ on the basis of the 1-variable polynomials $u_x(t)$, $u_y(t)$, $c_{ij}(t)$, and $c_{01}(t)$:

$$c_{00}(t) = -\sum_{(i,j) \neq (0,0)} c_{ij}(t) u_x(t)^i u_y(t)^j$$

and twelfth program code to cause the computer to execute a program of generating a fibration $X(x, y, t)$ of the algebraic surface X by setting the 1-variable polynomials $c_{ij}(t)$, $c_{01}(t)$, and $c_{00}(t)$ to the determined format data.

17. A key generating method executed by a computer programmed as a key generating apparatus having a memory, the method comprising:

storing a plurality of format data which express candidates of format data of a fibration $X(x, y, t)$ of an algebraic surface X on the basis of the following equation as a polynomial $x^i y^j$ having a 1-variable polynomial $c_{ij}(t)$ of t as a coefficient in the memory in advance, the fibration $X(x, y, t)$ being a part of a public key, the algebraic surface X being defined on a finite field $F_q$ (where $q=p^r$ [p is a prime number and r is an extended degree]):

$$X(x, y, t) = \sum_{(i,j)} c_{ij}(t) x^i y^j$$

where $0 \leq i$, $0 \leq j$; at least (i,j) satisfies ($\geq 1$, $\geq 1$) and includes (1,0) and (0,0); the respective pieces of format data have different sets of combinations (i,j) of degrees;

storing parameters which are another part of the public key and which include a maximum degree d of two sections $D_1$ and $D_2$, the prime number p, and the extended degree r in the memory, the two sections $D_1$ and $D_2$ being a private key and corresponding to the fibration $X(x, y, t)=0$;

selecting any one of the format data in the memory at random to determine format data of the fibration $X(x, y, t)$;

generating, by the key generating apparatus, a random 1-variable polynomial $\lambda_x(t)$ having a degree less than the degree d and defined on $F_q$;

generating a 1-variable polynomial $\lambda_y(t)$ defined on $F_q$ and having a degree which can be divided by the 1-variable polynomial $\lambda_x(t)$ and is not more than the degree d;

generating two 1-variable polynomials $u_x(t)$ and $v_x(t)$ expressing a variable x by a parameter t, having a degree not more than the degree d, and defined on $F_q$ on the basis of the 1-variable polynomial $\lambda_x(t)$ such that a difference between the polynomials $\{u_x(t) - v_x(t)\}$ is $\lambda_x(t)$ and a degree of at least one of the polynomials is d;

generating two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t)-v_y(t)\}$ is $\lambda_y(t)$ and a degree of at least one of the polynomials is d;

generating the two sections $D_1$: (x, y, t)=($u_x(t)$, $u_y(t)$, t) and $D_2$: (x, y, t)=($v_x(t)$, $v_y(t)$, t) on the basis of the 1-variable polynomials $u_x(t)$, $v_x(t)$, $u_y(t)$, and $v_y(t)$;

generating a 1-variable polynomial $c_{ij}(t)$ (where (i,j)≠(0,0), (1,0)) defined on $F_q$ and serving as a coefficient of a term except for a constant term $c_{00}(t)$ and a primary term $c_{10}(t)$x in the determined format data at random;

generating a 1-variable polynomial $c_{10}(t)$ defined on $F_q$ and serving as a coefficient of a primary term expressed by the following equation on the basis of the 1-variable polynomials $u_x(t)$, $v_x(t)$, $u_y(t)$, $v_y(t)$, and $c_{ij}(t)$:

$$c_{10}(t) = \frac{-\sum_{(i,j)\neq(0,0),(1,0)} c_{ij}(t)(u_x(t)^i u_y(t)^j - v_x(t)^i v_y(t)^j)}{u_x(t) - v_x(t)}$$

generating a 1-variable polynomial $c_{00}(t)$ serving as a constant term expressed by the following equation and defined on $F_q$ on the basis of the 1-variable polynomials $u_x(t)$, $u_y(t)$, $c_{ij}(t)$, and $c_{10}(t)$:

$$c_{00}(t) = -\sum_{(i,j)\neq(0,0)} c_{ij}(t) u_x(t)^i u_y(t)^j$$

and generating a fibration X(x, y, t) of the algebraic surface X by setting the 1-variable polynomials $c_{ij}(t)$, $c_{10}(t)$, and $c_{00}(t)$ to the determined format data.

18. The method according to claim 17, further comprising: inputting parameters including the prime number p, the extended degree r, and the degree d; and writing the input parameters in the memory.

19. The method according to claim 17, further comprising: determining a minimum degree l of a random 1-variable polynomial for encryption on the basis of degrees $\deg_x X$(x, y, t), $\deg_y X$(x, y, t), and $\deg_t X$(x, y, t) of variables x, y, and t in the generated fibration X(x, y, t) and the degree d such that the degree/is not less than ($\deg_x X$(x, y, t)+$\deg_y X$(x, y, t))d+$\deg_t X$(x, y, t).

20. The method according to claim 17, further comprising: calculating a genus g(C) obtained when the fibration X(x, y, t) is regarded as an algebraic curve C(x, y) on a 1-variable function field $F_p(t)$ on the basis of a total degree $d_c=\deg_x X$(x, y, t)+$\deg_y X$(x, y, t) related to the variables x and y in the generated fibration X(x, y, t);

determining whether the calculated genus g(C) is less than 2; and re-executing the step of determining the format data to the step of determining the genus when the genus g(C) is less than 2 as a result of the determination.

21. The method according to claim 17, further comprising: determining whether a total degree $d_c=\deg_x X$(x, y, t)+$\deg_y X$(x, y, t) related to the variables x and y in the generated fibration X(x, y, t) is less than 4; and re-executing the step of determining the format data to the step of determining the total degree when the total degree $d_c$ is less than 4 as a result of the determination.

22. The method according to claim 17, wherein determining the format data further comprises: calculating a genus g(C) obtained when the fibration X(x, y, t) is regarded as an algebraic curve C(x, y) on a 1-variable function field $F_p(t)$ on the basis of a total degree $d_c=\deg_x X$(x, y, t)+$\deg_y X$(x, y, t) related to the variables x and y in the fibration X(x, y, t) in the selected format data;

determining whether the calculated genus g(C) is less than 2; and re-selecting format data different from the selected format data when the genus g(C) is less than 2 as a result of the determination; and re-calculating the genus on the basis of the re-selected format data.

23. The method according to claim 17, wherein determining the format data further comprises:

determining whether a total degree $d_c=\deg_x X$(x, y, t)+$\deg_y X$(x, y, t) related to the variables x and y in the fibration X(x, y, t) in the selected format data is less than 4;

re-selecting format data different from the selected format data when the total degree $d_c$ is less than 4 as a result of the determination; and re-executing the step of determining the total degree on the basis of the re-selected format data.

24. A key generating method executed by a computer programmed as a key generating apparatus having a memory, the method comprising:

storing a plurality of format data which express candidates of format data of a fibration X(x, y, t) of an algebraic surface X on the basis of the following equation as a polynomial $x^i y^j$ having a 1-variable polynomial $c_{ij}(t)$ of t as a coefficient in the memory in advance, the fibration X(x, y, t) being a part of a public key, the algebraic surface X being defined on a finite field $F_q$ (where $q=p^r$ [p is a prime number and r is an extended degree]):

$$X(x, y, t) = \sum_{(i,j)} c_{ij}(t) x^i y^j$$

where $0 \leq i$, $0 \leq j$; at least (i,j) satisfies ($\geq 1$, $\geq 1$) and includes (1,0) and (0,0); the respective pieces of format data have different sets of combinations (i,j) of degrees;

storing parameters which are another part of the public key and which include a maximum degree d of two sections $D_1$ and $D_2$, the prime number p, and the extended degree r in the memory, the two sections $D_1$ and $D_2$ being a private key and corresponding to the fibration X(x, y, t)=0;

selecting any one of the format data in the memory at random to determine format data of the fibration X(x, y, t);

generating, by the key generating apparatus, a random 1-variable polynomial $\lambda_y(t)$ having a degree less than the degree d and defined on $F_q$;

generating a 1-variable polynomial $\lambda_x(t)$ defined on $F_q$ and having a degree which can be divided by the 1-variable polynomial $\lambda_y(t)$ and is not more than the degree d;

generating two 1-variable polynomials $u_y(t)$ and $v_y(t)$ expressing a variable y by a parameter t, having a degree not more than the degree d, and defined on $F_q$ on the basis of the 1-variable polynomial $\lambda_y(t)$ such that a difference between the polynomials $\{u_y(t)-v_y(t)\}$ is $\lambda_y(t)$ and a degree of at least one of the polynomials is d;

generating two 1-variable polynomials $u_x(t)$ and $v_x(t)$ expressing a variable x by a parameter t, having a degree not more than the degree d, and defined on $F_q$ on the basis of the 1-variable polynomial $\lambda_x(t)$ such that a difference between the polynomials $\{u_x(t)-v_x(t)\}$ is $\lambda_x(t)$ and a degree of at least one of the polynomials is d;

generating the two sections $D_1$: (x, y, t)=$(u_x(t), u_y(t), t)$ and $D_2$: (x, y, t)=$(v_x(t), v_y(t), t)$ on the basis of the 1-variable polynomials $u_x(t), v_x(t), u_y(t)$, and $v_y(t)$;

generating a 1-variable polynomial $c_{ij}(t)$ (where (i,j)≠(0,0), (0,1)) defined on $F_q$ and serving as a coefficient of a term except for a constant term $c_{00}(t)$ and a primary term $c_{01}(t)$ y in the determined format data at random;

generating a 1-variable polynomial $c_{01}(t)$ defined on $F_q$ and serving as a coefficient of a primary term expressed by the following equation on the basis of the 1-variable polynomials $u_x(t), v_x(t), u_y(t), v_y(t)$, and $c_{ij}(t)$:

$$c_{01}(t) = \frac{-\sum_{(i,j)\neq(0,0),(0,1)} c_{ij}(t)(u_x(t)^i u_y(t)^j - v_x(t)^i v_y(t)^j)}{u_x(t) - v_x(t)}$$

generating a 1-variable polynomial $c_{00}(t)$ serving as a constant term expressed by the following equation and defined on $F_q$ on the basis of the 1-variable polynomials $u_x(t), u_y(t), c_{ij}(t)$, and $c_{01}(t)$:

$$c_{00}(t) = -\sum_{(i,j)\neq(0,0)} c_{ij}(t) u_x(t)^i u_y(t)^j$$

and generating a fibration X(x, y, t) of the algebraic surface X by setting the 1-variable polynomials $c_{ij}(t), c_{01}(t)$, and $c_{00}(t)$ to the determined format data.

* * * * *